United States Patent
Shirakami et al.

(10) Patent No.: US 12,030,105 B2
(45) Date of Patent: Jul. 9, 2024

(54) STRUCTURAL MEMBER, STRUCTURAL MEMBER MANUFACTURING METHOD, AND STRUCTURAL MEMBER MANUFACTURING DEVICE

(71) Applicant: NIPPON STEEL CORPORATION, Tokyo (JP)

(72) Inventors: Satoshi Shirakami, Tokyo (JP); Yasuharu Tanaka, Tokyo (JP); Koichi Sato, Tokyo (JP); Shigeru Yonemura, Tokyo (JP); Tohru Yoshida, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 288 days.

(21) Appl. No.: 17/762,806

(22) PCT Filed: Sep. 25, 2020

(86) PCT No.: PCT/JP2020/036314
§ 371 (c)(1),
(2) Date: Mar. 23, 2022

(87) PCT Pub. No.: WO2021/060483
PCT Pub. Date: Apr. 1, 2021

(65) Prior Publication Data
US 2022/0331855 A1 Oct. 20, 2022

(30) Foreign Application Priority Data

Sep. 25, 2019 (JP) .................................. 2019-174595

(51) Int. Cl.
*B21D 47/00* (2006.01)
*B21D 22/22* (2006.01)
(Continued)

(52) U.S. Cl.
CPC ............. *B21D 47/00* (2013.01); *B21D 22/22* (2013.01); *B21D 22/26* (2013.01); *B21D 37/08* (2013.01);
(Continued)

(58) Field of Classification Search
CPC ........ B21D 47/00; B21D 47/01; B21D 47/04; B62D 25/2036; B62D 25/025; E04C 3/04;
(Continued)

(56) References Cited

U.S. PATENT DOCUMENTS 3,224,156 A * 12/1965 Marchand ............... B21D 47/04
52/660
4,572,571 A * 2/1986 Malen .................... B62D 25/20
296/193.07
(Continued)

FOREIGN PATENT DOCUMENTS

EP 2754509 A1 7/2014
JP 2013-056367 A 3/2013
(Continued)

*Primary Examiner* — Kyle J. Walraed-Sullivan
(74) *Attorney, Agent, or Firm* — Birch, Stewart, Kolasch & Birch, LLP

(57) ABSTRACT

This structural member is manufactured using a structural member manufacturing device including a first clamping part having a first lower clamping member and a second upper clamping member disposed to face each other and capable of being opened and closed; a second clamping part having a third lower clamping member and a fourth upper clamping member disposed to face each other corresponding to the first lower clamping member and the second upper clamping member and capable of being opened and closed; and clamping part driver for allowing the first clamping part and the second clamping part to be relatively separated from each other while causing a position in an X-axis direction (Continued)

and a position in a Z-axis direction to correspond to each other.

16 Claims, 26 Drawing Sheets

(51) Int. Cl.
    *B21D 22/26*     (2006.01)
    *B21D 37/08*     (2006.01)
    *B60J 5/04*     (2006.01)
    *E04C 3/04*     (2006.01)
    *B21D 37/10*     (2006.01)

(52) U.S. Cl.
    CPC ............... *E04C 3/04* (2013.01); *B21D 37/10* (2013.01); *B60J 5/0444* (2013.01)

(58) Field of Classification Search
    CPC ..... E04C 2003/0404; E04C 2003/0408; E04C 2003/0421; E04C 2003/0443; B60J 5/0444
    USPC ...... 296/184.1, 209, 203.03, 203.02, 203.04, 296/146.6, 187.12
    See application file for complete search history.

(56) References Cited

U.S. PATENT DOCUMENTS

| | | | | |
|---|---|---|---|---|
| 5,785,376 | A * | 7/1998 | Nees | B60J 5/0444 49/502 |
| 5,813,718 | A * | 9/1998 | Masuda | B60J 5/0444 296/187.12 |
| 6,227,609 | B1 * | 5/2001 | Mellis | B60J 5/0444 296/146.6 |
| 6,290,282 | B1 * | 9/2001 | Hortlund | B60J 5/0444 49/502 |
| 6,398,289 | B1 * | 6/2002 | Gehringhoff | B60J 5/0437 296/202 |
| 6,517,142 | B2 * | 2/2003 | Gehringhoff | B60J 5/0444 296/203.03 |
| 6,604,781 | B2 * | 8/2003 | Uchida | B62D 25/20 296/29 |
| 7,540,556 | B2 * | 6/2009 | Yamada | B62D 21/152 296/203.02 |
| 8,678,481 | B2 * | 3/2014 | Tamura | B62D 25/04 296/193.06 |
| 8,960,772 | B2 * | 2/2015 | Lane | B60K 7/0007 296/183.1 |
| 2002/0195836 | A1 * | 12/2002 | Gehringhoff | B60J 5/0444 296/187.12 |
| 2003/0178273 | A1 * | 9/2003 | Bullmann | B60J 5/0444 188/377 |
| 2004/0113462 | A1 * | 6/2004 | Winter | B62D 25/08 296/203.02 |
| 2004/0174041 | A1 * | 9/2004 | Graber | B60J 5/0444 296/146.6 |
| 2005/0241261 | A1 * | 11/2005 | Martinez-Cepeda | E04C 3/07 52/843 |
| 2006/0137284 | A1 * | 6/2006 | Window | E04C 3/07 52/656.9 |
| 2006/0237245 | A1 * | 10/2006 | Yoshida | B60J 5/0444 219/202 |
| 2011/0133515 | A1 * | 6/2011 | Mori | B62D 25/04 296/193.06 |
| 2011/0233970 | A1 * | 9/2011 | Nagai | B62D 29/007 296/203.03 |
| 2012/0285098 | A1 * | 11/2012 | Rakei | B60J 5/0444 49/501 |
| 2012/0291386 | A1 * | 11/2012 | Miniscloux | B21D 13/10 52/340 |
| 2013/0033065 | A1 * | 2/2013 | Johansson | B60J 5/042 427/435 |
| 2014/0186481 | A1 * | 7/2014 | Lee | B21D 25/00 425/395 |
| 2015/0129116 | A1 * | 5/2015 | Richeton | B60R 19/12 293/120 |
| 2015/0166120 | A1 * | 6/2015 | Han | B60N 2/005 296/193.07 |
| 2015/0273563 | A1 * | 10/2015 | Miyagi | B21D 22/22 29/897.2 |
| 2017/0151597 | A1 * | 6/2017 | Miyagi | B21D 22/02 |
| 2017/0274936 | A1 * | 9/2017 | Ishii | B62D 21/157 |
| 2018/0171634 | A1 * | 6/2018 | Mitchell | E04C 3/32 |
| 2019/0047636 | A1 * | 2/2019 | Asa | B62D 25/025 |
| 2022/0274651 | A1 * | 9/2022 | Shimizu | B21D 19/08 |
| 2023/0391170 | A1 * | 12/2023 | Yamamoto | B60J 5/0444 |

FOREIGN PATENT DOCUMENTS

| | | |
|---|---|---|
| JP | 5614514 B2 | 10/2014 |
| JP | 2015-006679 A | 1/2015 |
| WO | WO 2007/022404 A1 | 2/2007 |

* cited by examiner

STRUCTURAL MEMBER, STRUCTURAL MEMBER MANUFACTURING METHOD, AND STRUCTURAL MEMBER MANUFACTURING DEVICE

TECHNICAL FIELD OF THE INVENTION

The present invention relates to a structural member having an inclined portion formed by forming a metal material sheet, and a structural member manufacturing method and a structural member manufacturing device for manufacturing the structural member. This application claims the right of priority based on Japanese Patent Application No. 2019-174595 filed with the Japan Patent Office on Sep. 25, 2019, the content of which is incorporated herein by reference.

RELATED ART

As is well known, for example, like components for a vehicle or home electric appliances, structural members having a complicated shape including an inclined portion are widely used.

In a case where such a structural member is formed by cold drawing, there is a problem in that wrinkles easily occur in an edge portion or the like of the inclined portion. Therefore, various techniques for suppressing the generation of wrinkles are disclosed (refer to, for example, Patent Document 1). However, it is not easy to form a structural member having an inclined portion without generating wrinkles, and for example, in a case where an inclination angle of the inclined portion changes according to a portion, it is more difficult to suppress the generation of wrinkles.

PRIOR ART DOCUMENT

Patent Document

[Patent Document 1] Japanese Patent No. 5614514

DISCLOSURE OF THE INVENTION

Problems to be Solved by the Invention

Further, in recent years, many structural members each having an inclined portion have been required to have higher strength. However, for example, when performing forming by cold deformation processing using ultra high strength steel having tensile strength of 980 MPa or more, there is a problem in that cracks easily occur in addition to wrinkles.

Therefore, there has been a demand for a technique for efficiently manufacturing a structural member having an inclined portion by suppressing the generation of wrinkles. Further, there has been a demand for a technique for manufacturing a structural member having an inclined portion whose inclination angle changes according to a portion, or a structural member having an inclined portion whose inclination angle changes according to a portion due to cold deformation processing, which can also be applied to, for example, ultra high strength steel having tensile strength of 780 MPa or more.

The present invention has been made in consideration of such circumstances, and has an object to provide a structural member having high strength, in which the generation of wrinkles in an inclined portion is suppressed, and a structural member manufacturing method and a structural member manufacturing device, in which it is possible to efficiently and stably manufacture the structural member by cold deformation processing.

Means for Solving the Problem

The inventors of the present invention have assiduously studied a technique for manufacturing a structural member having a first region and an inclined portion connected to the first region by forming a metal material sheet by cold deformation processing. As a result, the inventors have found a method of forming an inclined portion by partially pulling the metal material sheet by restraining a portion corresponding to the first region, of the metal material sheet, by a first restraining part, restraining a portion corresponding to the inclined portion by a second restraining part, and then relatively separating the first restraining part and the second restraining part from each other along a direction intersecting the sheet surface of the metal material sheet. According to this method, it is possible to efficiently and stably manufacture a structural member while suppressing the generation of wrinkles.

That is, in order to solve the above problems and achieve a relevant object, the present invention adopts the following aspects.

(1) According to an aspect of the present invention, there is provided a structural member made of a metal material sheet, and including: a first region extending to intersect with a third direction among a first direction, a second direction, and the third direction that are orthogonal to each other; a first ridge connected to the first region and extending in the second direction; an inclined portion connected to the first region through the first ridge in the first direction and inclined with respect to the first region; a second ridge formed at an end portion of the inclined portion on a side opposite to the first region in the first direction and extending along the second direction; and a second region connected through the second ridge and extending to intersect with the third direction, in which in the inclined portion, an intersection angle with the third direction in a first plane that is defined by the first direction and the third direction changes according to a position in the second direction, and an intersection angle with the first direction in a second plane that is defined by the first direction and the second direction changes according to a position in the second direction, the inclined portion includes a pair of second inclined portions, each of which is located on each side of both end portion sides in the second direction, a pair of third inclined portions, each of which is connected to each of the pair of second inclined portions, and a first inclined portion which is connected to both of the pair of third inclined portions, an intersection angle with the third direction of each of the pair of third inclined portions is in a range between an intersection angle with the third direction of the first inclined portion and an intersection angle with the third direction of each of the pair of second inclined portions, the first ridge has a convex shape whose center portion protrudes in a direction of the first region, the second ridge has a convex shape whose center portion protrudes to a side opposite to the second region, and a maximum sheet thickness region portion having a maximum sheet thickness on the first inclined portion side, and a minimum sheet thickness region portion formed on the second inclined portion side with respect to the maximum sheet thickness region portion and having a minimum sheet thickness are formed, and a sheet thickness ratio A of the minimum sheet thickness region portion to the maximum sheet thickness region portion, which is obtained by the following Expression 1, satisfies the following Expression 2.

the sheet thickness ratio $A=$([maximum sheet thickness (mm) of the maximum sheet thickness region portion]−[minimum sheet thickness (mm) of the minimum sheet thickness region portion])/[maximum sheet thickness (mm) in the maximum sheet thickness region portion]   Expression 1

$0.08 \leq A \leq 0.26$   Expression 2

(2) In the structural member according to the above (1), the structural member may be made of a steel sheet having tensile strength of 780 MPa or more.

(3) In the structural member according to the above (1) or (2), a sheet thickness may be 0.8 mm or more and 2.3 mm or less.

(4) In the structural member according to any one of the above (1) to (3), a difference between the intersection angle with the third direction of the first inclined portion and the intersection angle with the third direction of each of the pair of second inclined portions may be 8.0° or more.

(5) According to another aspect of the present invention, there is provided a structural member manufacturing method that is made of a metal material sheet, and includes a first region extending to intersect with a third direction among a first direction, a second direction, and the third direction that are orthogonal to each other; a first ridge connected to the first region and extending in the second direction; an inclined portion connected to the first region through the first ridge in the first direction and inclined with respect to the first region; a second ridge formed at an end portion of the inclined portion on a side opposite to the first region in the first direction and extending along the second direction; and a second region connected through the second ridge and extending to intersect with the third direction, in which in the inclined portion, an intersection angle with the third direction in a first plane that is defined by the first direction and the third direction changes according to a position in the second direction, and an intersection angle with the first direction in a second plane that is defined by the first direction and the second direction changes according to a position in the second direction, the inclined portion includes a pair of second inclined portions, each of which is located on each side of both end portion sides in the second direction, a pair of third inclined portions, each of which is connected to each of the pair of second inclined portions, and a first inclined portion which is connected to both of the pair of third inclined portions, an intersection angle with the third direction of each of the pair of third inclined portions is in a range between an intersection angle with the third direction of the first inclined portion and an intersection angle with the third direction of each of the pair of second inclined portions, the first ridge has a convex shape whose center portion protrudes in a direction of the first region, and the second ridge has a convex shape whose center portion protrudes to a side opposite to the second region, the method including: a first process of restraining the first region by a first restraining part; a second process of restraining the second region by a second restraining part; and a third process of forming the inclined portion by relatively moving the first restraining part and the second restraining part in a direction in which the first restraining part and the second restraining part are separated from each other, along a smaller intersection angle of two intersection angles of an intersection angle with the third direction of the first inclined portion and an intersection angle with the third direction of each of the pair of second inclined portions.

(6) In the structural member manufacturing method according to the above (5), in a state where the metal material sheet is clamped by the first restraining part and the second restraining part, in the inclined portion having a smaller intersection angle with the third direction, of the first inclined portion and the pair of second inclined portions, an interval between the first restraining part and the second restraining part may be 1.03 times or more and 1.07 times or less a sheet thickness of the metal material sheet, and in the inclined portion having a larger intersection angle with the third direction, the first restraining part and the second restraining part may be separated from each other.

(7) In the structural member manufacturing method according to the above (5), the inclined portion may be formed while restraining a surface corresponding to the second region.

(8) In the structural member manufacturing method according to the above (5), the inclined portion may be formed while restraining a surface corresponding to the first region.

(9) In the structural member manufacturing method according to the above (5), the inclined portion may be formed while restraining the pair of second inclined portions.

(10) According to still another aspect of the present invention, there is provided a structural member manufacturing device that is made of a metal material sheet, and includes a first region extending to intersect with a third direction among a first direction, a second direction, and the third direction that are orthogonal to each other; a first ridge connected to the first region and extending in the second direction; an inclined portion connected to the first region through the first ridge in the first direction and inclined with respect to the first region; a second ridge formed at an end portion of the inclined portion on a side opposite to the first region in the first direction and extending along the second direction; and a second region connected through the second ridge and extending to intersect with the third direction, in which in the inclined portion, an intersection angle with the third direction in a first plane that is defined by the first direction and the third direction changes according to a position in the second direction, and an intersection angle with the first direction in a second plane that is defined by the first direction and the second direction changes according to a position in the second direction, the inclined portion includes a pair of second inclined portions, each of which is located on each side of both end portion sides in the second direction, a pair of third inclined portions, each of which is connected to each of the pair of second inclined portions, and a first inclined portion which is connected to both of the pair of third inclined portions, an intersection angle with the third direction of each of the pair of third inclined portions is in a range between an intersection angle with the third direction of the first inclined portion and an intersection angle with the third direction of each of the pair of second inclined portions, the first ridge has a convex shape whose center portion protrudes in a direction of the first region, and the second ridge has a convex shape whose center portion protrudes to a side opposite to the second region, the device including: a first clamping part having a first lower clamping member and a second upper clamping member that are disposed to face each other and are opened and closed; a second clamping part having a third lower clamping member and a fourth upper clamping member that are disposed to face each other with respect to the first lower clamping member and the second upper clamping member and are opened and closed; and clamping part driving means for allowing the first clamping part and the second clamping part to relatively move in a direction in which the first clamping part and the second clamping part are separated from each other, along a smaller intersection angle of two intersection angles of an intersection angle with the third direction of the first inclined portion and an intersection angle with the third direction of each of the pair of second inclined portions.

(11) In the structural member manufacturing device according to the above (10), in a state where the metal material sheet is clamped by the first clamping part and the second clamping part, in the inclined portion having a smaller intersection angle with the third direction, of the first inclined portion and the pair of second inclined portions, an interval between the first clamping part and the second clamping part may be 1.03 times or more and 1.07 times or less a sheet thickness of the metal material sheet, and in the inclined portion having a larger intersection angle with the third direction, the first clamping part and the second clamping part may be separated from each other.

(12) In the structural member manufacturing device according to the above (10) or (11), the clamping part driving means may include a cam mechanism that allows the first clamping part and the second clamping part to relatively move in a direction in which the first clamping part and the second clamping part are separated from each other, along a smaller intersection angle of two intersection angles of an intersection angle with the third direction of the first inclined portion and an intersection angle with the third direction of each of the pair of second inclined portions.

(13) In the structural member manufacturing device according to any one of the above (10) to (12), the first clamping part may be configured to clamp the metal material sheet in advance of the second clamping part.

(14) In the structural member manufacturing device according to any one of the above (10) to (13), the structural member manufacturing device may further include a clamping member return mechanism that moves any of the first lower clamping member, the second upper clamping member, the third lower clamping member, and the fourth upper clamping member toward an original position thereof when the first clamping part and the second clamping part move toward original positions.

According to the structural member according to the aspect of the above (1) to (4), the sheet thickness ratio A satisfies the above Expression 2, so that wrinkles in the inclined portion are suppressed, and stable quality can be secured.

Further, according to the structural member manufacturing method according to the aspect of the above (5) to (9), the method includes the third process of forming the inclined portion in an unrestrained portion while increasing the area of the unrestrained portion by relatively moving the first restraining part and the second restraining part in the direction in which they are separated from each other in the second direction and the third direction, by applying a load to the first restraining part and the second restraining part. In this way, it is possible to suppress the generation of wrinkles due to the metal material sheet being compressed in a plane direction in the vicinity of a connection portion with the inclined portion. Therefore, the structural member having the first region and the inclined portion can be efficiently and stably manufactured.

Further, according to the structural member manufacturing device according to the aspect of the above (10), the inclined portion is formed by pulling the metal material sheet by relatively separating the first clamping part and the second clamping part from each other while making a position in the first direction and a position in the third direction correspond to each other. In this way, it is possible to suppress the generation of wrinkles due to the metal material sheet being compressed in a plane direction in the vicinity of a connection portion with the inclined portion. Therefore, the structural member having the first region and the inclined portion can be efficiently and stably manufactured.

In the present specification, the structural member includes a final product and an intermediate product.

In the present specification, whether the minimum intersection angle $\theta 1$ is formed in the first region or the second region of the structural member can be optionally set.

In the present specification, extending to intersect with the third direction among the first direction, the second direction, and the third direction related to the first region includes a case of being configured as a set of portions extending in various directions intersecting with the third direction (including, for example, a case of including a curved surface or a case of including irregularities, holes, or the like), in addition to a case of extending along a plane intersecting with the third direction (including a case of extending along a plane orthogonal to the third direction).

Further, the first lower clamping member and the second upper clamping member, and the third lower clamping member and the fourth upper clamping member being capable of being opened and closed with respect to one another includes various opening and closing methods such as a case where the first lower clamping member and the second upper clamping member, and the third lower clamping member and the fourth upper clamping member are opened and closed by relatively moving in the direction intersecting with the third plane that is defined from the first direction and the second direction (including the case of the third direction orthogonal to the third plane), and a case where the first lower clamping member and the second upper clamping member, and the third lower clamping member and the fourth upper clamping member are opened and closed by rotation around an axis on the base end side of each of these members.

In the present specification, the intersection angle $\theta$ with the third direction in the first plane means an intersection angle between the inclined portion and the third direction on the side where a portion corresponding to the inclined portion is deformed with respect to the first region when forming the inclined portion.

Further, according to the structural member manufacturing device according to the aspect of the above (12), since the first clamping part and the second clamping part can be relatively moved in the direction in which they are separated from each other, along a smaller intersection angle of two intersection angles of the intersection angle with the third direction of the first inclined portion and the intersection angle with the third direction of each of the pair of second inclined portions, the inclined portion of the structural member can be efficiently and stably formed while suppressing the generation of wrinkles.

As a result, the structural member having the first region and the inclined portion whose intersection angle $\theta$ changes according to a position in the second direction can be efficiently and stably manufactured.

Further, according to the structural member manufacturing device according to the aspect of the above (13), since the first clamping part is configured to clamp the metal material sheet in advance of the second clamping part, when the metal material sheet is clamped by the second clamping part, the portion corresponding to the first region of the metal material sheet is clamped by the first clamping part, and thus even if a force in a compression direction acts on the metal material sheet by the second clamping part, the generation of wrinkles due to the compression in the portion corresponding to the first region of the metal material sheet are suppressed.

As a result, the structural member can be stably manufactured while suppressing the generation of wrinkles in the first region.

Further, according to the structural member manufacturing device according to the aspect of the above (14), since the device includes the clamping member return mechanism, when the first clamping part and the second clamping part are moved toward the original position side in the third direction, any of the first lower clamping member, the second upper clamping member, the third lower clamping member, and the fourth upper clamping member is automatically returned toward the original position.

As a result, the structural member can be efficiently and stably manufactured.

Effects of the Invention

According to the structural member according to the above aspect, it is possible to secure stable quality having high strength, in which wrinkles in the inclined portion are suppressed.

Further, according to the structural member manufacturing method and the structural member manufacturing device according to each of the above aspects, since the generation of wrinkles at the time of forming the inclined portion is suppressed, the structural member can be efficiently and stably manufactured by cold deformation processing.

EMBODIMENTS OF THE INVENTION

First Embodiment

Hereinafter, a first embodiment of the present invention will be described with reference to FIGS. 1 to 10.

Figure 1:
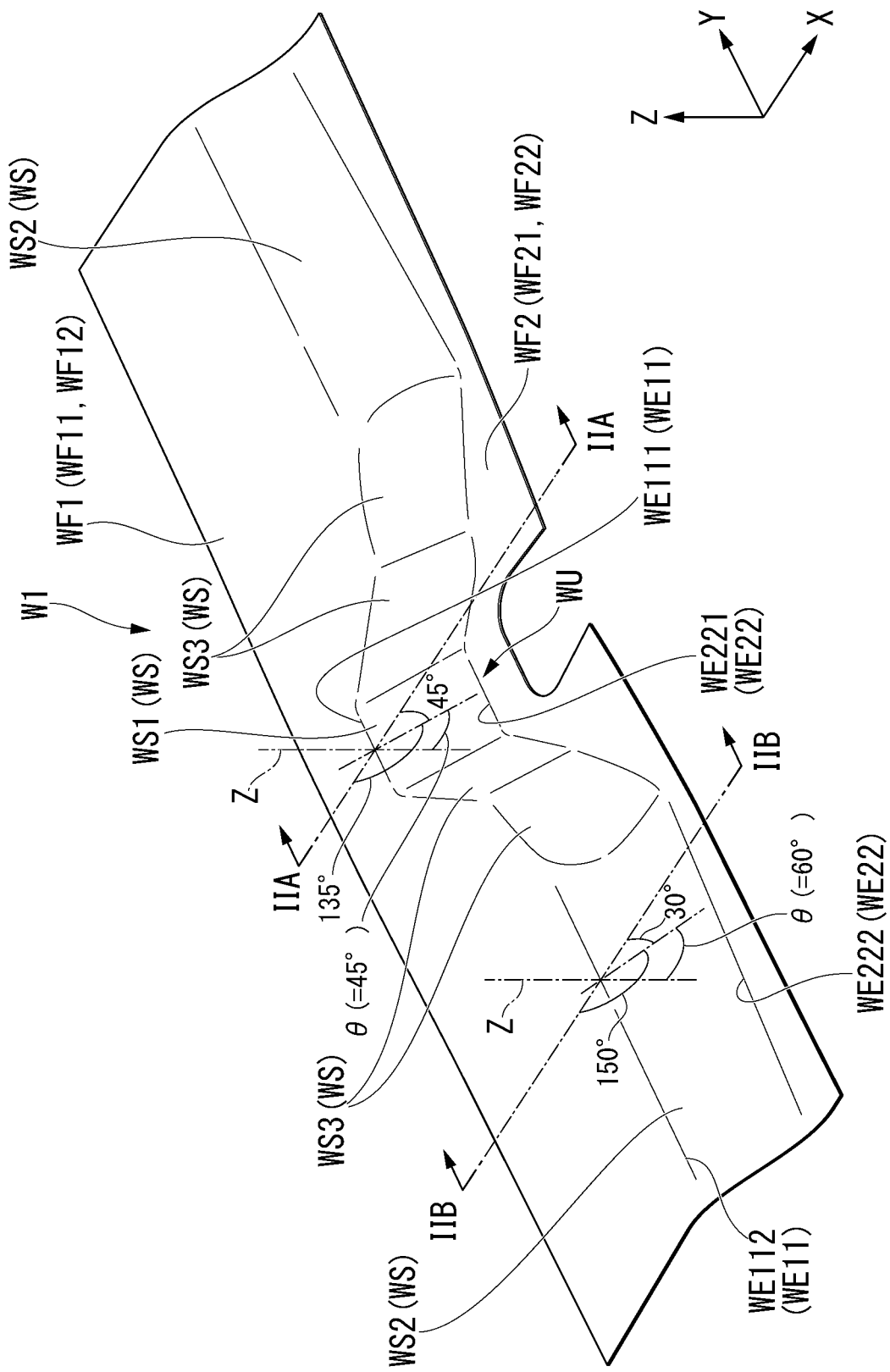
FIG. 1 is a perspective view showing a schematic configuration of a structural member according to a first embodiment of the present invention.
Figure 2A:
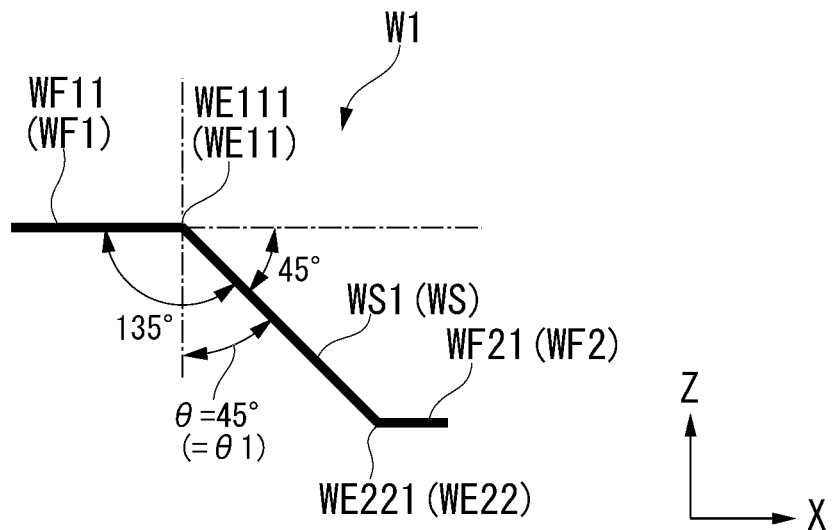
FIG. 2A is a diagram showing the structural member, and is a vertical sectional view taken along line IIA-IIA in FIG. 1 and viewed in the direction of an arrow.
Figure 2B:
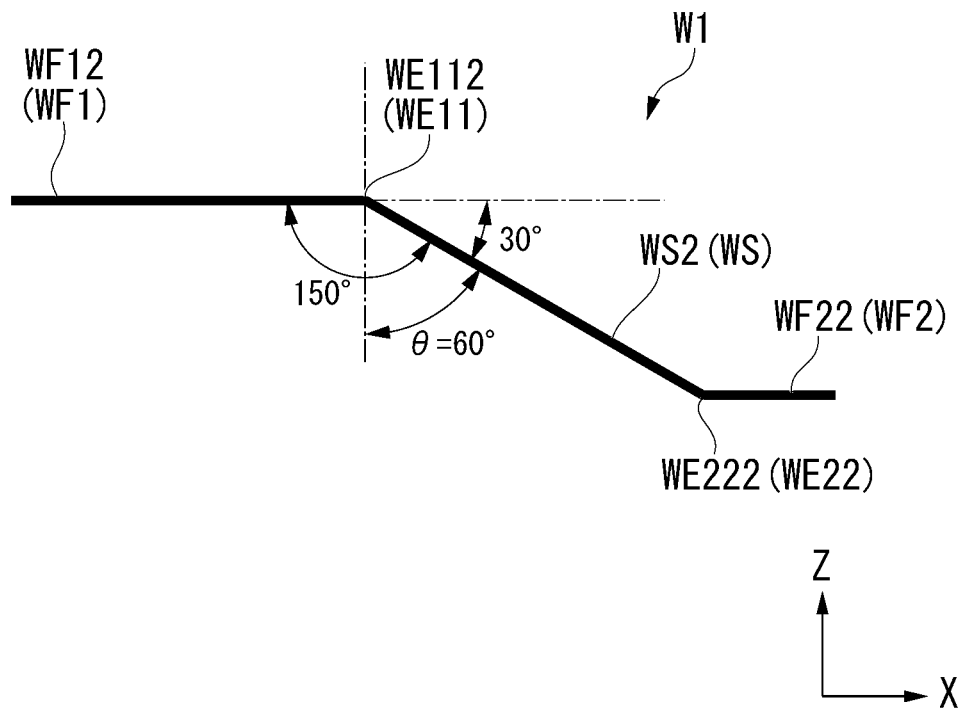
FIG. 2B is a diagram showing the structural member, and is a vertical sectional view taken along line IIB-IIB in FIG. 1 and viewed in the direction of an arrow.

FIG. 1 is a perspective view of a structural member according to this embodiment. FIG. 2A is a vertical sectional view taken along line IIA-IIA in FIG. 1 and viewed in the direction of an arrow. FIG. 2B is a vertical sectional view taken along line IIB-IIB in FIG. 1 and viewed in the direction of an arrow. In FIGS. 1, 2A, and 2B, reference symbol W1 denotes a structural member.

In this embodiment, as shown in FIG. 1, in the structural member W1, an X-axis direction (a first direction) is formed in a direction in which a first inclined portion (a specific inclined portion) WS1 intersects with a first region WF1 at the maximum intersection angle (=135°), a Y-axis direction (a second direction) is formed in a direction orthogonal to an X-axis when the structural member W1 is viewed in a plan view, and a Z-axis direction (a third direction) is formed in a height direction orthogonal to both the X-axis and the Y-axis direction. Further, a plane that is defined by the X-axis and a Z-axis is set to be a first plane, a plane that is defined by the X-axis and a Y-axis is set to be a second plane, and a plane that is defined by the Y-axis and the Z-axis is set to be a third plane.

The structural member W1 is formed, for example, by performing cold deformation processing on a steel sheet having a sheet thickness t of 1.2 mm and made of ultra high strength steel. The sheet thickness of the steel sheet is 0.8 mm or more and 2.3 mm or less. The tensile strength of the steel sheet is 780 MPa or more. The tensile strength of the steel sheet is preferably 980 MPa or more, and more preferably 1180 MPa or more.

The steel sheet is made of a cold-rolled steel sheet, and a structural member made of a cold-rolled steel sheet is advantageous in that it has higher toughness than a hot-pressed material.

In the structural member made of a cold-rolled steel sheet having tensile strength in the range of 780 MPa to 1180 MPa, a volume fraction of ferrite measured by observation with an optical microscope is 10% or more, which is different from that of the hot-pressed material in which a quenched martensite structure occupies most of the material.

Further, as shown in FIG. 1, the structural member W1 includes the first region WF1, a second region WF2, and an inclined portion WS. Each of the first region WF1, the second region WF2, and the inclined portion WS extend along the Y-axis direction. Further, the first region WF1, the inclined portion WS, and the second region WF2 are formed side by side in this order along the X-axis direction.

Further, in the structural member W1, as shown in FIG. 1, a substantially channel-shaped recessed part WU that has a first inclined portion (specific inclined portion) WS1, which is recessed along the X-axis direction and the Z-axis direction with respect to a second inclined portion WS2, as a bottom surface thereof, and is widened from the first region WF1 toward the second region WF2 side is formed at the center portion in the Y-axis direction.

Further, in the inclined portion WS, residual tensile stress is formed in the direction orthogonal to the Y-axis direction.

In this embodiment, the first region WF1 extends in the direction orthogonal to, for example, the Z-axis direction, and is specifically formed in a planar shape along the second plane that is defined by the X-axis and the Y-axis. Further, a recessed part recessed toward the side opposite to the second region WF2 in the X-axis direction is formed in the center portion along the Y-axis direction of the first region WF1.

In this embodiment, the second region WF2 extends in the direction orthogonal to, for example, the Z-axis direction, and is specifically formed in a planar shape along the second plane that is defined by the X-axis and the Y-axis. Further, a recessed part (a notch) recessed toward the inclined portion WS side is formed in the center portion along the Y-axis direction of the second region WF2.

The inclined portion WS is disposed between the first region WF1 and the second region WF2, and is inclined with respect to the first region WF1 and the second region WF2.

Further, the inclined portion WS is connected to the first region WF1 at a first region-side connection portion (a first ridge) WE11 and connected to the second region WF2 at a second region-side connection portion (a second ridge) WE22.

The first region-side connection portion WE11 has a convex shape whose center portion protrudes in the direction of the first region WF1. The second region-side connection portion WE22 has a convex shape whose center portion protrudes on the side opposite to the second region WF2.

The inclined portion WS includes the first inclined portion (the specific inclined portion) WS1, the second inclined portion WS2, and a third inclined portion WS3. Specifically, the inclined portion WS includes a pair of second inclined portions WS2, each of which is located on the side of each of both end portions in the second direction, a pair of third inclined portions WS3, each of which is connected to each of the pair of second inclined portions WS2, and the first inclined portion WS1 which is connected to both of the pair of third inclined portions WS3. The second inclined portion WS2, the third inclined portion WS3, the first inclined portion WS1, the third inclined portion WS3, and the second inclined portion WS2 are formed in this order along the Y-axis direction.

In the inclined portion WS, an intersection angle with the third direction in the first plane that is defined by the first direction and the third direction changes according to a position in the second direction. Further, in the inclined portion WS, an intersection angle with the first direction in the second plane that is defined by the first direction and the second direction changes according to a position in the second direction.

The first region-side connection portion WE11 is connected to the first region WF1 and extends in the second direction. The second region-side connection portion WE22 is formed at an end portion of the inclined portion WS on the side opposite to the first region WF1 in the first direction, and extends along the second direction.

The second region WF2 is connected through the second ridge and extends to intersect with the third direction.

The width along the X-axis direction of the first region WF1 is formed such that a portion that is connected to the first inclined portion (the specific inclined portion) WS1 is narrow and a portion that is connected to the second inclined portion WS2 is wider than it.

In the width along the X-axis direction of the second region WF2, a portion that is connected to the first inclined portion (the specific inclined portion) WS1 is wide and a portion that is connected to the second inclined portion WS2 is narrower than it.

As shown in FIGS. 1 and 2A, the first inclined portion WS1 (WS) is connected to the first region WF11 (WF1) by the first region-side connection portion WE111 (WE11) at the center portion in the Y-axis direction, and connected to the second region WF21 (WF2) by the second region-side connection portion WE221 (WE22).

As shown in FIGS. 1 and 2A, the first inclined portion WS1 (WS) is formed such that an intersection angle θ with the Z-axis direction in the first plane is 45° (it intersects the X-axis at 135° on the first region WF1 side and at 45° on the second region WF2 side).

The intersection angle θ (=45°) in the first inclined portion WS1 (WS) is regarded as the minimum intersection angle θ1 that is formed by the inclined portion WS and the Z-axis direction (the third direction) in the Y-axis direction (the second direction).

As shown in FIGS. 1 and 2B, the second inclined portion WS2 (WS) is connected to the first region WF12 (WF1) through the first region-side connection portion WE112 (WE11) and connected to the second region WF22 (WF2) through the second region-side connection portion WE222 (WE22), at both side portions in the Y-axis direction.

Since the steel sheet has been subjected to cold deformation processing, the ridge portion is work-hardened, so that when the minimum value of the Vickers hardness of the sheet thickness surface of the first region WF1 is set to be Hv11 and the maximum value of the Vickers hardness of the sheet thickness surface of the first region-side connection portion WE11 is set to be Hv12, the relationship, Hv12 1.1×Hv11, is established.

On the other hand, for the same reason, when the minimum value of the Vickers hardness of the sheet thickness surface of the second region WF2 is set to be Hv21 and the maximum value of the Vickers hardness of the sheet thickness surface of the second region-side connection portion WE22 is set to be Hv22, the relationship, Hv22≥1.1×Hv21, is established.

The above relationships are established for both the outside (the surface visible in FIG. 1) and the inside of the sheet thickness surface.

A method of measuring the maximum value and the minimum value of the Vickers hardness here is to fabricate vertical cross-sectional optical microscope sample according to JIS Z 2244 (2009), measure 10 points with a load of 1 kgF (9.807N) at a position of 200 μm directly below a sheet thickness surface, and obtain the maximum value and the minimum value as the Vickers hardness of the sheet thickness surface.

Since the ridge portion is work-hardened by the cold deformation processing in this manner, for example, in a case of being applied as an automobile member that protects an occupant at the time of a collision, compared to a case where the ridge portion is not work-hardened, a reaction force against a collision load becomes larger, so that collision safety can be improved.

As shown in FIGS. 1 and 2B, the second inclined portion WS2 (WS) is formed such that the intersection angle θ with the Z-axis direction in the first plane is 60° (it intersects the X-axis at 150° on the first region WF1 side and at 30° on the second region WF2 side).

As shown in FIG. 1, the inclined portion WS3 is formed such that the dimension in the X-axis direction increases as it approaches the second inclined portion WS2 from the first inclined portion WS1.

Further, in the first plane, the Z-axis direction and the inclined portion WS3 are formed so as to intersect each other at the intersection angle θ in the range of 45° to 60°.

Further, the third inclined portion WS3 configures the substantially channel-shaped recessed part WU of the structural member W1 together with the first inclined portion WS1.

That is, the intersection angle with the third direction of each of the pair of third inclined portions WS3 is in the range between the intersection angle with the third direction of the first inclined portion WS1 and the intersection angle with the third direction of each of the pair of second inclined portions WS2.

The difference between the intersection angle with the third direction of the first inclined portion WS1 and the intersection angle with the third direction of each of the pair of second inclined portions WS2 is 8.0° or more, preferably 11° or more, and more preferably 15° or more.

Next, a schematic configuration of a structural member manufacturing die (a structural member manufacturing device) 100 according to this embodiment will be described with reference to FIGS. 3 to 6D.

Figure 3:
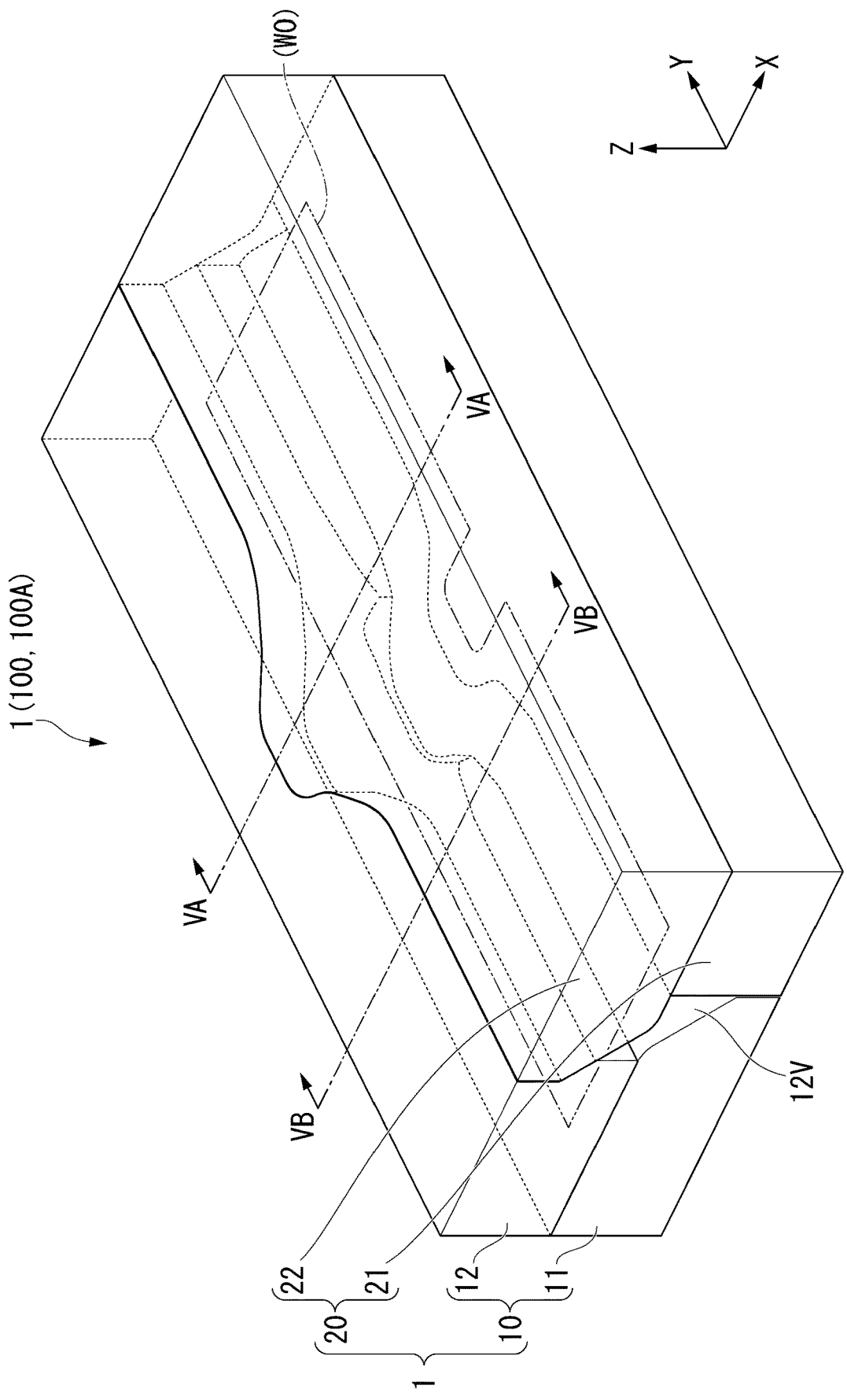
FIG. 3 is a perspective view showing a schematic configuration of a forming part of a structural member manufacturing die that is used for manufacturing the structural member and structural members according to a second embodiment and a third embodiment (described later).
Figure 4:
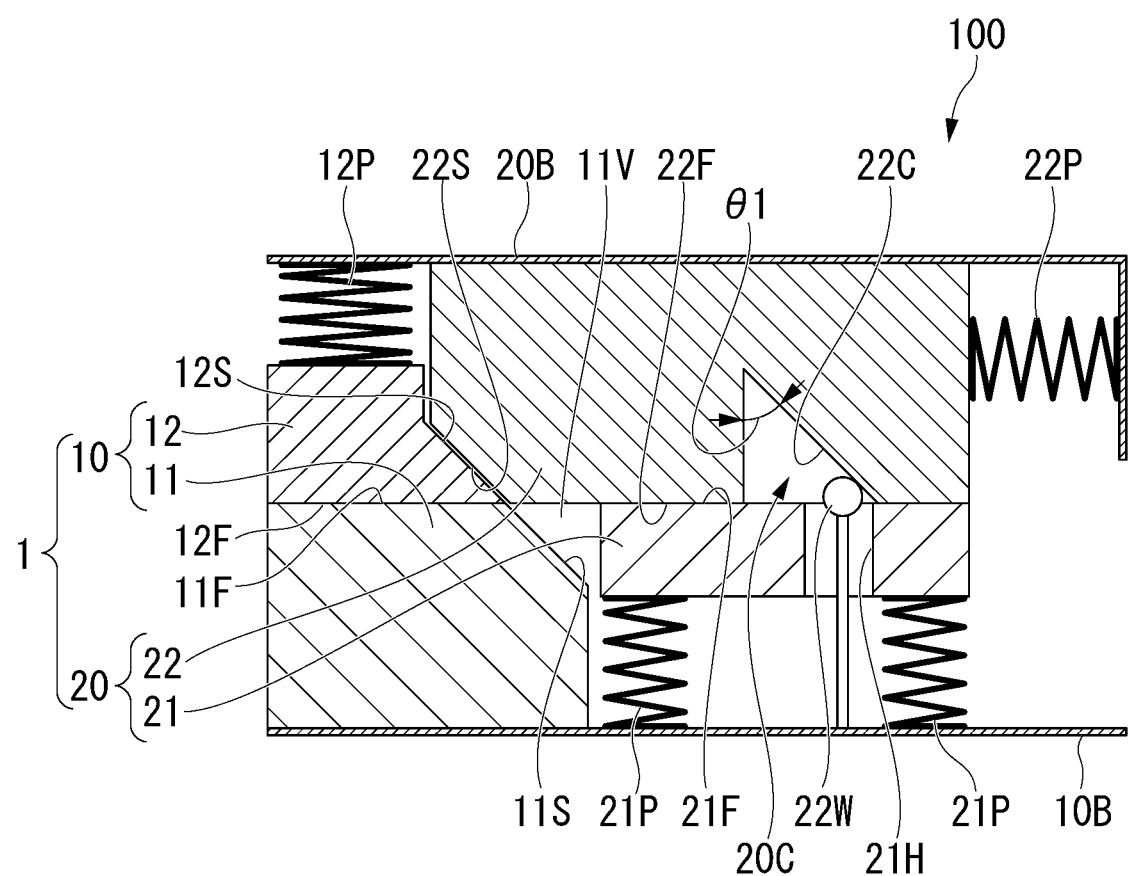
FIG. 4 is a vertical sectional view showing a schematic configuration of the structural member manufacturing die.
Figure 5A:
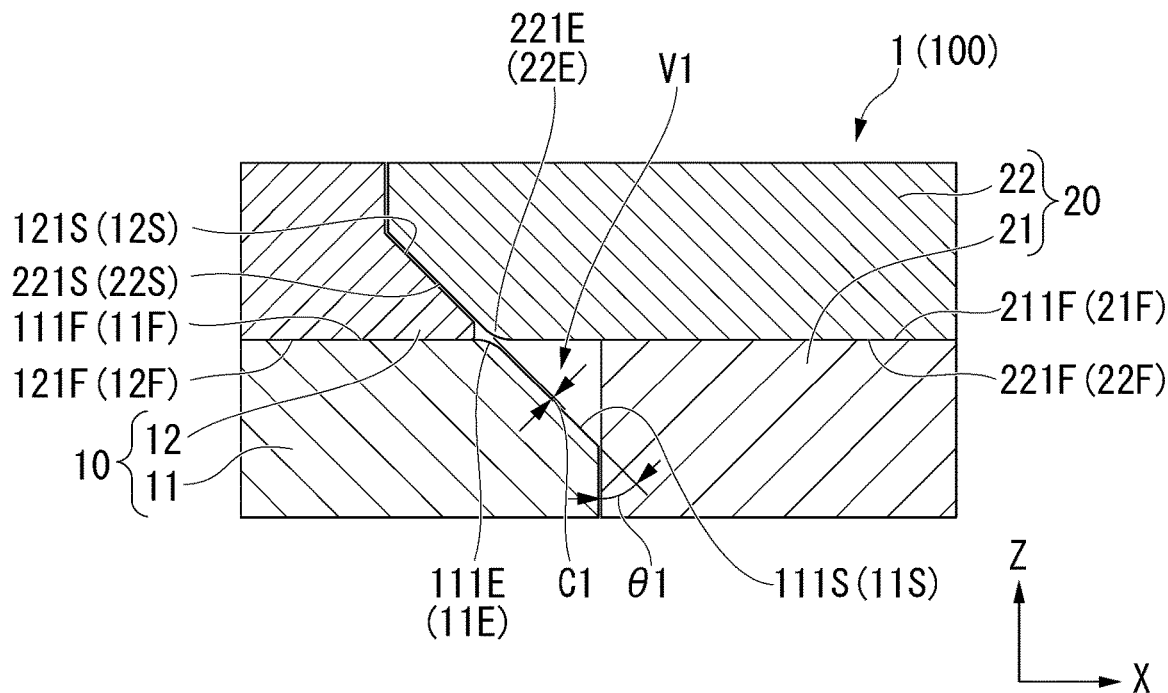
FIG. 5A is a diagram showing a schematic configuration of a forming part according to the first embodiment, and is a vertical sectional view taken along line VA-VA in FIG. 3 and viewed in the direction of an arrow.
Figure 5B:
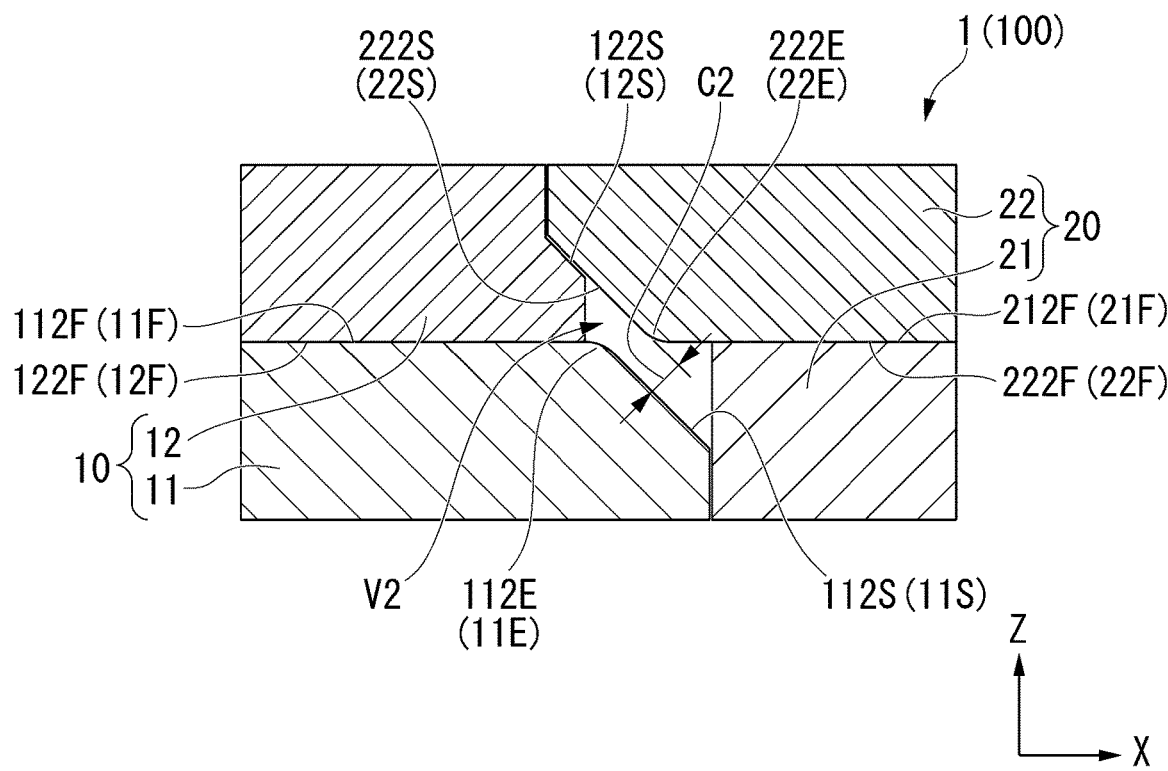
FIG. 5B is a diagram showing the schematic configuration of the forming part according to the first embodiment, and is a vertical sectional view taken along line VB-VB in FIG. 3 and viewed in the direction of an arrow.

FIG. 3 is a perspective view showing the schematic configuration of a forming part of the structural member manufacturing die that is used for manufacturing the structural member according to this embodiment, and reference symbol 100 denotes the structural member manufacturing die. Further, FIG. 4 is a vertical sectional view showing the schematic configuration of the structural member manufacturing die 100 according to this embodiment. FIGS. 5A and 5B are vertical sectional views showing the schematic configuration of the forming part configuring the structural member manufacturing die according to this embodiment. FIG. 5A is a vertical sectional view taken along line VA-VA in FIG. 3 and viewed in the direction of an arrow. FIG. 5B is a vertical sectional view taken along line VB-VB in FIG. 3 and viewed in the direction of an arrow.

The structural member manufacturing die 100 includes a lower die (a fixed die) and an upper die (a movable die). The structural member manufacturing die 100 is mounted to a forming press apparatus (not shown) to configure a structural member manufacturing device, and performs deformation processing on a metal material sheet to manufacture the structural member W1.

As shown in FIGS. 3 and 4, for example, the structural member manufacturing die 100 includes a first clamping part 10, a second clamping part 20, a cam mechanism (clamping part driving means) 20C, coil springs (clamping member return mechanism) 12P, 21P, and 22P, a lower die base 10B, and an upper die base 20B. The first clamping part 10 and the second clamping part 20 are made to be movable relative to each other along the Z-axis direction. In this embodiment, two (a pair) coil springs 21P are provided. The first clamping part 10 and the second clamping part 20 configure a forming part 1.

In this embodiment, the lower die includes the lower die base 10B, a first lower clamping member (a first restraining part) 11, a third lower clamping member 21, and the coil spring 21P. The first lower clamping member 11, the third lower clamping member 21, and the coil spring 21P are disposed with respect to the lower die base 10B.

Further, the upper die includes the upper die base 20B, a second upper clamping member 12, a fourth upper clamping member 22, and the coil springs 12P and 22P. The second upper clamping member 12, the fourth upper clamping member 22, and the coil springs 12P and 22P are disposed with respect to the upper die base 20B.

The first clamping part 10 includes the first lower clamping member (the first restraining part) 11 and the second upper clamping member 12. The first lower clamping member 11 and the second upper clamping member 12 can be opened and closed with respect to one another along the Z-axis direction.

In the first lower clamping member (the first restraining part) 11, a first clamping surface 11F is formed on the second upper clamping member 12 side, and an inclined portion 11S is formed on the second clamping part 20 side.

Further, in the second upper clamping member 12, a second clamping surface 12F facing the first clamping surface 11F is formed, and an inclined portion 12S is formed on the second clamping part 20 side.

The first clamping surface 11F and the second clamping surface 12F can clamp a blank steel sheet W0.

The second clamping part 20 includes the third lower clamping member 21 and the fourth upper clamping member (the second restraining part) 22. The third lower clamping member 21 and the fourth upper clamping member 22 can be opened and closed with respect to one another along the Z-axis direction.

In the third lower clamping member 21, a third clamping surface 21F is formed on the fourth upper clamping member (the second restraining part) 22 side.

Further, in the fourth upper clamping member (the second restraining part) 22, a fourth clamping surface 22F facing the third clamping surface 21F is formed, and an inclined portion 22S is formed on the first clamping part 10 side.

The third clamping surface 21F and the fourth clamping surface 22F can clamp the blank steel sheet W0.

The cam mechanism 20C includes a cam-shaped portion 22C and a cam follower 22W. The cam follower 22W is fixed to the lower die base 10B and can come into contact with the cam-shaped portion 22C through a through-hole 21H formed in the third lower clamping member 21.

The cam-shaped portion 22C is formed on the fourth upper clamping member 22. The cam-shaped portion 22C is regarded as an inclined surface whose intersection angle with the Z-axis direction, which is a direction that is separated from the first clamping part 10 as it approaches the third lower clamping member 21, is equal to the minimum intersection angle $\theta 1$. As a result, when the fourth upper clamping member 22 approaches the lower die base 10B in the Z-axis direction, the fourth upper clamping member 22 moves along the cam-shaped portion 22C.

The coil spring (the clamping member return mechanism) 12P is disposed between the upper die base 20B and the second upper clamping member 12. The coil spring 12P biases the second upper clamping member 12 toward the first lower clamping member 11 side in a case where the second upper clamping member 12 clamps the blank steel sheet W0 in cooperation with the first lower clamping member 11, and returns the second upper clamping member 12 to the original position in the Z-axis direction in a free state.

The coil spring (the clamping member return mechanism) 21P is disposed between the lower die base 10B and the third lower clamping member 21. The coil spring 21P biases the third lower clamping member 21 toward the fourth upper clamping member 22 side in a case where the third lower clamping member 21 clamps the blank steel sheet W0 in cooperation with the fourth upper clamping member 22, and returns the third lower clamping member 21 to the original position in the Z-axis direction in a free state.

The coil spring (the clamping member return mechanism) 22P is disposed between the side plate of the upper die base 20B and the fourth upper clamping member 22. The coil spring 22P biases the fourth upper clamping member 22 toward the second upper clamping member 12 side when the fourth upper clamping member 22 moves in the X-axis direction, and returns the fourth upper clamping member 22 to the original position in the X-axis direction in a free state.

In the structural member manufacturing die 100, in the longitudinal section taken along line VA-VA of FIG. 3 and viewed in the direction of an arrow, as shown in FIG. 5A, a first region-side edge portion (a first clamping edge portion) 111E (11E) is formed at a corner portion where the first clamping surface 111F (11F) and the inclined portion 11S are connected. A second region-side edge portion (a second clamping edge portion) 221E (22E) is formed at a corner portion where the fourth clamping surface 221F (22F) and the inclined portion 22S are connected. Then, the first region-side edge portion 111E forms the first inclined portion WS1 and the first region-side connection portion WE111 (WE11) of the structural member W1. The second region-side edge portion 221E forms the first inclined portion WS1 and the second region-side connection portion WE221 (WE22) of the structural member W1.

In the structural member manufacturing die 100, in the longitudinal section taken along line VB-VB of FIG. 3 and viewed in the direction of an arrow, as shown in FIG. 5B, a first region-side edge portion (a first clamping edge portion) 112E (11E) is formed at a corner portion where the first clamping surface 112F (11F) and the inclined portion 11S are connected. A second region-side edge portion (a second clamping edge portion) 222E (22E) is formed at a corner portion where the fourth clamping surface 222F (22F) and the inclined portion 22S are connected.

Then, the first region-side edge portion 112E forms the second inclined portion WS2 and the first region-side connection portion WE112 (WE11) of the structural member W1. The second region-side edge portion 222E forms the second inclined portion WS2 and the second region-side connection portion WE222 (WE22) of the structural member W1.

As shown in FIG. 5A, a space V1 is formed between the first lower clamping member 11, the second upper clamping member 12, the third lower clamping member 21, and the fourth upper clamping member 22. An interval C1 (mm) between the first lower clamping member 11 and the fourth upper clamping member 22 is regarded as being 1.03 times or more and 1.07 times or less the sheet thickness t (mm) of the blank steel sheet W0.

Further, as shown in FIG. 5B, a space V2 is formed between the first lower clamping member 11, the second upper clamping member 12, the third lower clamping member 21, and the fourth upper clamping member 22. An interval C2 between the first lower clamping member 11 and the fourth upper clamping member 22 is regarded as being about 70 mm.

Next, the operation of the structural member manufacturing die 100 according to the first embodiment will be described with reference to FIGS. 6A to 6D. For convenience, the blank steel sheet W0, the structural member W1, and the like are not shown in FIGS. 6A to 6D.

(A) Forming Preparation (Original Position)

First, the structural member manufacturing die 100 is mounted to the forming press apparatus (not shown), and the upper die is located at the top dead point.

Figure 6A:
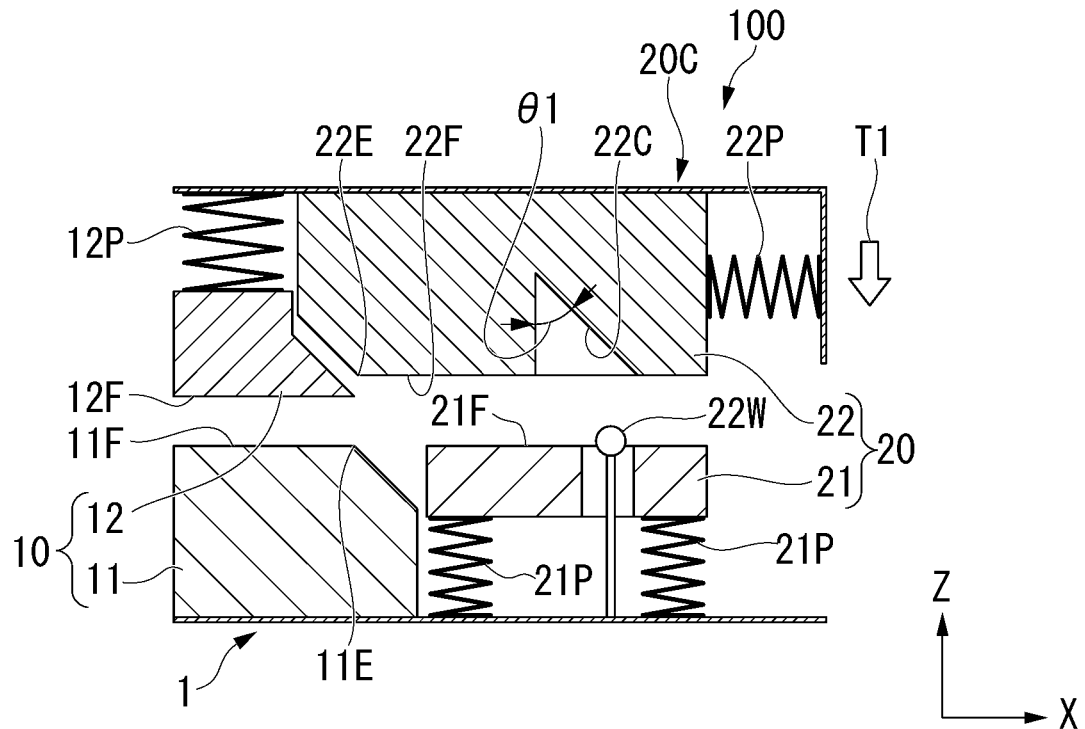
FIG. 6A is a diagram showing the operation of the structural member manufacturing die in a manufacturing process of the structural member according to the first embodiment, and is a vertical sectional view showing a forming preparation state in which an upper die is disposed at a top dead point in the manufacturing process.

When the upper die is located at the top dead point, as shown in FIG. 6A, the first clamping part 10 and the second clamping part 20 are at the original positions, and the second clamping surface 12F of the second upper clamping member 12 is located on the lower side than the fourth clamping surface 22F of the fourth upper clamping member 22.

(B) Upper Die Lowering (Clamping of Portions Corresponding to First Region and Inclined Portion)

Next, as shown in FIG. 6A, the upper die is lowered in the direction of an arrow T1 (to the lower side in the Z-axis direction). When the upper die is lowered, first, the second clamping surface 12F of the second upper clamping member 12 clamps the portion corresponding to the first region.

Figure 6B:
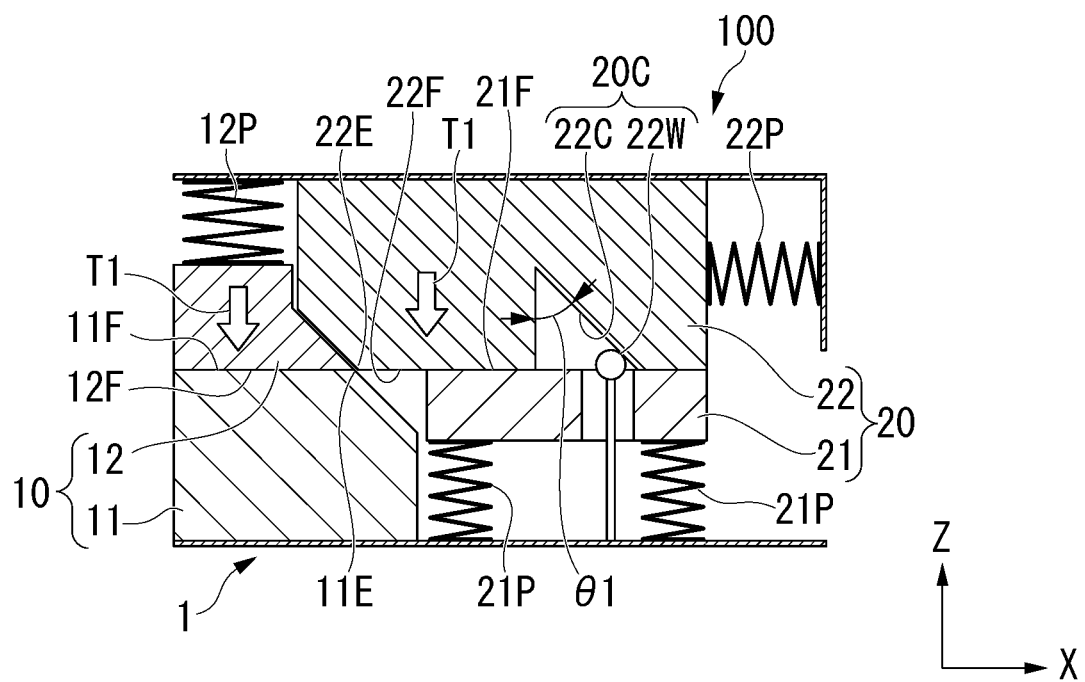
FIG. 6B is a diagram showing the operation of the structural member manufacturing die in the manufacturing process of the structural member according to the first embodiment, and is a vertical sectional view showing a state where the upper die is lowered to clamp a portion corresponding to the first region and a portion corresponding to the inclined portion.

Subsequently, as shown in FIG. 6B, the upper die is further lowered in the direction of the arrow T1 (to the lower side in the Z-axis direction), so that the portion corresponding to the inclined portion is clamped by the fourth clamping surface 22F of the fourth upper clamping member (the second restraining part) 22.

In this manner, the second upper clamping member 12 clamps the blank steel sheet W0 (not shown) earlier than the fourth upper clamping member 22, and after the second upper clamping member 12 clamps the blank steel sheet W0, the upper die is further lowered, and the coil spring (the clamping member return mechanism) 12P is compressed, so that the portion corresponding to the inclined portion of the blank steel sheet W0 is clamped.

Then, the cam follower 22W comes into contact with the cam-shaped portion 22C at a timing when the first lower clamping member 11 and the second upper clamping member 12, and the third lower clamping member 21 and the fourth upper clamping member 22 come into contact with each other.

In this state, the clamping force of the first region WF1 by the first clamping part 10 (the first clamping surface 11F of the first lower clamping member 11 and the second clamping surface 12F of the second upper clamping member 12) based on the coil spring 12P is set so as to be larger than the clamping force of a portion WF0 corresponding to the inclined portion by the second clamping part 20 based on the coil spring 21P.

(C) Second Clamping Part Lowering (Inclined Portion Forming)

Figure 6C:
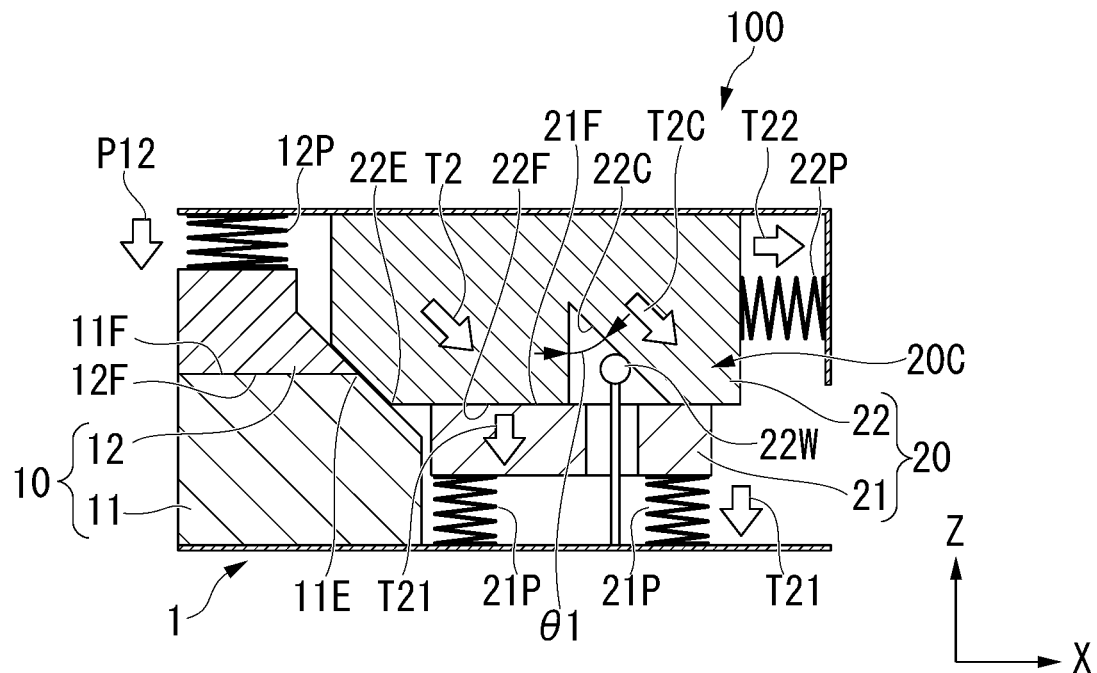
FIG. 6C is a diagram showing the operation of the structural member manufacturing die in the manufacturing process of the structural member according to the first embodiment, and is a vertical sectional view showing a state where a second clamping part is lowered to form the inclined portion while pulling it.

Subsequently, as shown in FIG. 6C, the second clamping part 20 is further lowered toward the lower side in the Z-axis direction.

At this time, the third lower clamping member 21 is lowered in the direction of an arrow T21 (to the lower side in the Z-axis direction). At the same time, the fourth upper clamping member 22 is moved in the direction of an arrow T2 by the action of the cam mechanism 20C guiding the fourth upper clamping member 22 in the direction of an arrow T2C.

Each of the arrows T2C and T2 is a direction along the inclination angle (θ1) of the first inclined portion WS1 of the structural member W1.

When the third lower clamping member 21 moves in the direction of the arrow T21, the coil spring 21P is compressed to bias the third lower clamping member 21 upward.

Further, the fourth upper clamping member 22 moves in the direction of the arrow T2, so that the coil spring 22P is compressed in the direction of an arrow T22, and the fourth upper clamping member 22 is biased on the side opposite to the moving direction.

Then, the blank steel sheet W0 clamped by the second clamping part 20 (the third clamping surface 21F of the third lower clamping member 21 and the fourth clamping surface 22F of the fourth upper clamping member 22) is pulled, so that it is formed while being drawn from the second clamping part 20.

While the second clamping part 20 is lowered (the inclined portion is formed), the clamping force of the first region WF1 by the first clamping part 10 (the first clamping surface 11F of the first lower clamping member 11 and the second clamping surface 12F of the second upper clamping member 12) through the coil spring 12P is set so as to be maintained larger than the clamping force of the portion WF0 corresponding to the inclined portion by the second clamping part 20 through the coil spring 21P.

(D) Forming Completion (Bottom Dead Point)

Figure 6D:
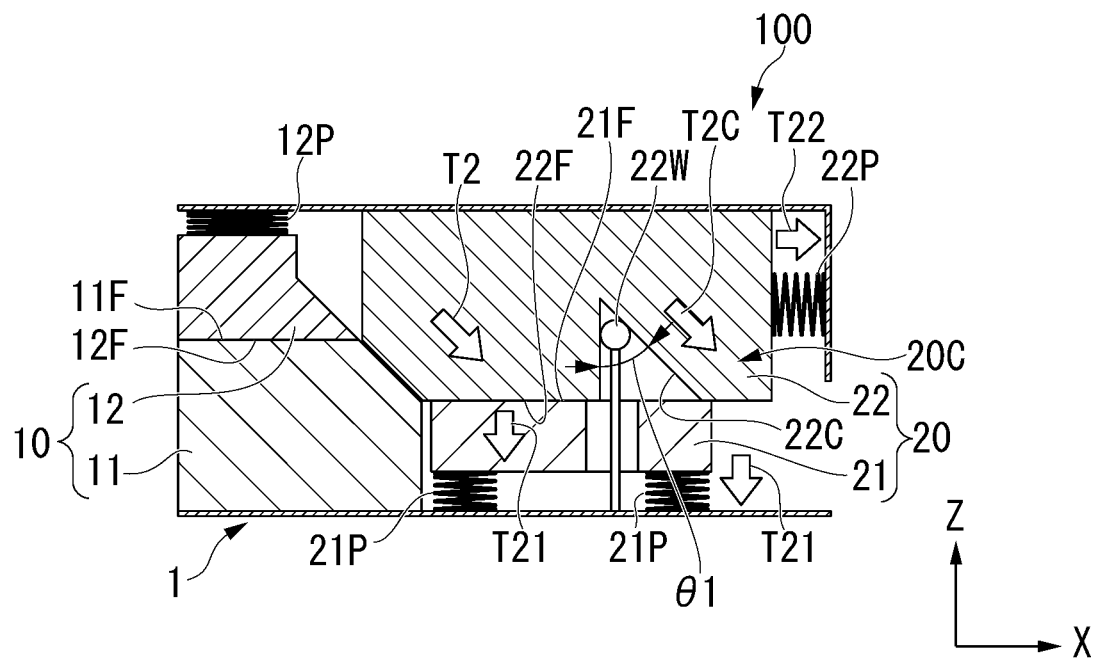
FIG. 6D is a diagram showing the operation of the structural member manufacturing die in the manufacturing process of the structural member according to the first embodiment, and is a vertical sectional view showing a state where the second clamping part is lowered to a bottom dead point in the manufacturing process, so that the forming of the structural member is completed.

Subsequently, as shown in FIG. 6D, the upper die is further lowered to the lowering end in the direction of the arrow T21 (to the lower side in the Z-axis direction) to complete the forming of the structural member W1.

Then, the upper die is raised by the forming press apparatus to open the structural member manufacturing die 100, and the structural member W1 (not shown) is taken out.

At this time, the first lower clamping member 11 is returned to the original position by the coil spring 12P, the third lower clamping member 21 is returned to the original position by the coil spring 21P, and the fourth upper clamping member 22 is returned to the original position by the coil spring 22P.

Next, the forming of the structural member W1 by the structural member manufacturing die 100 according to the first embodiment will be described with reference to FIGS. 7A to 7C and 8A to 8C.

FIGS. 7A to 7C and 8A to 8C are diagrams showing the outline of the manufacturing process in the cross sections shown in FIGS. 2A and 2B.

Figure 7A:
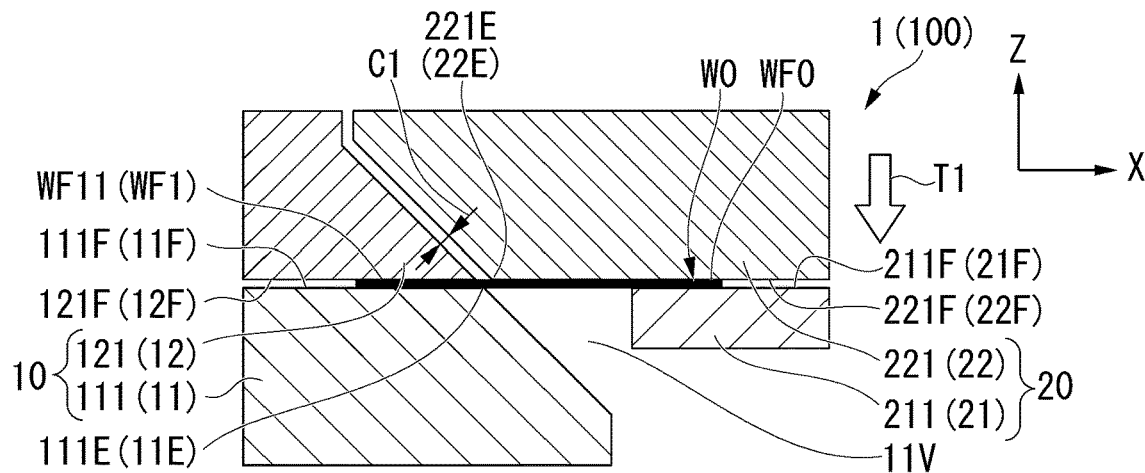
FIG. 7A is a diagram showing the manufacturing process in the longitudinal section shown in FIG. 2A of the structural member according to the first embodiment, and is a vertical sectional view showing a state where the upper die is lowered to clamp the portions corresponding to the first region and the inclined portion.
Figure 7B:
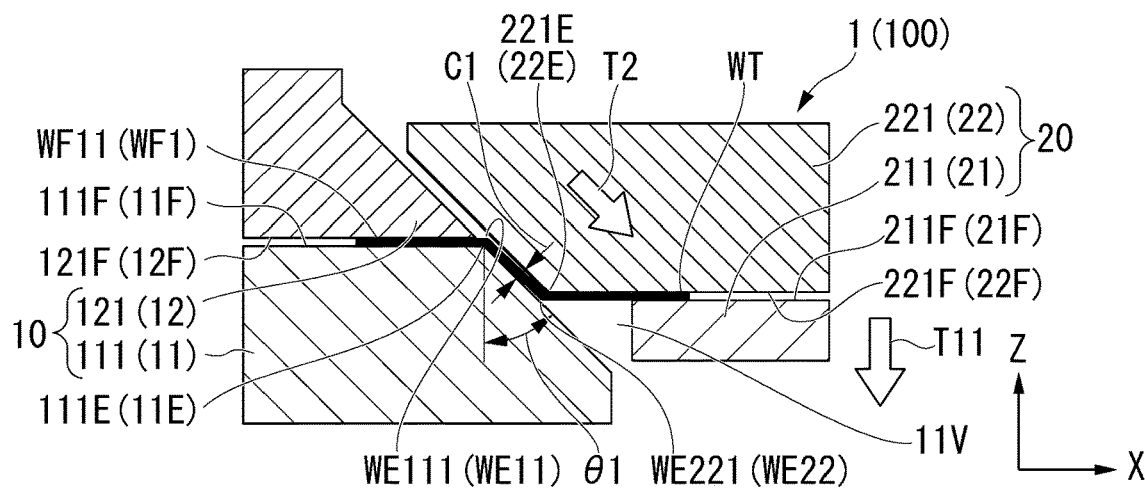
FIG. 7B is a diagram showing the manufacturing process in the cross section shown in FIG. 2A of the structural member according to the first embodiment, and is a vertical sectional view showing a state where the second clamping part is lowered to form the inclined portion while pulling it.
Figure 7C:
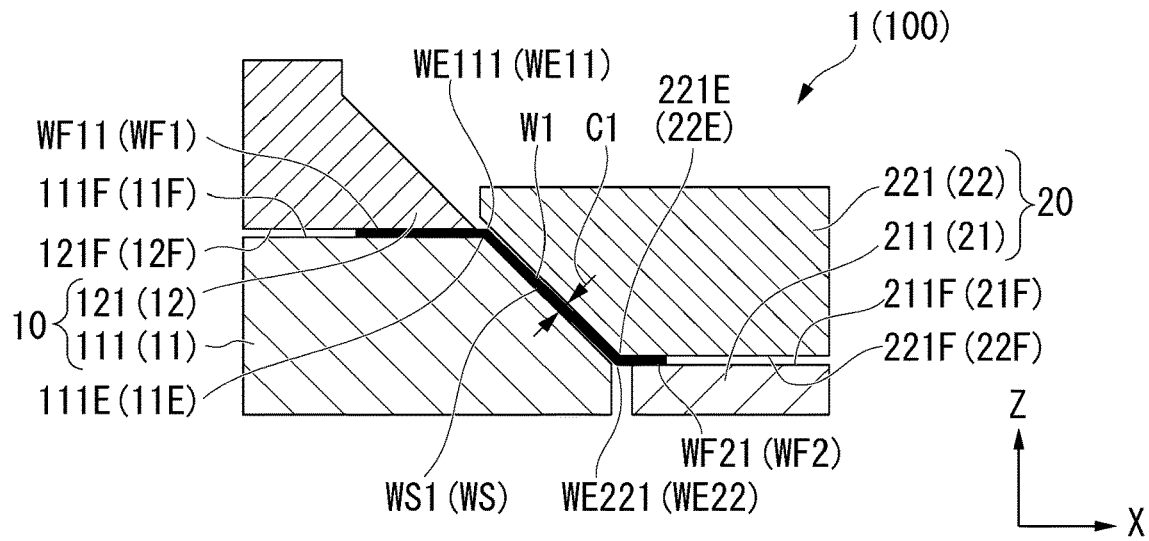
FIG. 7C is a diagram showing the manufacturing process in the cross section shown in FIG. 2A of the structural member according to the first embodiment, and is a vertical sectional view showing a state where the second clamping part is lowered to the bottom dead point, so that the forming of the structural member is completed.
Figure 8A:
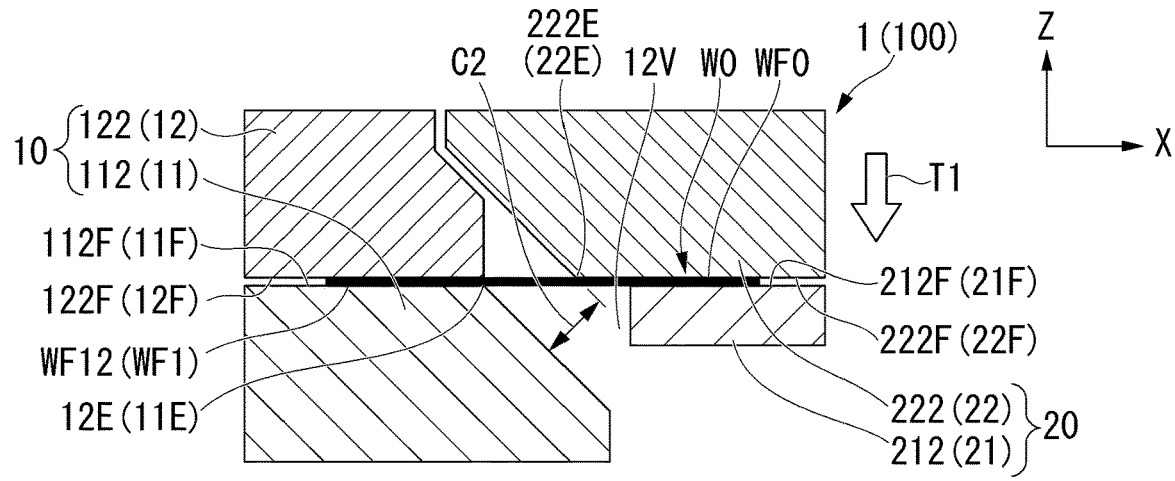
FIG. 8A is a diagram showing the manufacturing process in the cross section shown in FIG. 2B of the structural member according to the first embodiment, and is a vertical sectional view showing a state where the upper die is lowered to clamp the portions corresponding to the first region and the inclined portion.
Figure 8B:
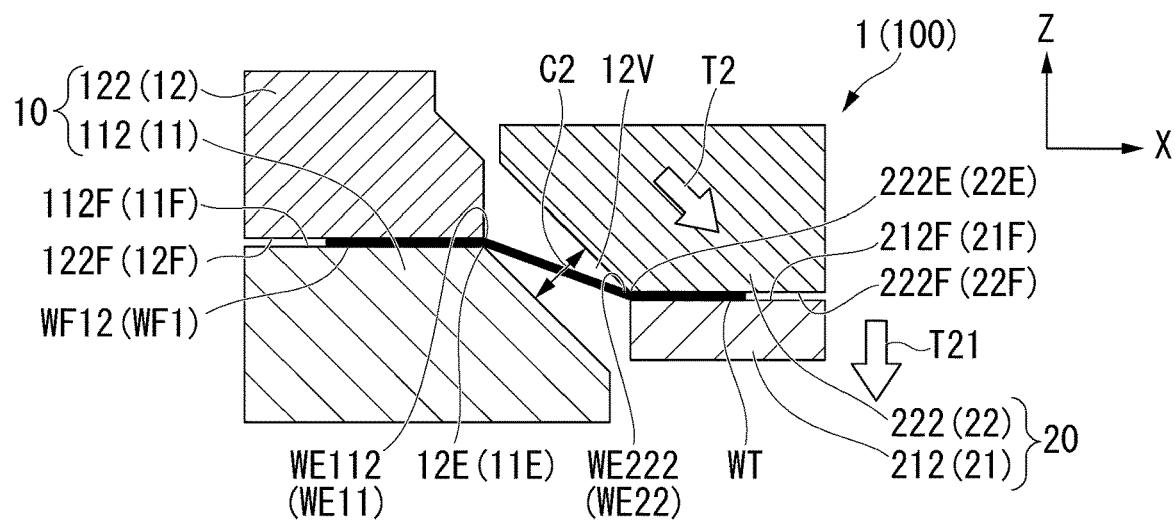
FIG. 8B is a diagram showing the manufacturing process in the cross section shown in FIG. 2B of the structural member according to the first embodiment, and is a vertical sectional view showing a state where the second clamping part is lowered to form the inclined portion while pulling it.
Figure 8C:
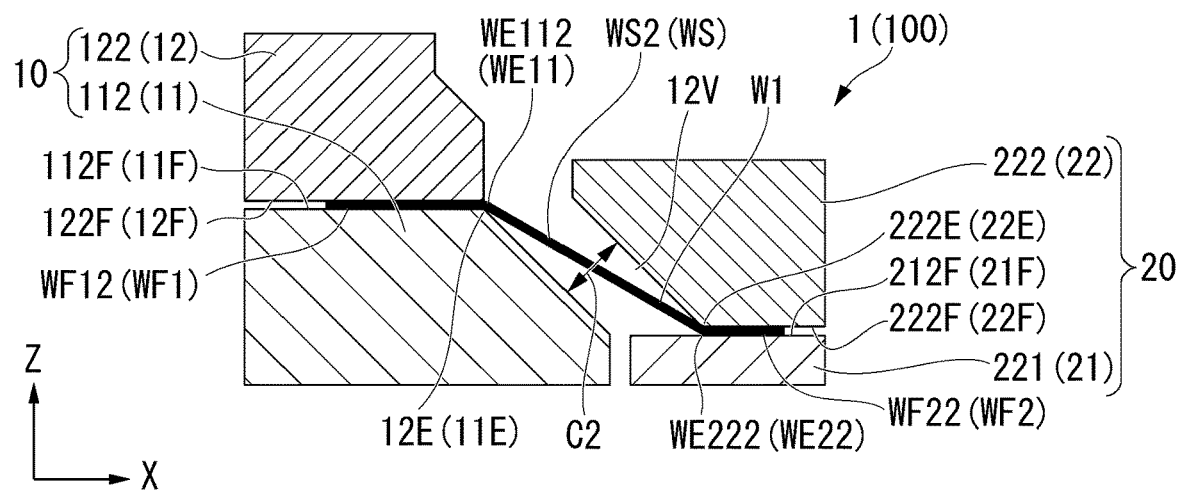
FIG. 8C is a diagram showing the manufacturing process in the cross section shown in FIG. 2B of the structural member according to the first embodiment, and is a vertical sectional view showing a state where the second clamping part is lowered to the bottom dead point, so that the forming of the structural member is completed.

FIGS. 7A and 8A are diagrams showing a state where the upper die of the structural member manufacturing die 100 is lowered to clamp the portions corresponding to the first region and the inclined portion. FIGS. 7B and 8B are diagrams showing a state where the second clamping part is lowered to form the inclined portion while pulling it. FIGS. 7C and 8C are diagrams showing a state where the upper die of the structural member manufacturing die 100 is lowered to the bottom dead point to complete the forming of the structural member W1.

First, the outline of the manufacturing process of the structural member W1 in the cross section shown in FIG. 2A will be described with reference to FIGS. 7A to 7C.

The material and thickness of the blank steel sheet W0 do not need to be limited. However, a particularly large effect can be obtained with respect to, for example, a thin steel sheet in which wrinkles and cracks easily occur in the drawing of the steel sheet having tensile strength of 980 MPa or more and a sheet thickness in a range of 0.6 mm to 3.2 mm.

(A) Upper Die Lowering (Clamping of Portions Corresponding to First Region and Inclined Portion)

First, the blank steel sheet W0 is disposed in the structural member manufacturing die 100.

Then, as shown in FIG. 7A, the upper die is lowered in the direction of the arrow T1 by the forming press apparatus (not shown), so that the portion corresponding to the first region WF11 (WF1) of the blank steel sheet W0 is clamped by the first clamping surface 111F (11F) and the second clamping surface 121F (12F) of the first clamping part 10 and the portion WF0 corresponding to the inclined portion of the blank steel sheet W0 is clamped by the third clamping surface 211F (21F) and the fourth clamping surface 221F (22F) of the second clamping part 20.

At this time, the clamping of the portion corresponding to the first region WF11 (WF1) by the first clamping surface 111F (11F) and the second clamping surface 121F (12F) is performed earlier than (in advance of) the clamping of the portion WF0 corresponding to the inclined portion by the third clamping surface 211F (21F) and the fourth clamping surface 221F (22F).

(B) Second Clamping Part Lowering (Inclined Portion Forming)

Next, as shown in FIG. 7B, the upper die is further lowered in a state where the movement of the first clamping part 10 is stopped and the portion correspond to the first region WF11 (WF1) is clamped by the first clamping surface 111F (11F) and the second clamping surface 121F (12F). Then, the third lower clamping member 211 (21) is lowered in the direction of an arrow T11, and the fourth upper clamping member (the second restraining part) 221 (22) is moved in the direction of the arrow T2.

Then, the portion WF0 corresponding to the inclined portion clamped by the second clamping part 20 is pulled toward the first region-side edge portion 111E side and drawn from the second clamping part 20, in a state where a portion WT configuring the inclined portion is clamped by the third clamping surface 211F and the fourth clamping surface 221F while the portion on the first clamping part 10 side is in contact with the first region-side edge portion (the first clamping edge portion) 111E (11E). The portion WT configuring the inclined portion in the structural member W1 comes into contact with the second region-side edge portion (the second clamping edge portion) 221E (22E) of the fourth upper clamping member 221 (22) and is formed while being pulled between the first region-side edge portion 111E (11E) and the second region-side edge portion 221E (22E), when being drawn from the second clamping part 20.

(C) Forming Completion (Bottom Dead Point)

Subsequently, as shown in FIG. 7C, the second clamping part 20 is lowered to the bottom dead point, so that the first region-side connection portion WE111 (WE11), the inclined portion WS1 (WS), and the second region-side connection portion WE221 (WE22), and the second region WF21 (WF2) of the structural member W1 are formed, and the forming of the structural member W1 is completed.

In the forming of the structural member W1 in this cross section, the interval C1 is maintained between the first lower clamping member (the first restraining part) 111 (11) and the fourth upper clamping member (the second restraining part) 221 (22).

Next, the outline of the manufacturing process of the structural member W1 in the cross section shown in FIG. 2B will be described with reference to FIGS. 8A to 8C.

(A) Upper Die Lowering (Clamping of Portions Corresponding to First Region and Inclined Portion)

First, the blank steel sheet W0 is disposed in the structural member manufacturing die 100.

Then, as shown in FIG. 8A, the upper die is lowered in the direction of the arrow T1 by the forming press apparatus (not shown), so that the portion corresponding to the first region WF12 (WF1) of the blank steel sheet W0 is clamped by the first clamping surface 112F (11F) and the second clamping surface 122F (12F) of the first clamping part 10 and the portion WF0 corresponding to the inclined portion of the blank steel sheet W0 is clamped by the third clamping surface 212F (21F) and the fourth clamping surface 222F (22F) of the second clamping part 20.

At this time, the clamping of the portion corresponding to the first region WF12 (WF1) by the first clamping surface 112F (11F) and the second clamping surface 122F (12F) is performed earlier than (in advance of) the clamping of the portion WF0 corresponding to the inclined portion by the third clamping surface 212F (21F) and the fourth clamping surface 222F (22F).

(B) Second Clamping Part Lowering (Inclined Portion Forming)

Next, as shown in FIG. 8B, the upper die is lowered in a state where the movement of the first clamping part 10 is stopped and the first clamping surface 112F (11F) and the second clamping surface 122F (12F) clamps the portion correspond to the first region WF12 (WF1). Then, the third lower clamping member 212 (21) is lowered in the direction of the arrow T21, and the fourth upper clamping member 222 (22) is moved in the direction of the arrow T2.

Then, the portion WF0 corresponding to the inclined portion clamped by the second clamping part 20 is pulled toward the first region-side edge portion 112E side and drawn from the second clamping part 20, in a state where the portion on the first clamping part 10 side is pressed by the first region-side edge portion (the first clamping edge portion) 112E (11E) and the portion WT configuring the inclined portion is clamped by the third clamping surface 212F and the fourth clamping surface 222F.

The portion WT configuring the inclined portion in the structural member W1 comes into contact with the second region-side edge portion (the second clamping edge portion) 222E (22E) of the fourth upper clamping member 222 (22) and is formed while being pulled between the first region-side edge portion 112E (11E) and the second region-side edge portion 222E (22E), when being drawn from the second clamping part 20.

(C) Forming Completion (Bottom Dead Point)

Subsequently, as shown in FIG. 8C, the second clamping part 20 is lowered to the bottom dead point, so that the first region-side connection portion WE112 (WE11), the inclined portion WS2 (WS), and the second region-side connection portion WE222 (WE22), and the second region WF22 (WF2) of the structural member W1 are formed, and the forming of the structural member W1 is completed.

In the forming of the structural member W1 in this cross section, the interval C2 is maintained between the first lower clamping member 112 (11) and the fourth upper clamping member 222 (22).

In this embodiment, the first lower clamping member (the first restraining part) 111 (11) and the fourth upper clamping member (the second restraining part) 221 (22) are relatively moved in a direction which they are separated from each other, along a smaller intersection angle of two intersection angles of the intersection angle with the third direction of the first inclined portion WS1 and the intersection angle with the third direction of each of the pair of second inclined portions WS2.

Hereinafter, the formability of the structural member W1 according to the first embodiment will be described with reference to FIGS. 9 and 10.

Figure 9:
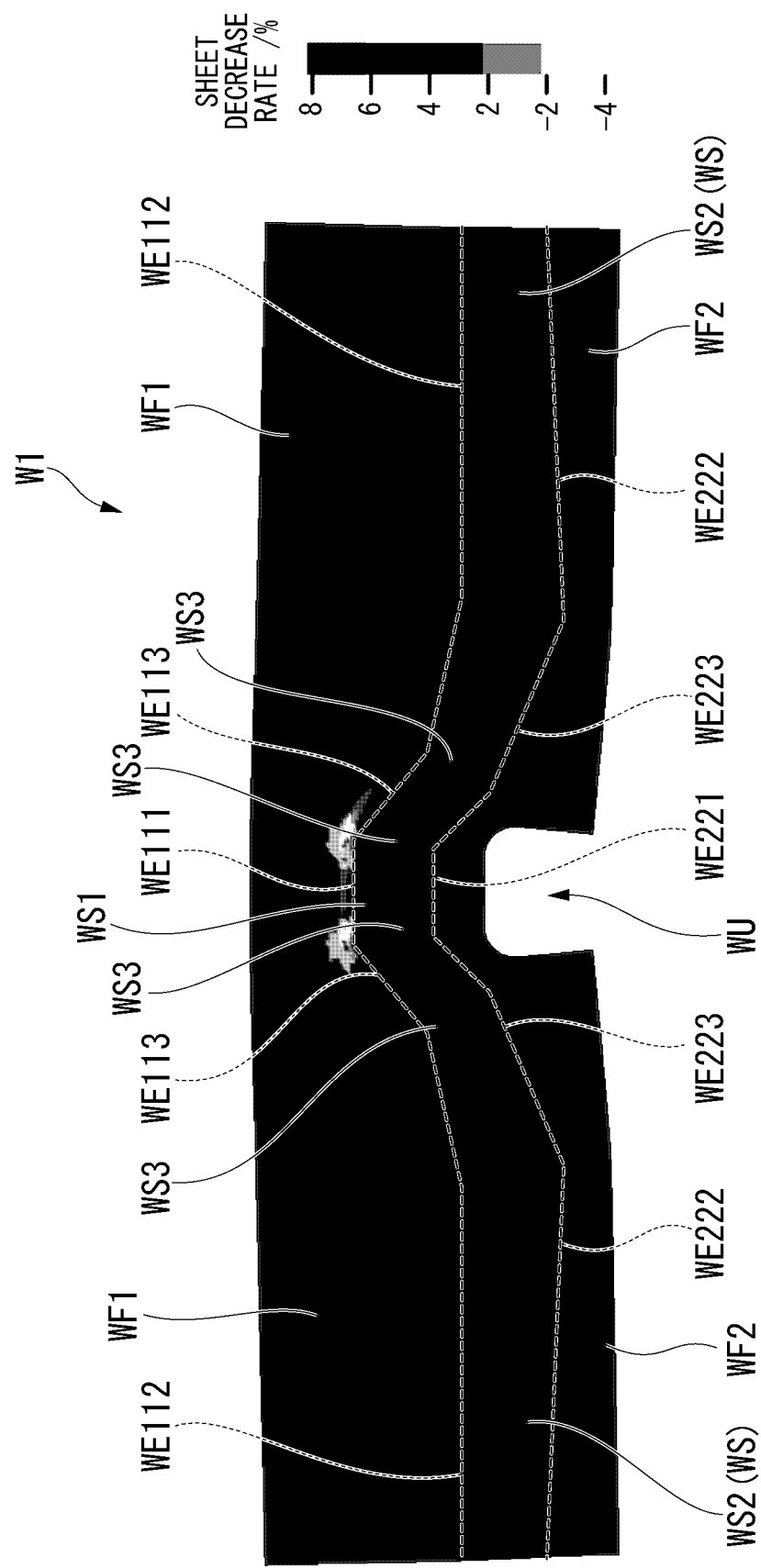
FIG. 9 is a diagram showing an example of the characteristic of the structural member according to the first embodiment, and is a distribution diagram in which a sheet thickness distribution is calculated.

FIG. 9 is a diagram showing an example of a sheet thickness distribution of the structural member W1 according to the first embodiment. FIG. 9 is a distribution diagram calculated by simulation of the sheet thickness distribution of the structural member W1 formed by performing deformation processing on, for example, an ultra high strength steel having tensile strength of 980 MPa and a sheet thickness t before forming of 1.2 mm. FIG. 10 is a diagram showing an increase or decrease in sheet thickness at the ridges of the first region-side connection portion WE11 and the second region-side connection portion WE22. In FIG. 10, a solid line indicates an increase or decrease in sheet thickness at the ridge of the first region-side connection portion WE11, and a two-dot chain line indicates an increase or decrease in sheet thickness at the ridge of the second region-side connection portion WE22.

Figure 10:
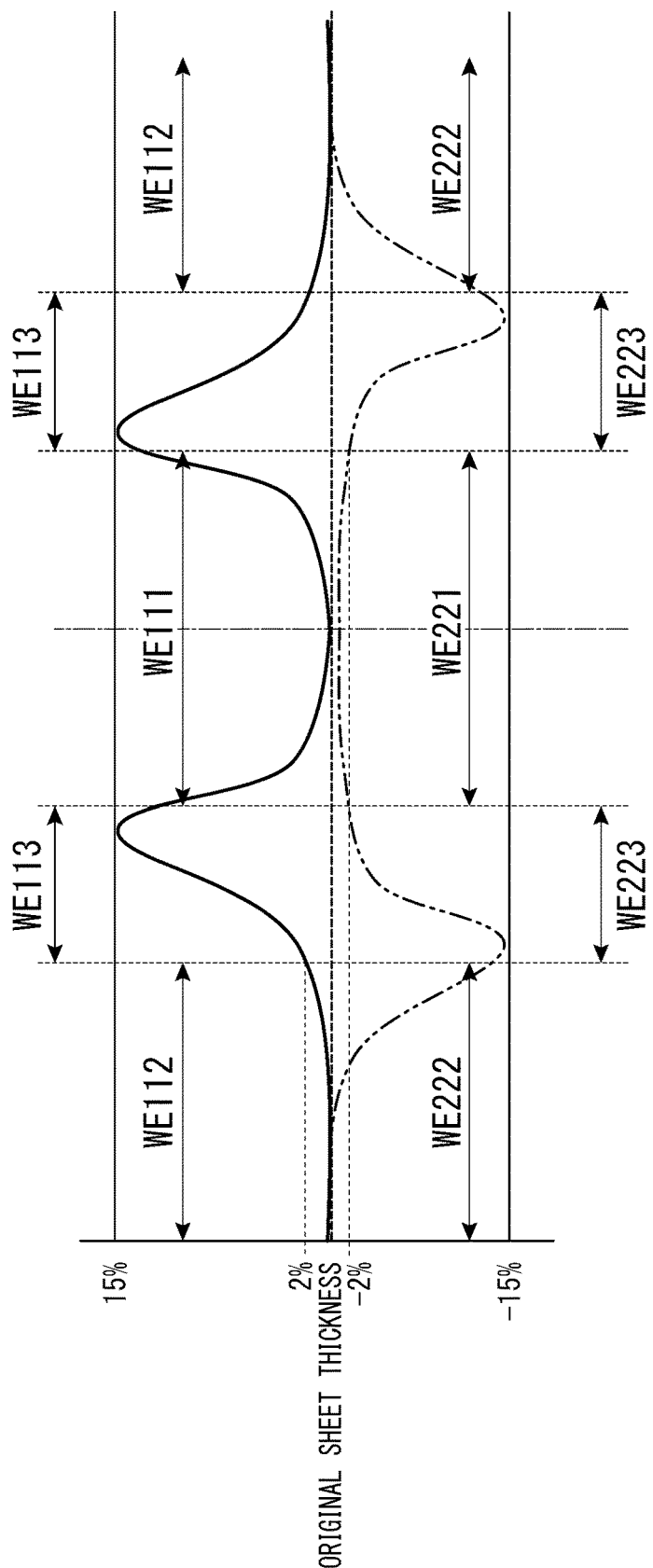
FIG. 10 is a diagram showing an example of the characteristic of the structural member according to the first embodiment, and is a diagram showing an increase or decrease in sheet thickness at ridges of a first region-side connection portion and a second region-side connection portion.

The characteristics shown in FIGS. 9 and 10 are examples showing the characteristics of the structural member W1 which is obtained by the manufacturing method of the present embodiment, and in which a tunnel-shaped recessed part is formed, and all the structural members manufactured by the manufacturing method according to the present invention do not have the sheet thickness distributions in FIGS. 9 and 10.

A dark shaded portion shown in FIG. 9 is a portion where cracks occur in normal drawing.

On the other hand, in the method of the present embodiment, forming is possible even if a wall thickness increases or decreases in the range of −15% to +15%.

The structural member W1 according to the present embodiment satisfies the following conditions.

That is, the structural member W1 is made of a steel sheet having tensile strength of 780 MPa or more, and satisfies a sheet thickness of 0.8 mm or more and 2.3 mm or less. A maximum sheet thickness region portion having the maximum sheet thickness on the first inclined portion WS1 side and a minimum sheet thickness region portion formed on the second inclined portion WS2 side with respect to the maximum sheet thickness region portion and having a minimum sheet thickness region portion are formed in the third inclined portion WS3. Further, the sheet thickness ratio A of the minimum sheet thickness region portion to the maximum sheet thickness region portion, which is obtained by the following Expression 1, satisfies the following Expression 2.

Sheet thickness ratio $A$=([maximum sheet thickness (mm) of the maximum sheet thickness region portion]−[minimum sheet thickness (mm) of the minimum sheet thickness region portion])/ [maximum sheet thickness (mm) in the maximum sheet thickness region portion]   Expression 1

$0.08 \leq A \leq 0.26$   Expression 2

In the sheet thickness of the structural member W1, as shown in FIG. 9, in the first inclined portion WS1 and the second inclined portion WS2 which are formed orthogonal to the first plane, of the inclined portion WS configuring the substantially channel-shaped recessed part WU, the increase or decrease in sheet thickness is small, and in the third inclined portion WS3, the increase or decrease occurs.

Further, in the sheet thickness in the third inclined portion WS3, the sheet thickness increases in the vicinity of the first region connection portion WE113 having a recessed ridge when viewed from the upper side in the Z-axis direction (the side opposite to a deformation direction of the blank steel sheet W0), and the sheet thickness decreases in the vicinity of the second region connection portion WE223 having a protruding ridge.

Further, in the ridge of the first region-side connection portion WE11, in the first region-side connection portions WE111 and WE112, which are connection portions with the first inclined portion WS1 and the second inclined portion WS2, the increase or decrease in sheet thickness is suppressed, and the increase or decrease in sheet thickness does not almost occur.

Specifically, in the range of the first region-side connection portion WE111 and the range of the first region-side connection portion WE112, an increase in sheet thickness is suppressed to less than 2%, and the increase or decrease in sheet thickness is small and substantially constant.

Further, in the ridge of the second region-side connection portion WE22, as shown in FIG. 10, the increase or decrease in sheet thickness does not almost occur in the second region-side connection portions WE221 and WE222, which are connection portions with the first inclined portion WSJ and the second inclined portion WS2.

Specifically, for example, in the range of the second region-side connection portion WE221 and the range of the second region-side connection portion WE222, an increase in sheet thickness is suppressed to less than 2%, and the increase or decrease in sheet thickness is small and substantially constant.

With respect to the inclined portion WS of the structural member W1, whether the minimum intersection angle $\theta 1$ is formed in the first region WF1 or the second region WF2 can be optionally set.

According to the structural member manufacturing method and the structural member manufacturing die 100 according to the first embodiment, the portion corresponding to the first region WF1 of the blank steel sheet W0 is clamped by the first clamping part 10, and the portion WF0 corresponding to the inclined portion of the blank steel sheet W0 is clamped by the second clamping part 20. Then, the first clamping part 10 and the second clamping part 20 are relatively moved along the minimum intersection angle $\theta 1$ in the first inclined portion (the specific inclined portion) WS1 to pull the blank steel sheet W0 to form the inclined portion WS. As a result, the occurrence of compression in a plane direction in the vicinity of the connection portion of the blank steel sheet W0 is suppressed, so that the generation of wrinkles is suppressed. As a result, the structural member W1 can be efficiently manufactured.

Further, according to the structural member manufacturing method and the structural member manufacturing die 100 according to the first embodiment, the first clamping part 10 and the second clamping part 20 are relatively moved along the minimum intersection angle $\theta 1$ with a position in the X-axis direction and a position in the Z-axis direction synchronized with each other. In this way, the inclined portion WS of the structural member W1 can be efficiently and stably formed while suppressing the generation of wrinkles in the inclined portion WS. As a result, the structural member W1 having the inclined portion WS whose intersection angle $\theta$ changes according to a position in the second direction can be efficiently and stably manufactured.

Further, according to the structural member manufacturing die 100 according to the first embodiment, the clamping part driving means includes the cam mechanism 20C formed to be inclined with respect to the Z-axis direction. Therefore, since the first clamping part 10 and the second clamping part 20 can be separated from each other while accurately synchronizing positions in the X-axis direction and the Z-axis direction with each other with a simple structure, the inclined portion WS of the structural member W1 can be efficiently and stably formed while suppressing the generation of wrinkles.

According to the structural member manufacturing die 100 according to the first embodiment, since it includes the coil springs (the clamping member return mechanisms) 12P, 21P, and 22P, when the first clamping part 10 and the second clamping part 20 are separated from each other to the original position side along the Z-axis direction, each of the second upper clamping member 12, the third lower clamping member 21, and the fourth upper clamping member 22 can be automatically returned to the original position. Therefore, the structural member W1 can be efficiently manufactured.

Further, according to the structural member W1 according to the first embodiment, it include the first region WF1, the inclined portion WS, and the second region WF2, and the first inclined portion WS1 and the second inclined portion WS2 orthogonal to the first plane according to a position in the Y-axis direction, and the third inclined portions WS3 are formed in the inclined portion WS. Since the ridge of the first region connection portion WE1 and the ridge of the second region connection portion WE2 are formed to have a substantially constant sheet thickness, it is possible to secure stable quality while suppressing the generation of wrinkles when the inclined portion is formed. As a result, the structural member W1 can be efficiently and stably manufactured.

Second Embodiment

Hereinafter, a second embodiment of the present invention will be described with reference to FIGS. 11 to 16C.

Figure 11:
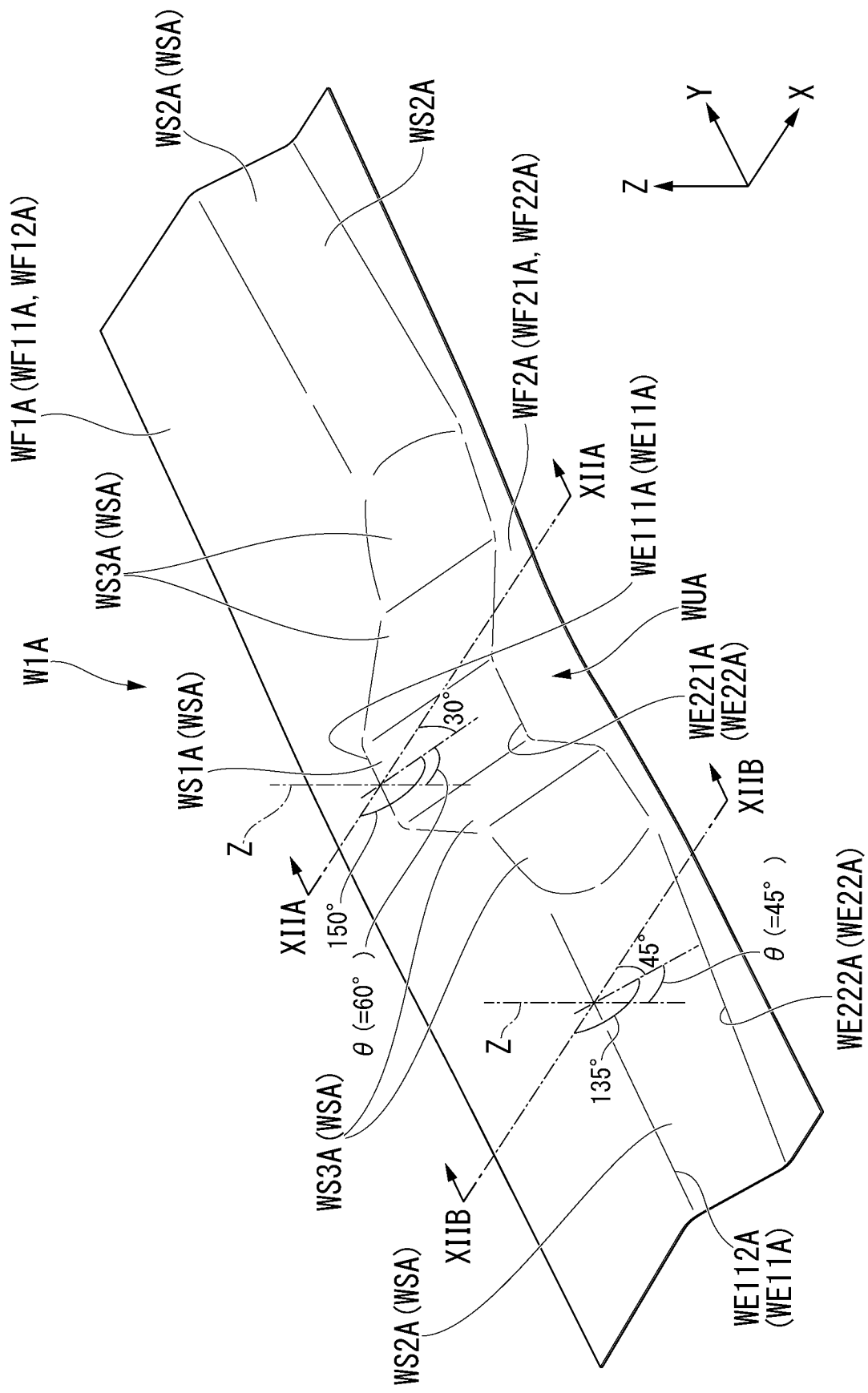
FIG. 11 is a perspective view showing a schematic configuration of a structural member according to the second embodiment of the present invention.
Figure 12A:
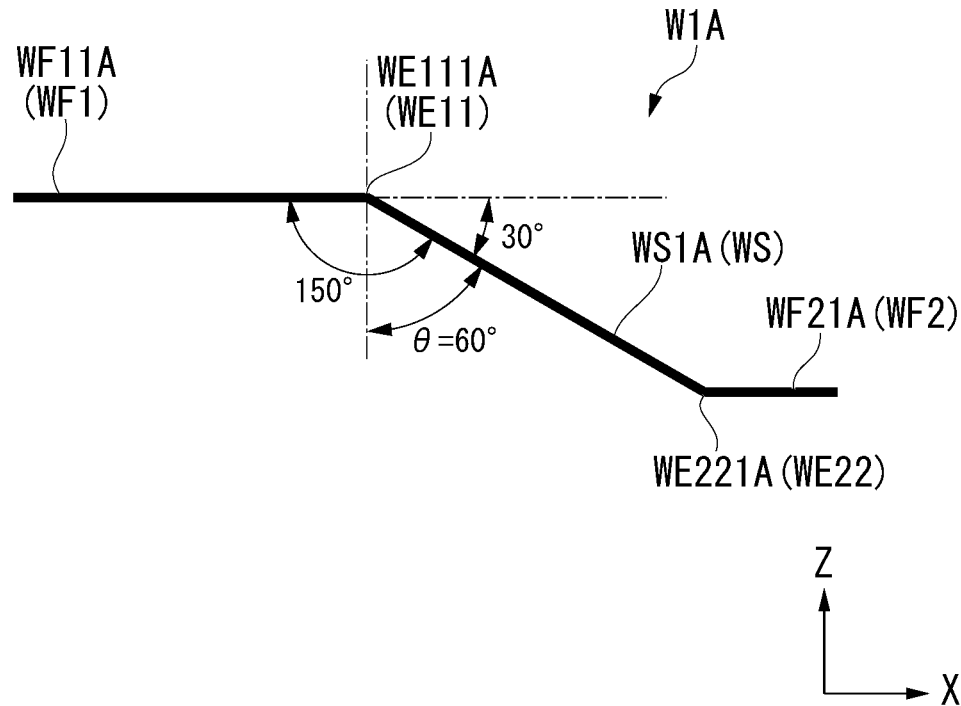
FIG. 12A is a diagram showing the structural member according to the second embodiment, and is a vertical sectional view taken along line XIIA-XIIA in FIG. 11 and viewed in the direction of an arrow.
Figure 12B:
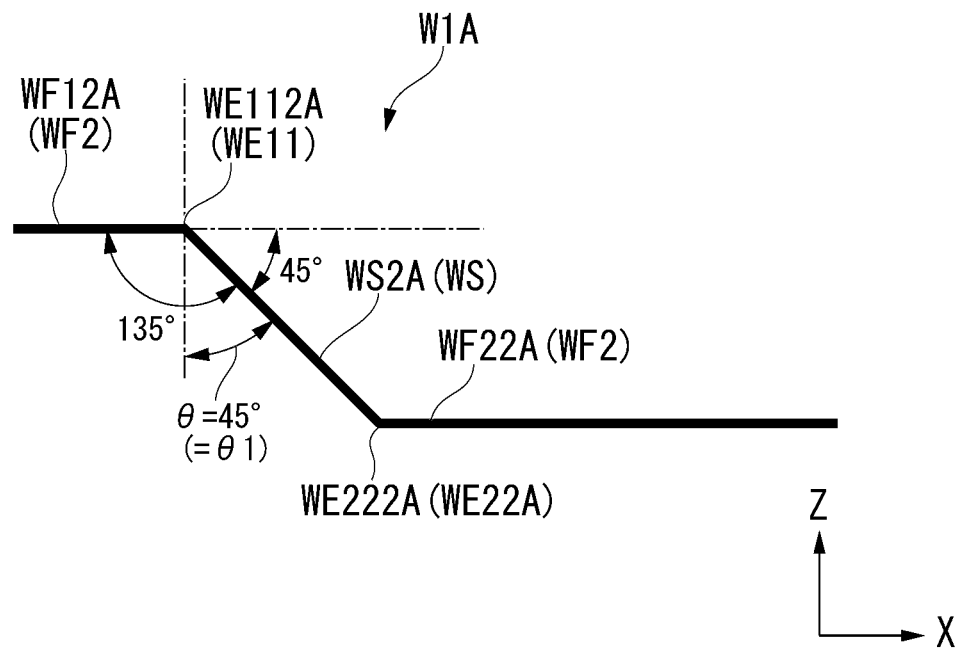
FIG. 12B is a diagram showing the structural member according to the second embodiment, and is a vertical sectional view taken along line XIIB-XIIB in FIG. 11 and viewed in the direction of an arrow.

FIG. 11 is a perspective view of a structural member according to the second embodiment. FIGS. 12A and 12B are diagrams showing the structural member according to the second embodiment. Specifically, FIG. 12A shows a sectional view taken along line XIIA-XIIA in FIG. 11 and viewed in the direction of an arrow, and FIG. 12B shows a sectional view taken along line XIIB-XIIB in FIG. 11 and viewed in the direction of an arrow. In FIGS. 11, 12A and 12B, reference symbol W1A denotes a structural member.

The structural member W1A is formed by performing cold deformation processing on a steel sheet made of ultra high strength steel and having a sheet thickness t of 1.2 mm.

Further, as shown in FIG. 11, the structural member W1A includes a first region WF1A, a second region WF2A, and an inclined portion WSA, and each of the first region WF1A, the second region WF2A, and the inclined portion WSA is formed to extend in the Y-axis direction. Further, the first region WF1A, the inclined portion WSA, and the second region WF2A are formed in this order along the X-axis direction.

In the structural member W1A, as shown in FIG. 11, a substantially channel-shaped recessed part WUA that has a first inclined portion WS1A, which is recessed along the X-axis direction and the Z-axis direction with respect to a second inclined portion (a specific inclined portion) WS2A, as a bottom surface thereof, and is widened from the first region WF1A toward the second region WF2A side is formed at the center portion in the Y-axis direction.

In the inclined portion WSA, residual tensile stress is formed in a direction orthogonal to the Y-axis direction.

In this embodiment, the first region WF1A extends in the direction orthogonal to, for example, the Z-axis direction, and is specifically formed in a planar shape along the second plane that is defined by the X-axis and the Y-axis. Further, in the center portion in the Y-axis direction of the first region WF1A, a recessed part recessed toward the side opposite to the second region WF2A is formed.

In this embodiment, the second region WF2A extends in the direction orthogonal to, for example, the Z-axis direction, and is specifically formed in a planar shape along the second plane that is defined by the X-axis and the Y-axis. A recessed part facing the inclined portion WSA side is formed in the center portion in the Y-axis direction of the second region WF2A.

The inclined portion WSA is disposed between the first region WF1A and the second region WF2A, and is inclined with respect to the first region WF1A and the second region WF2A.

The inclined portion WSA is connected to the first region WF1A by a first region-side connection portion (a first ridge) WE11A, and is connected to the second region WF2A by a second region-side connection portion (a second ridge) WE22A.

The first region-side connection portion WE11A has a convex shape whose center portion protrudes in the direction of the first region WF1A. The second region-side connection portion WE22A has a convex shape whose center portion protrudes on the side opposite to the second region WF2A.

The inclined portion WSA includes the first inclined portion WS1A, the second inclined portion (specific inclined portion) WS2A, and a third inclined portion WS3A. Specifically, the inclined portion WSA includes a pair of second inclined portions WS2A, each of which is located on the side of each of both end portions in the second direction, a pair of third inclined portions WS3A, each of which is connected to each of the pair of second inclined portions WS2A, and the first inclined portion WS1A which is connected to both of the pair of third inclined portions WS3A. The second inclined portion (the specific inclined portion) WS2A, the third inclined portion WS3A, the first inclined portion WS1A, the third inclined portion WS3A, and the second inclined portion (the specific inclined portion) WS2A are formed in this order in the Y-axis direction.

In the inclined portion WSA, an intersection angle with the third direction in the first plane that is defined by the first direction and the third direction changes according to a position in the second direction. Further, in the inclined portion WSA, an intersection angle with the first direction in the second plane that is defined by the first direction and the second direction changes according to a position in the second direction.

The first region-side connection portion (the first ridge) WE11A is connected to the first region WF1A and extends in the second direction. The second region-side connection portion (the second ridge) WE22A is formed at an end portion of the inclined portion WSA on the side opposite to the first region WF1A in the first direction, and extends along the second direction.

The second region WF2A is connected through the second ridge and extends to intersect with the third direction.

The width in the X-axis direction of the first region WF1A is formed such that a portion that is connected to the first inclined portion WS1A is narrow and a portion that is connected to the second inclined portion (the specific inclined portion) WS2A is wide.

The width in the X-axis direction of the second region WF2A is formed such that a portion that is connected to the first inclined portion WS1A is wide and a portion that is connected to the second inclined portion (the specific inclined portion) WS2A is narrow.

As shown in FIGS. 11 and 12A, the first inclined portion WS1A (WSA) is connected to the first region WF11A (WF1A) by the first region-side connection portion WE111A (WE11A) and connected to the second region WF21A (WF2A) by the second region-side connection portion WE221A (WE22A), at the center portion in the Y-axis direction.

As shown in FIGS. 11 and 12A, the first inclined portion WS1A (WSA) is formed such that the intersection angle θ with the Z-axis direction in the first plane is 60° (it intersects with the X-axis at 150° on the first region WF1 side and at 30° on the second region WF2A side).

As shown in FIGS. 11 and 12B, the second inclined portion WS2A (WSA) is connected to the first region WF12A (WF1A) through the first region-side connection portion WE112A (WE11A) and connected to the second region WF22A (WF2A) through the second region-side connection portion WE222A (WE22A), on both side portions in the Y-axis direction.

As shown in FIGS. 11 and 12B, the second inclined portion WS2A (WSA) is formed such that the intersection angle θ with the Z-axis direction in the first plane is 45° (it intersects with the X-axis at 135° on the first region WF1A side and at 45° on the second region WF2A side).

The intersection angle θ (=45°) in the second inclined portion WS2A (WSA) is regarded as the minimum intersection angle θ1 formed by the inclined portion WS and the Z-axis direction (the third direction) in the Y-axis direction (the second direction).

As shown in FIG. 11, the inclined portion WS3A is formed such that the dimension in the X-axis direction decreases as it approaches the second inclined portion WS2A from the first inclined portion WS1A.

Further, in the first plane, the Z-axis direction and the inclined portion WS3 intersect each other at the intersection angle θ in the range of 60° to 45°.

Further, the third inclined portion WS3A configures the substantially channel-shaped recessed part WUA of the structural member W1 together with the first inclined portion WS1A.

That is, the intersection angle with the third direction of each of the pair of third inclined portions WS3A is in the range between the intersection angle with the third direction of the first inclined portion WS1A and the intersection angle with the third direction of each of the pair of second inclined portions WS2A.

Further, the difference between the intersection angle with the third direction of the first inclined portion WS1A and the intersection angle with the third direction of each of the pair of second inclined portions WS2A is 8.0° or more, preferably 11° or more, and more preferably 15° or more.

Others are the same as those of the first embodiment including the manufacturing method and the manufacturing device, but will be described below.

Next, a schematic configuration of a structural member manufacturing die (a structural member manufacturing device) 100A according to this embodiment will be described with reference to FIGS. 13A to 14D.

Figure 13A:
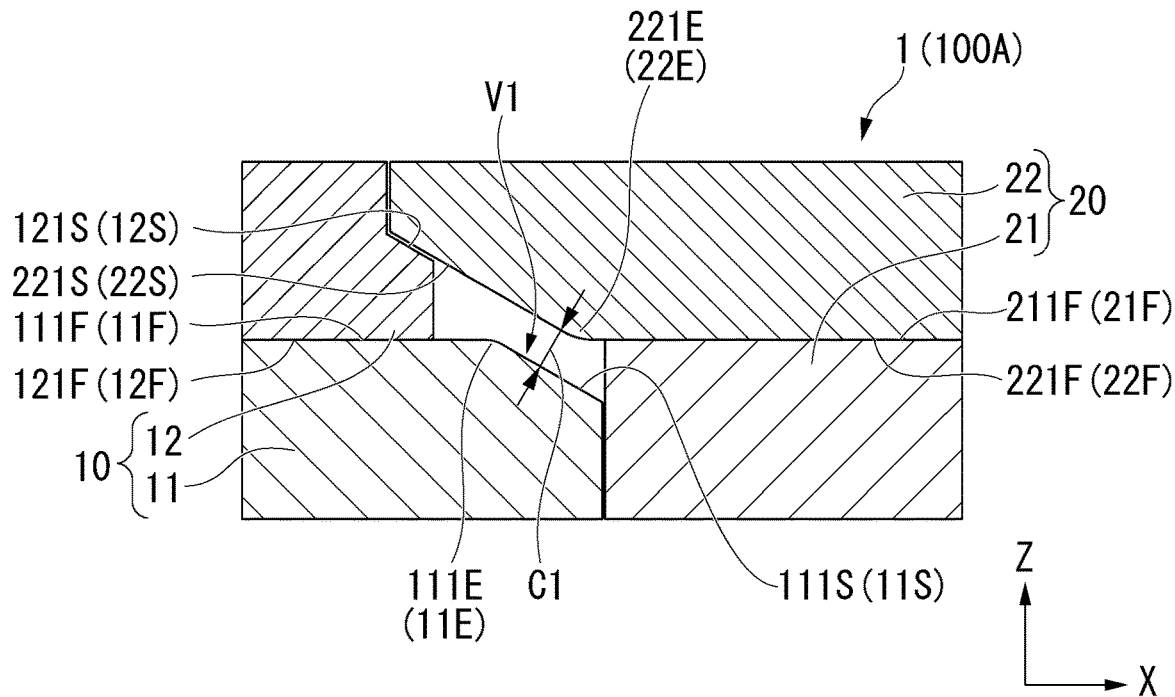
FIG. 13A is a diagram showing a schematic configuration of a forming part according to the second embodiment, and is a vertical sectional view taken along line VA-VA in FIG. 3 and viewed in the direction of an arrow.
Figure 13B:
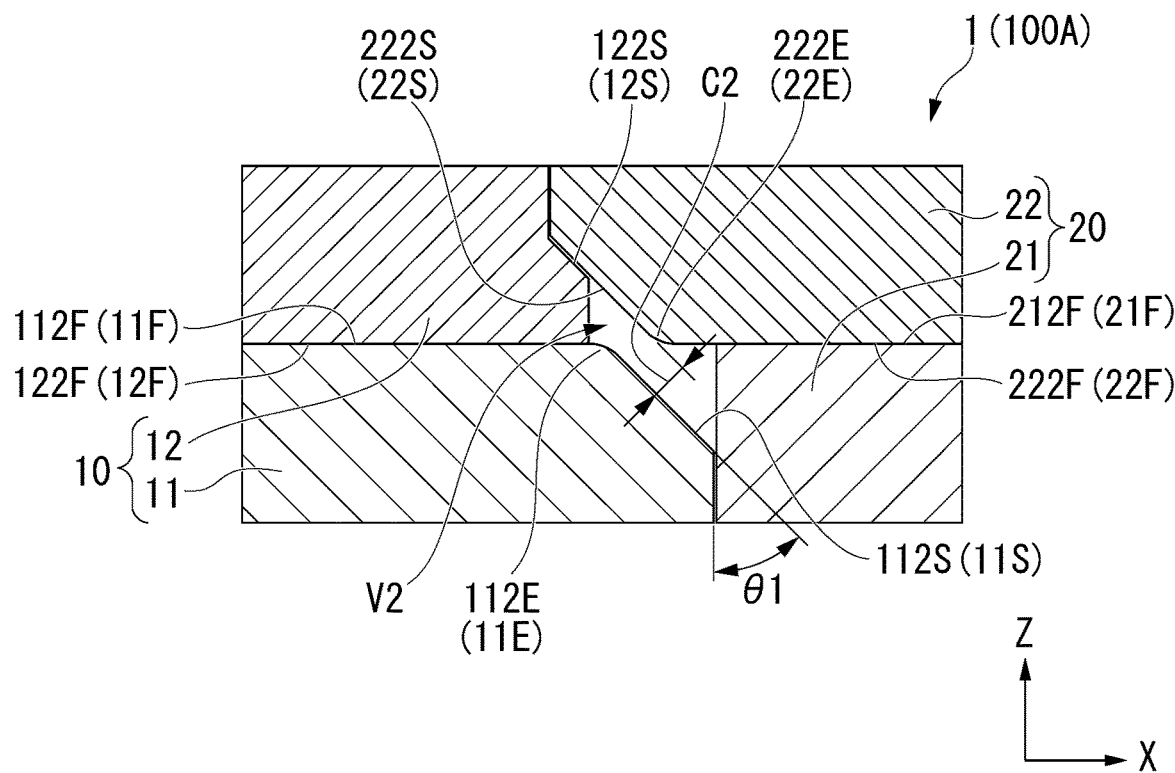
FIG. 13B is a diagram showing the schematic configuration of the forming part according to the second embodiment, and is a vertical sectional view taken along line VB-VB in FIG. 3 and viewed in the direction of an arrow.

FIGS. 13A and 13B are vertical sectional views showing the schematic configuration of a forming part configuring the structural member manufacturing die according to this embodiment. FIG. 13A is a vertical sectional view taken along line VA-VA in FIG. 3 and viewed in the direction of an arrow. FIG. 13B is a vertical sectional view taken along line VB-VB in FIG. 3 and viewed in the direction of an arrow.

The structural member manufacturing die 100A includes a lower die (fixed die) and an upper die (a movable die). The structural member manufacturing die 100A is mounted to the forming press apparatus (not shown) to configure a structural member manufacturing device, and performs deformation processing on a metal material sheet to manufacture the structural member W1.

Similar to the first embodiment, for example, the structural member manufacturing die 100A includes the first clamping part 10, the second clamping part 20, the cam mechanism (the clamping part driving means) 20C, and the coil springs (the clamping member return mechanism) 12P, 21P, and 22P, the lower die base 10B, and the upper die base 20B. The first clamping part 10 and the second clamping part 20 are made to be movable relative to each other along the Z-axis direction. In this embodiment, two (a pair) coil springs 21P are provided. The first clamping part 10 and the second clamping part 20 configure the forming part 1.

In this embodiment, the lower die includes the lower die base 10B, the first lower clamping member (the first restraining part) 11, the third lower clamping member 21, and the coil spring 21P. The first lower clamping member 11, the third lower clamping member 21, and the coil spring 21P are disposed with respect to the lower die base 10B.

Further, the upper die includes the upper die base 20B, the second upper clamping member 12, the fourth upper clamping member 22, and the coil springs 12P and 22P. The second upper clamping member 12, the fourth upper clamping member 22, and the coil springs 12P and 22P are disposed with respect to the upper die base 20B.

The first clamping part 10 includes the first lower clamping member (the first restraining part) 11 and the second upper clamping member 12. The first lower clamping member 11 and the second upper clamping member 12 can be opened and closed with respect to one another along the Z-axis direction.

In the first lower clamping member (the first restraining part) 11, the first clamping surface 11F is formed on the second upper clamping member 12 side, and the inclined portion 11S is formed on the second clamping part 20 side.

Further, in the second upper clamping member 12, the second clamping surface 12F facing the first clamping surface 11F is formed, and the inclined portion 12S is formed on the second clamping part 20 side.

The first clamping surface 11F and the second clamping surface 12F can clamp the blank steel sheet W0.

The second clamping part 20 includes the third lower clamping member 21 and the fourth upper clamping member (the second restraining part) 22. The third lower clamping member 21 and the fourth upper clamping member 22 can be opened and closed with respect to one another along the Z-axis direction.

In the third lower clamping member 21, the third clamping surface 21F is formed on the fourth upper clamping member (the second restraining part) 22 side.

Further, in the fourth upper clamping member (the second restraining part) 22, the fourth clamping surface 22F facing the third clamping surface 21F is formed, and the inclined portion 22S is formed on the first clamping part 10 side.

The third clamping surface 21F and the fourth clamping surface 22F can clamp the blank steel sheet W0.

The cam mechanism 20C includes the cam-shaped portion 22C and the cam follower 22W. The cam follower 22W is fixed to the lower die base 10B and can come into contact with the cam-shaped portion 22C through the through-hole 21H formed in the third lower clamping member 21.

The cam-shaped portion 22C is formed on the fourth upper clamping member 22. The cam-shaped portion 22C is regarded as an inclined surface whose intersection angle with the Z-axis direction, which is a direction that is separated from the first clamping part 10 as it approaches the third lower clamping member 21, is equal to the minimum intersection angle θ1. As a result, when the fourth upper clamping member 22 approaches the lower die base 10B in the Z-axis direction, the fourth upper clamping member 22 moves along the cam-shaped portion 22C.

The coil spring (the clamping member return mechanism) 12P is disposed between the upper die base 20B and the second upper clamping member 12. The coil spring 12P biases the second upper clamping member 12 toward the first lower clamping member 11 side in a case where the second upper clamping member 12 clamps the blank steel sheet W0 in cooperation with the first lower clamping member 11, and returns the second upper clamping member 12 to the original position in the Z-axis direction in a free state.

The coil spring (the clamping member return mechanism) 21P is disposed between the lower die base 10B and the third lower clamping member 21. The coil spring 21P biases the third lower clamping member 21 toward the fourth upper clamping member 22 side in a case where the third lower clamping member 21 clamps the blank steel sheet W0 in cooperation with the fourth upper clamping member 22, and returns the third lower clamping member 21 to the original position in the Z-axis direction in a free state.

The coil spring (the clamping member return mechanism) 22P is disposed between the side plate of the upper die base 20B and the fourth upper clamping member 22. The coil spring 22P biases the fourth upper clamping member 22 toward the second upper clamping member 12 side when the fourth upper clamping member 22 moves in the X-axis direction, and returns the fourth upper clamping member 22 to the original position in the X-axis direction in a free state.

In the structural member manufacturing die 100A, in the longitudinal section taken along line VA-VA of FIG. 3 and viewed in the direction of an arrow, as shown in FIG. 13A, the first region-side edge portion (the first clamping edge portion) 111E (11E) is formed at a corner portion where the first clamping surface 111F (11F) and the inclined portion 11S are connected. The second region-side edge portion (the second clamping edge portion) 221E (22E) is formed at a corner portion where the fourth clamping surface 221F (22F) and the inclined portion 22S are connected. Then, the first region-side edge portion 111E forms the first inclined portion WS1 and the first region-side connection portion WE111 (WE11) of the structural member W1. The second region-side edge portion 221E forms the first inclined portion WS1A and the second region-side connection portion WE221A (WE22) of the structural member W1.

In the structural member manufacturing die 100A, in the longitudinal section taken along line VB-VB of FIG. 3 and viewed in the direction of an arrow, as shown in FIG. 13B, the first region-side edge portion (the first clamping edge portion) 112E (11E) is formed at a corner portion where the first clamping surface 112F (11F) and the inclined portion 11S are connected. The second region-side edge portion (the second clamping edge portion) 222E (22E) is formed at a corner portion where the fourth clamping surface 222F (22F) and the inclined portion 22S are connected.

Then, the first region-side edge portion 112E forms the second inclined portion WS2A and the first region-side connection portion WE112A (WE11) of the structural member W1. The second region-side edge portion 222E forms the second inclined portion WS2A and the second region-side connection portion WE222A (WE22) of the structural member W1.

As shown in FIG. 13A, the space V1 is formed between the first lower clamping member 11, the second upper clamping member 12, the third lower clamping member 21, and the fourth upper clamping member 22. The interval C1 (mm) between the first lower clamping member 11 and the fourth upper clamping member 22 is regarded as being 1.03 times or more and 1.07 times or less the sheet thickness t (mm) of the blank steel sheet W0.

Further, as shown in FIG. 13B, the space V2 is formed between the first lower clamping member 11, the second upper clamping member 12, the third lower clamping member 21, and the fourth upper clamping member 22. The interval C2 between the first lower clamping member 11 and the fourth upper clamping member 22 is regarded as being about 70 mm.

Next, the operation of the structural member manufacturing die 100A according to the first embodiment will be described with reference to FIGS. 14A to 14D. For convenience, the blank steel sheet W0, the structural member W1, and the like are not shown in FIGS. 14A to 14D.

(A) Forming Preparation (Original Position)

First, the structural member manufacturing die 100A is mounted to the forming press apparatus (not shown), and the upper die is located at the top dead point.

Figure 14A:
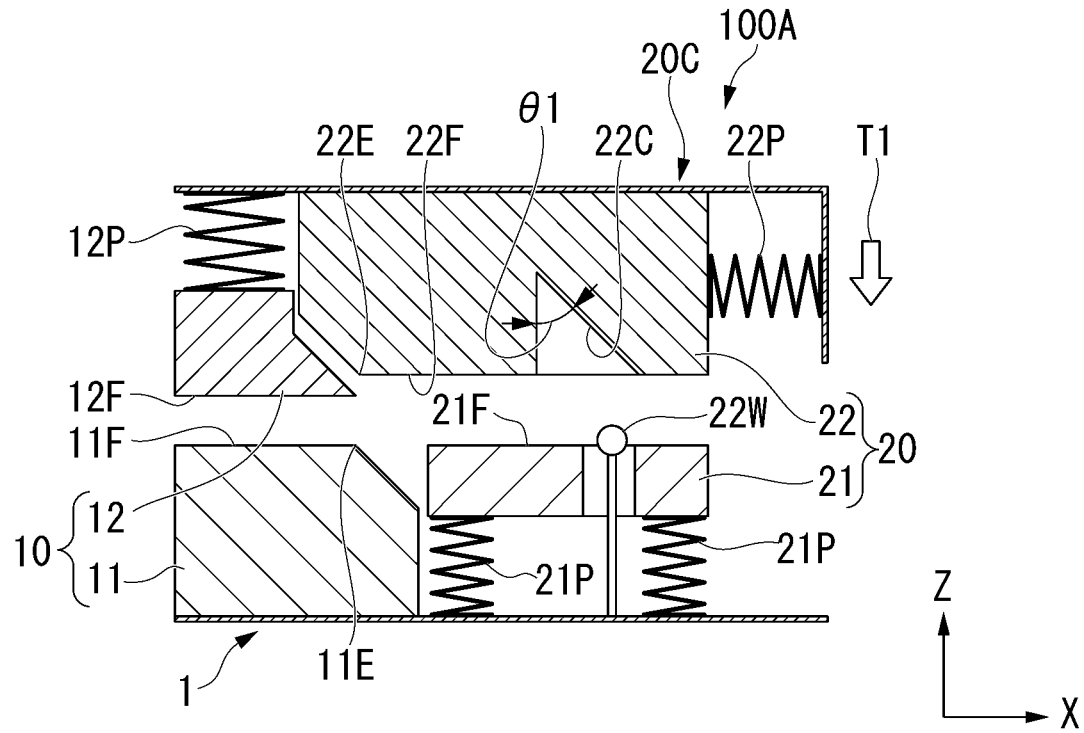
FIG. 14A is a diagram showing the operation of the structural member manufacturing die in a manufacturing process of the structural member according to the second embodiment, and is a vertical sectional view showing a forming preparation state in which the upper die is disposed at the top dead point in the manufacturing process.

When the upper die is located at the top dead point, as shown in FIG. 14A, the first clamping part 10 and the second clamping part 20 are at the original positions, and the second clamping surface 12F of the second upper clamping member 12 is located on the lower side than the fourth clamping surface 22F of the fourth upper clamping member 22.

(B) Upper Die Lowering (Clamping of Portions Corresponding to First Region and Inclined Portion)

Next, as shown in FIG. 14A, the upper die is lowered in the direction of the arrow T1 (to the lower side in the Z-axis direction). When the upper die is lowered, first, the second clamping surface 12F of the second upper clamping member 12 clamps the portion corresponding to the first region.

Figure 14B:
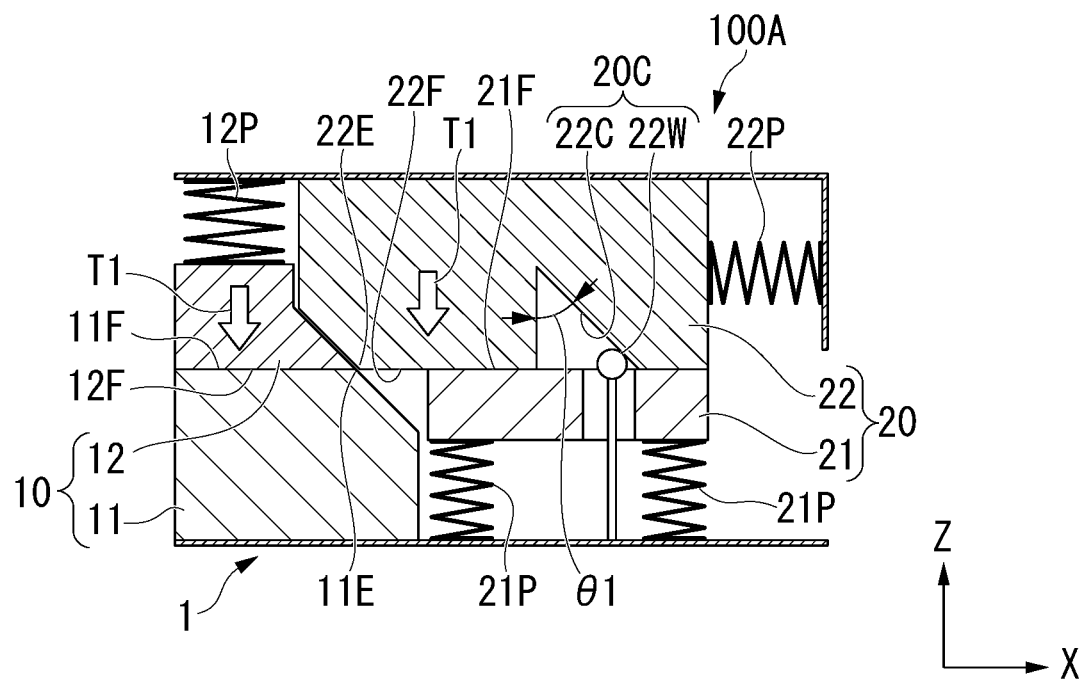
FIG. 14B is a diagram showing the operation of the structural member manufacturing die in the manufacturing process of the structural member according to the second embodiment, and is a vertical sectional view showing a state where the upper die is lowered to clamp the portion corresponding to the first region and the portion corresponding to the inclined portion.

Subsequently, as shown in FIG. 14B, the upper die is further lowered in the direction of the arrow T1 (to the lower side in the Z-axis direction), so that the portion corresponding to the inclined portion is clamped by the fourth clamping surface 22F of the fourth upper clamping member (the second restraining part) 22.

In this manner, the second upper clamping member 12 clamps the blank steel sheet W0 (not shown) earlier than the fourth upper clamping member 22, and after the second upper clamping member 12 clamps the blank steel sheet W0, the upper die is further lowered, and the coil spring (the clamping member return mechanism) 12P is compressed, so that the portion corresponding to the inclined portion of the blank steel sheet W0 is clamped.

Then, the cam follower 22W comes into contact with the cam-shaped portion 22C at a tuning when the first lower clamping member 11 and the second upper clamping member 12, and the third lower clamping member 21 and the fourth upper clamping member 22 come into contact with each other.

In this state, the clamping force of the first region WF1A by the first clamping part 10 (the first clamping surface 11F of the first lower clamping member 11 and the second clamping surface 12F of the second upper clamping member 12) based on the coil spring 12P is set so as to be larger than the clamping force of the portion WF0 corresponding to the inclined portion by the second clamping part 20 based on the coil spring 21P.

(C) Second Clamping Part Lowering (Inclined Portion Forming)

Figure 14C:
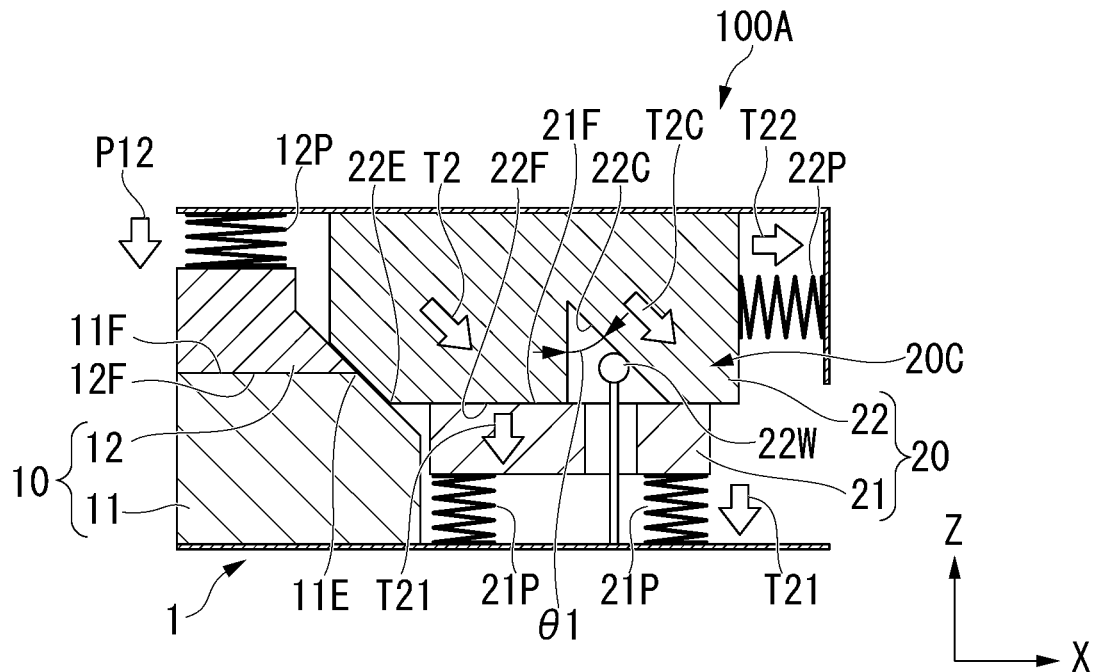
FIG. 14C is a diagram showing the operation of the structural member manufacturing die in the manufacturing process of the structural member according to the second embodiment, and is a vertical sectional view showing a state where the second clamping part is lowered to form the inclined portion while pulling it.

Subsequently, as shown in FIG. 14C, the second clamping part 20 is further lowered toward the lower side in the Z-axis direction.

At this time, the third lower clamping member 21 is lowered in the direction of the arrow T21 (to the lower side in the Z-axis direction). At the same time, the fourth upper clamping member 22 is moved in the direction of the arrow T2 by the action of the cam mechanism 20C guiding the fourth upper clamping member 22 in the direction of the arrow T2C.

Each of the arrows T2C and T2 is the direction along the inclination angle (θ1) of the first inclined portion WS1 of the structural member W1.

When the third lower clamping member 21 moves in the direction of the arrow T21, the coil spring 21P is compressed to bias the third lower clamping member 21 upward.

Further, the fourth upper clamping member 22 moves in the direction of the arrow T2, so that the coil spring 22P is compressed in the direction of the arrow T22, and the fourth upper clamping member 22 is biased on the side opposite to the moving direction.

Then, the blank steel sheet W0 clamped by the second clamping part 20 (the third clamping surface 21F of the third lower clamping member 21 and the fourth clamping surface 22F of the fourth upper clamping member 22) is pulled, so that it is formed while being drawn from the second clamping part 20.

While the second clamping part 20 is lowered (the inclined portion is formed), the clamping force of the first region WF1A by the first clamping part 10 (the first clamping surface 11F of the first lower clamping member 11 and the second clamping surface 12F of the second upper clamping member 12) through the coil spring 12P is set so as to be maintained larger than the clamping force of the portion WF0 corresponding to the inclined portion by the second clamping part 20 through the coil spring 21P.

(D) Forming Completion (Bottom Dead Point)

Figure 14D:
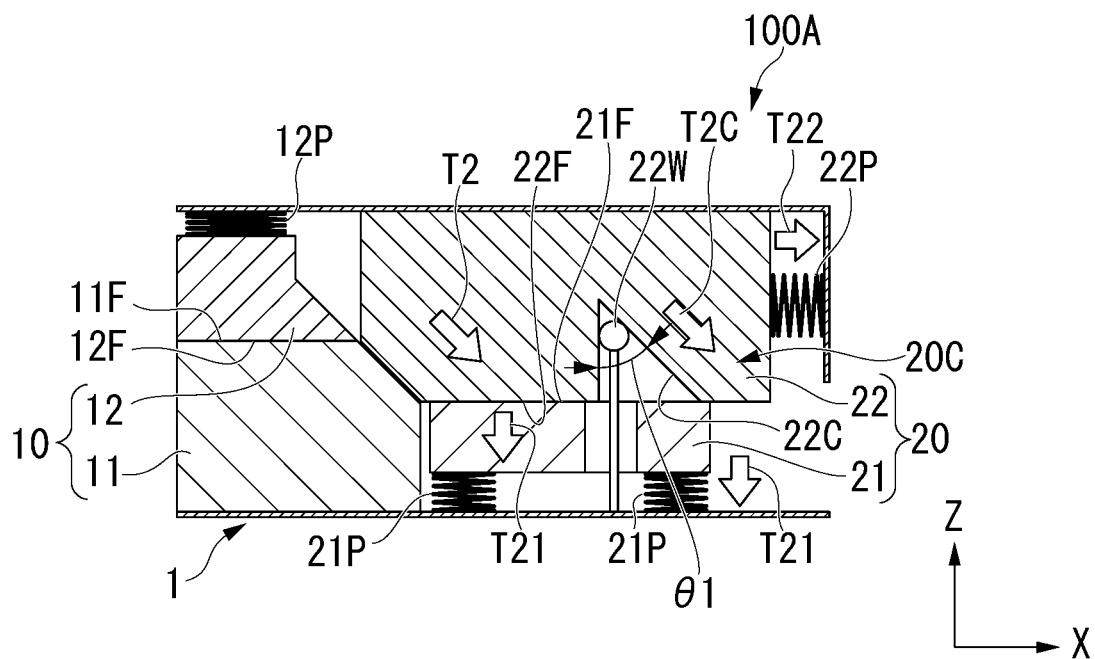
FIG. 14D is a diagram showing the operation of the structural member manufacturing die in the manufacturing process of the structural member according to the second embodiment, and is a vertical sectional view showing a state where the second clamping part is lowered to the bottom dead point in the manufacturing process, so that the forming of the structural member is completed.

Subsequently, as shown in FIG. 14D, the upper die is further lowered to the lowering end in the direction of the arrow T21 (to the lower side in the Z-axis direction) to complete the forming of the structural member W1.

Then, the upper die is raised by the forming press apparatus to open the structural member manufacturing die 100A, and the structural member W1 (not shown) is taken out.

At this time, the first lower clamping member 11 is returned to the original position by the coil spring 12P, the third lower clamping member 21 is returned to the original position by the coil spring 21P, and the fourth upper clamping member 22 is returned to the original position by the coil spring 22P.

Next, the forming of the structural member W1 by the structural member manufacturing die 100A according to the second embodiment will be described with reference to FIGS. 15A to 15C and 16A to 16C.

FIGS. 15A to 15C and 16A to 16C are diagrams showing the outline of the manufacturing process in the cross sections shown in FIGS. 12A and 12B.

Figure 15A:
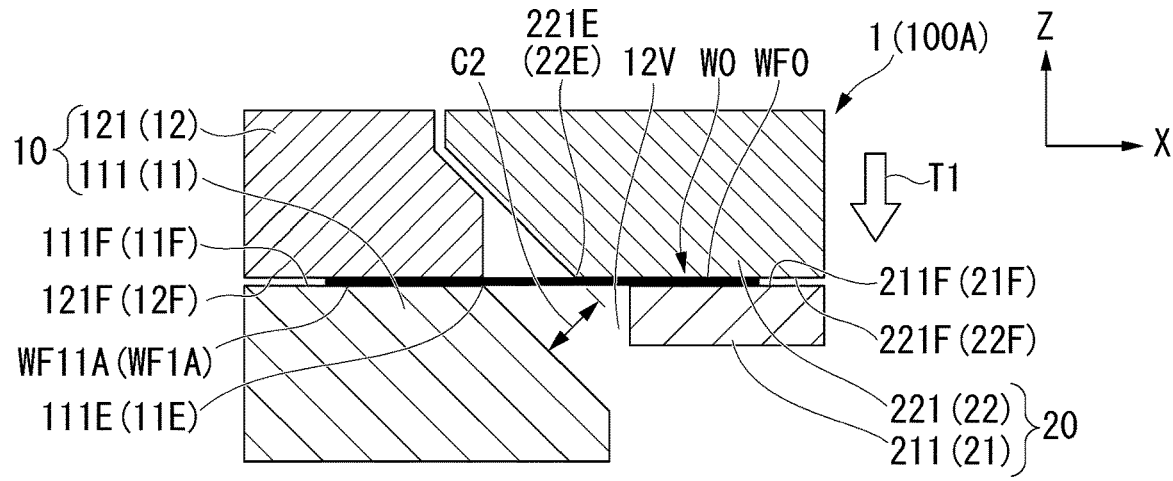
FIG. 15A is a diagram showing the manufacturing process in the longitudinal section shown in FIG. 12A of the structural member according to the second embodiment, and is a vertical sectional view showing a state where the upper die is lowered to clamp the portions corresponding to the first region and the inclined portion.
Figure 15B:
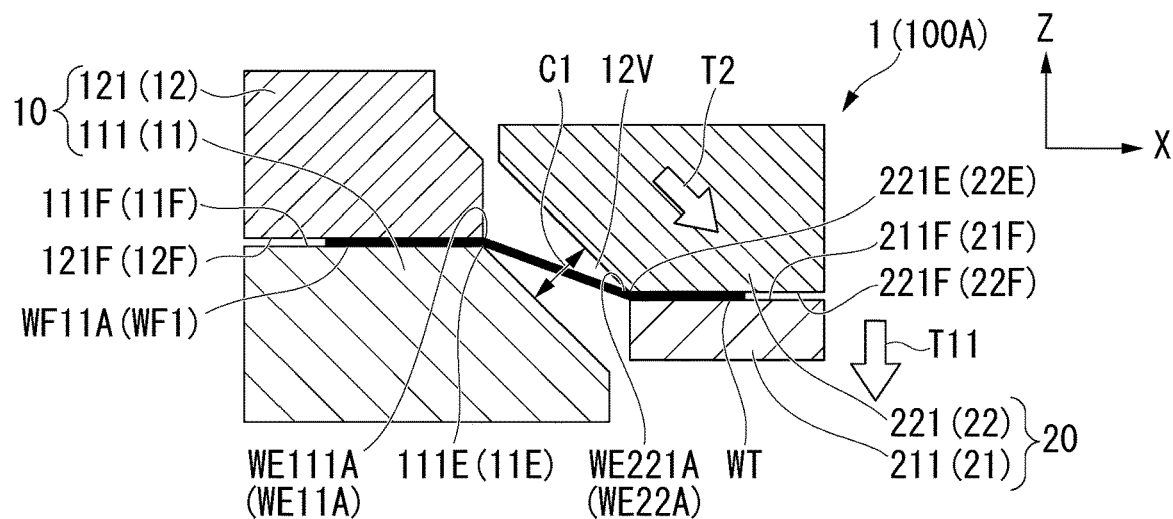
FIG. 15B is a diagram showing the manufacturing process in the cross section shown in FIG. 12A of the structural member according to the second embodiment, and is a vertical sectional view showing a state where the second clamping part is lowered to form the inclined portion while pulling it.
Figure 15C:
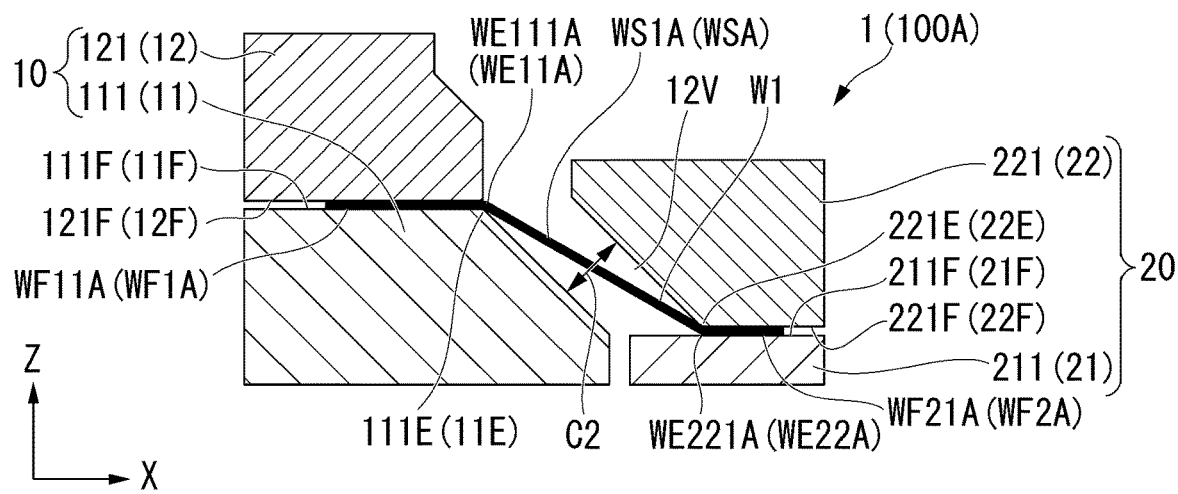
FIG. 15C is a diagram showing the manufacturing process in the cross section shown in FIG. 12A of the structural member according to the second embodiment, and is a vertical sectional view showing a state where the second clamping part is lowered to the bottom dead point, so that the forming of the structural member is completed.
Figure 16A:
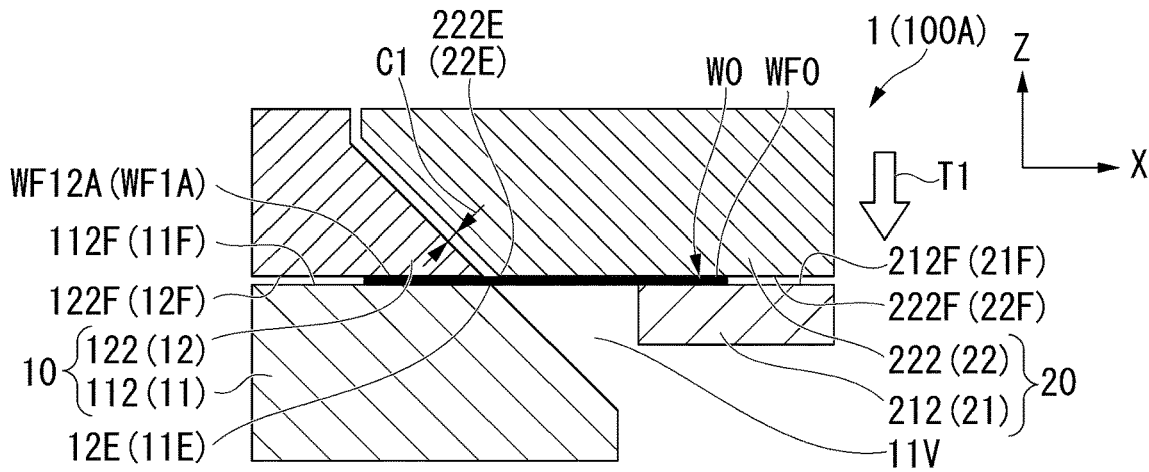
FIG. 16A is a diagram showing the manufacturing process in the cross section shown in FIG. 12B of the structural member according to the second embodiment, and is a vertical sectional view showing a state where the upper die is lowered to clamp the portions corresponding to the first region and the inclined portion.
Figure 16B:
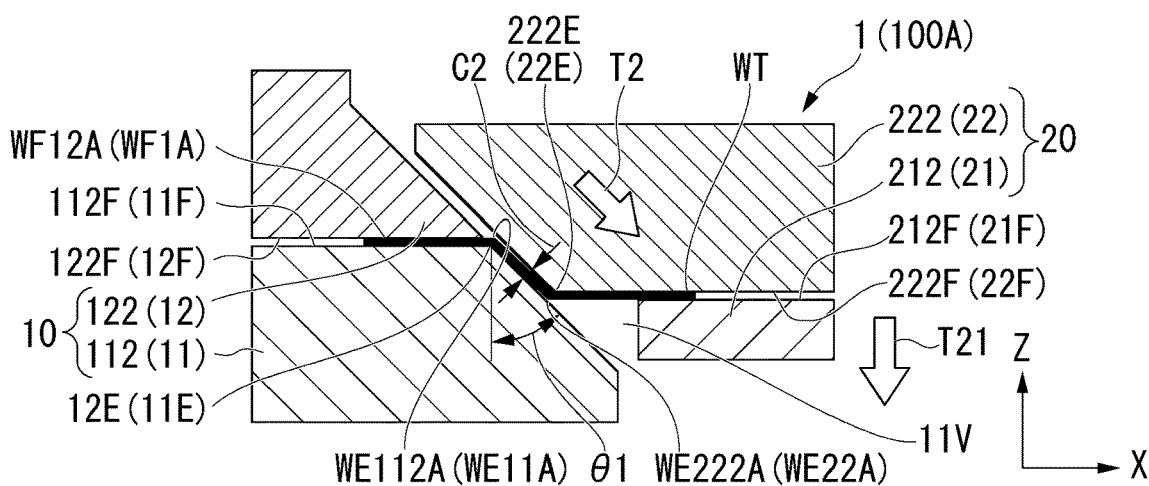
FIG. 16B is a diagram showing the manufacturing process in the cross section shown in FIG. 12B of the structural member according to the second embodiment, and is a vertical sectional view showing a state where the second clamping part is lowered to form the inclined portion while pulling it.
Figure 16C:
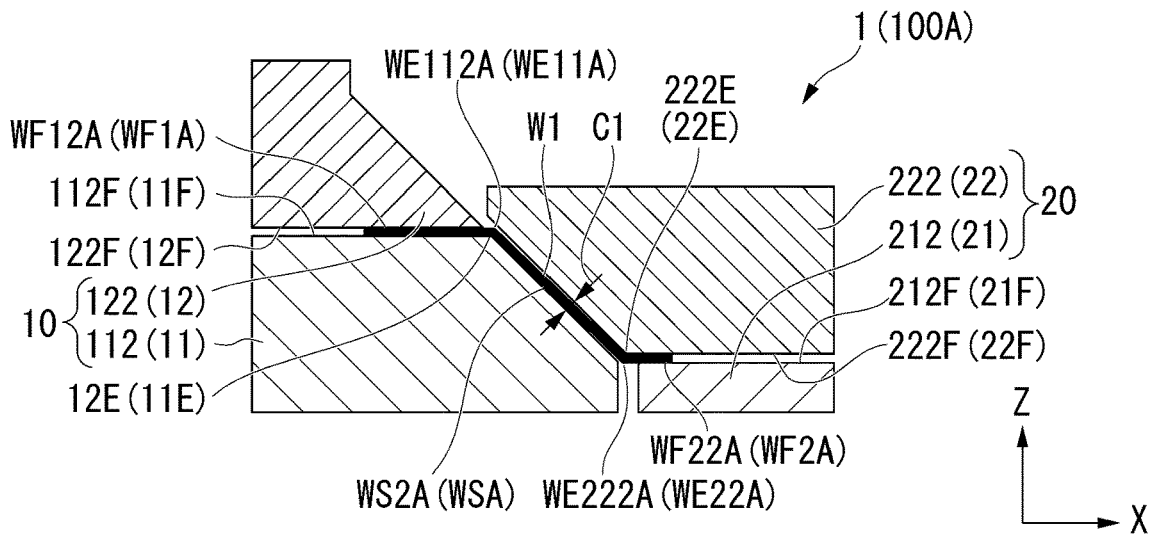
FIG. 16C is a diagram showing the manufacturing process in the cross section shown in FIG. 12B of the structural member according to the second embodiment, and is a vertical sectional view showing a state where the second clamping part is lowered to the bottom dead point, so that the forming of the structural member is completed.

FIGS. 15A and 16A are diagrams showing a state where the upper die of the structural member manufacturing die 100A is lowered to clamp the portions corresponding to the first region and the inclined portion. FIGS. 15B and 16B are diagrams showing a state where the second clamping part is lowered to form the inclined portion while pulling it. FIGS. 15C and 16C are diagrams showing a state where the upper die of the structural member manufacturing die 100A is lowered to the bottom dead point to complete the forming of the structural member W1.

First, the outline of the manufacturing process of the structural member W1 in the cross section shown in FIG. 12A will be described with reference to FIGS. 15A to 15C.

A material and thickness of the blank steel sheet W0 do not need to be limited. However, a particularly large effect can be obtained with respect to, for example, a thin steel sheet in which wrinkles and cracks easily occur in the drawing of the steel sheet having tensile strength of 980 MPa or more and a sheet thickness in the range of 0.6 mm to 3.2 mm.

(A) Upper Die Lowering (Clamping of Portions Corresponding to First Region and Inclined Portion)

First, the blank steel sheet W0 is disposed in the structural member manufacturing die 100A.

Then, as shown in FIG. 15A, the upper die is lowered in the direction of the arrow T1 by the forming press apparatus (not shown), so that the portion corresponding to the first region WF11A (WF1A) of the blank steel sheet W0 is clamped by the first clamping surface 111F (11F) and the second clamping surface 121F (12F) of the first clamping part 10 and the portion WF0 corresponding to the inclined portion of the blank steel sheet W0 is clamped by the third clamping surface 211F (21F) and the fourth clamping surface 221F (22F) of the second clamping part 20.

At this time, the clamping of the portion corresponding to the first region WF11A (WF1A) by the first clamping surface 111F (11F) and the second clamping surface 121F (12F) is performed earlier than (in advance of) the clamping of the portion WF0 corresponding to the inclined portion by the third clamping surface 211F (21F) and the fourth clamping surface 221F (22F).

(B) Second Clamping Part Lowering (Inclined Portion Forming)

Next, as shown in FIG. 15B, the upper die is further lowered in a state where the movement of the first clamping part 10 is stopped and the portion correspond to the first region WF11A (WF1A) is clamped by the first clamping surface 111F (11F) and the second clamping surface 121F (12F). Then, the third lower clamping member 211 (21) is lowered in the direction of the arrow T11, and the fourth upper clamping member (the second restraining part) 221 (22) is moved in the direction of the arrow T2.

Then, the portion WF0 corresponding to the inclined portion clamped by the second clamping part 20 is pulled toward the first region-side edge portion 111E side and drawn from the second clamping part 20, in a state where the portion WT configuring the inclined portion is clamped by the third clamping surface 211F and the fourth clamping surface 221F while the portion on the first clamping part 10 side is in contact with the first region-side edge portion (the first clamping edge portion) 111E (11E). The portion WT configuring the inclined portion in the structural member W1 comes into contact with the second region-side edge portion (the second clamping edge portion) 221E (22E) of the fourth upper clamping member 221 (22) and is formed while being pulled between the first region-side edge portion 111E (11E) and the second region-side edge portion 221E (22E), when being drawn from the second clamping part 20.

(C) Forming Completion (Bottom Dead Point)

Subsequently, as shown in FIG. 15C, the second clamping part 20 is lowered to the bottom dead point, so that the first region-side connection portion WE111A (WE11A), the inclined portion WS1A (WSA), and the second region-side connection portion WE221A (WE22A), and the second region WF21A (WF2A) of the structural member W1 are formed, and the forming of the structural member W1 is completed.

In the forming of the structural member W1 in this cross section, the interval C1 is maintained between the first lower clamping member (the first restraining part) 111 (11) and the fourth upper clamping member (the second restraining part) 221 (22).

Next, the outline of the manufacturing process of the structural member W1 in the cross section shown in FIG. 12B will be described with reference to FIGS. 16A to 16C (A) Upper Die Lowering (Clamping of Portions Corresponding to First Region and Inclined Portion)

First, the blank steel sheet W0 is disposed in the structural member manufacturing die 100A.

Then, as shown in FIG. 16A, the upper die is lowered in the direction of the arrow T1 by the forming press apparatus (not shown), so that the portion corresponding to the first region WF12A (WF1A) of the blank steel sheet W0 is clamped by the first clamping surface 112F (11F) and the second clamping surface 122F (12F) of the first clamping part 10 and the portion WF0 corresponding to the inclined portion of the blank steel sheet W0 is clamped by the third clamping surface 212F (21F) and the fourth clamping surface 222F (22F) of the second clamping part 20.

At this time, the clamping of the portion corresponding to the first region WF12 (WF1) by the first clamping surface 112F (11F) and the second clamping surface 122F (12F) is performed earlier than (in advance of) the clamping of the portion WF0 corresponding to the inclined portion by the third clamping surface 212F (21F) and the fourth clamping surface 222F (22F).

(B) Second Clamping Part Lowering (Inclined Portion Forming)

Next, as shown in FIG. 16B, the upper die is lowered in a state where the movement of the first clamping part 10 is stopped and the portion correspond to the first region WF12A (WF1A) is clamped by the first clamping surface 112F (11F) and the second clamping surface 122F (12F). Then, the third lower clamping member 212 (21) is lowered in the direction of the arrow T21, and the fourth upper clamping member 222 (22) is moved in the direction of the arrow T2.

Then, the portion WF0 corresponding to the inclined portion clamped by the second clamping part 20 is pulled toward the first region-side edge portion 112E side and drawn from the second clamping part 20, in a state where the portion on the first clamping part 10 side is pressed by the first region-side edge portion (the first clamping edge portion) 112E (11E) and the portion WT configuring the inclined portion is clamped by the third clamping surface 212F and the fourth clamping surface 222F.

The portion WT configuring the inclined portion in the structural member W1 comes into contact with the second region-side edge portion (the second clamping edge portion) 222E (22E) of the fourth upper clamping member 222 (22) and is formed while being pulled between the first region-side edge portion 112E (11E) and the second region-side edge portion 222E (22E), when being drawn from the second clamping part B20.

(C) Forming Completion (Bottom Dead Point)

Subsequently, as shown in FIG. 16C, the second clamping part 20 is lowered to the bottom dead point, so that the first region-side connection portion WE112A (WE11A), the inclined portion WS2A (WSA), and the second region-side connection portion WE222A (WE22A), and the second region WF22A (WF2A) of the structural member W1 are formed, and the forming of the structural member W1 is completed.

In the forming of the structural member W1 in this cross section, the interval C2 is maintained between the first lower clamping member 112 (11) and the fourth upper clamping member 222 (22).

In this embodiment, the first lower clamping member (the first restraining part) 111 (11) and the fourth upper clamping member (the second restraining part) 221 (22) are relatively moved in a direction which they are separated from each other, along a smaller intersection angle of two intersection angles of the intersection angle with the third direction of the first inclined portion WS1A and the intersection angle with the third direction of each of the pair of second inclined portions WS2A.

The structural member W1 according to this embodiment satisfies the following conditions.

That is, the structural member W1 is made of a steel sheet having tensile strength of 780 MPa or more, and satisfies a sheet thickness of 0.8 mm or more and 2.3 mm or less. Then, a maximum sheet thickness region portion having the maximum sheet thickness on the first inclined portion WS1 side and a minimum sheet thickness region portion formed on the second inclined portion WS2 side with respect to the maximum sheet thickness region portion and having the minimum sheet thickness are formed in the third inclined portion WS3. Further, the sheet thickness ratio A of the minimum sheet thickness region portion to the maximum sheet thickness region portion, which is obtained by the following Expression 1, satisfies the following Expression 2.

Sheet thickness ratio $A$=([maximum sheet thickness (mm) of the maximum sheet thickness region portion]−[minimum sheet thickness (mm) of the minimum sheet thickness region portion])/ [maximum sheet thickness (mm) in the maximum sheet thickness region portion]   Expression 1

$0.08 \leq A \leq 0.26$   Expression 2

As described in the first embodiment, in the second embodiment as well, similarly, an increase or decrease in sheet thickness occurs in the inclined portion WSA.

Specifically, in the sheet thickness of the structural member W1, in the first inclined portion WS1A and the second inclined portion WS2A which are formed orthogonal to the first plane, of the inclined portion WSA configuring the substantially channel-shaped recessed part WU, the increase or decrease in sheet thickness is small, and in the third inclined portion WS3A, the increase or decrease occurs.

Further, the sheet thickness in the third inclined portion WS3A increases in the vicinity of the first region connection portion WE113 having a recessed ridge when viewed from the upper side in the Z-axis direction (the side opposite to a deformation direction of the blank steel sheet W0), and the sheet thickness decreases in the vicinity of the second region connection portion WE223 having a protruding ridge.

According to the structural member manufacturing method and the structural member manufacturing die 100A according to the second embodiment, the portion corresponding to the first region WF1 of the blank steel sheet W0 is clamped by the first clamping part 10, and the portion WF0 corresponding to the inclined portion of the blank steel sheet W0 is clamped by the second clamping part 20. Then, the first clamping part 10 and the second clamping part 20 are relatively moved along the minimum intersection angle θ1 in the first inclined portion (the specific inclined portion) WS1A to pull the blank steel sheet W0 to form the inclined portion WSA. As a result, since the occurrence of compression in the plane direction in the vicinity of the connection portion of the blank steel sheet W0 is suppressed, the generation of wrinkles can be suppressed. As a result, the structural member W1 can be efficiently manufactured.

Third Embodiment

Figure 17:
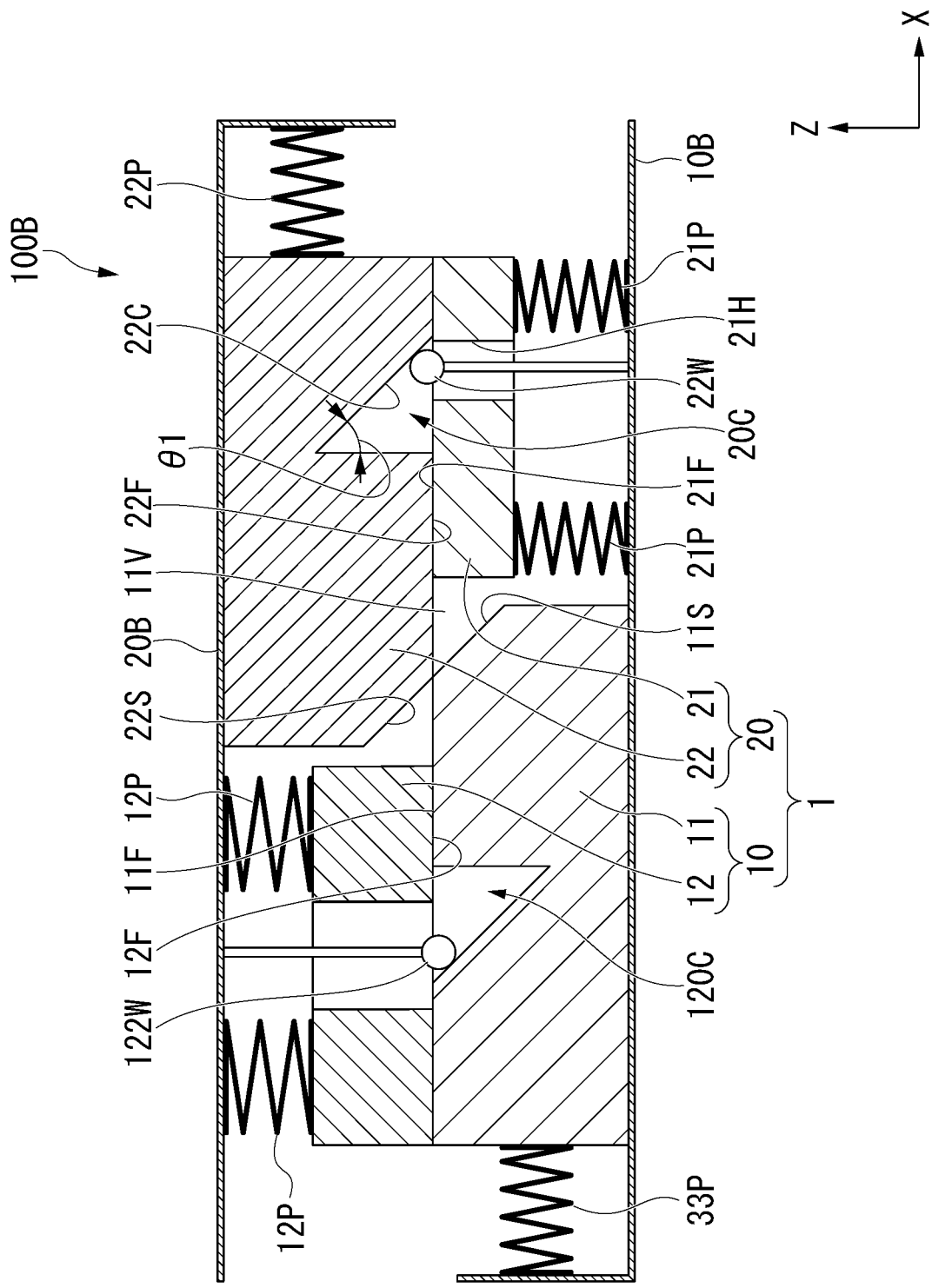
FIG. 17 is a vertical sectional view showing a schematic configuration of a structural member manufacturing die according to the third embodiment of the present invention.
Figure 19A:
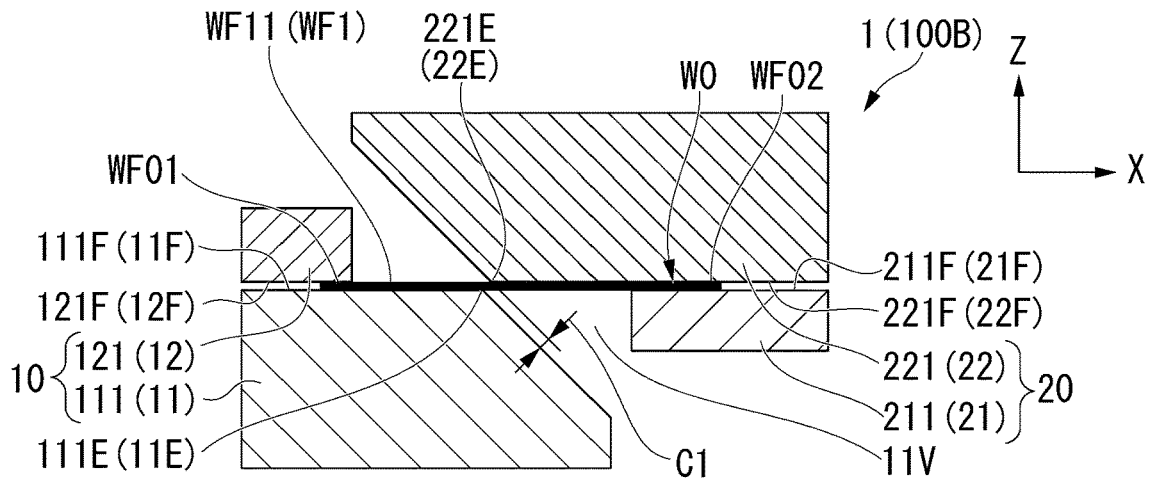
FIG. 19A is a diagram showing the manufacturing process in the cross section shown in FIG. 2A of the structural member according to the third embodiment, and is a vertical sectional view showing a state where the upper die and the lower die come close to each other to clamp the portions corresponding to the first region and the inclined portion.
Figure 19B:
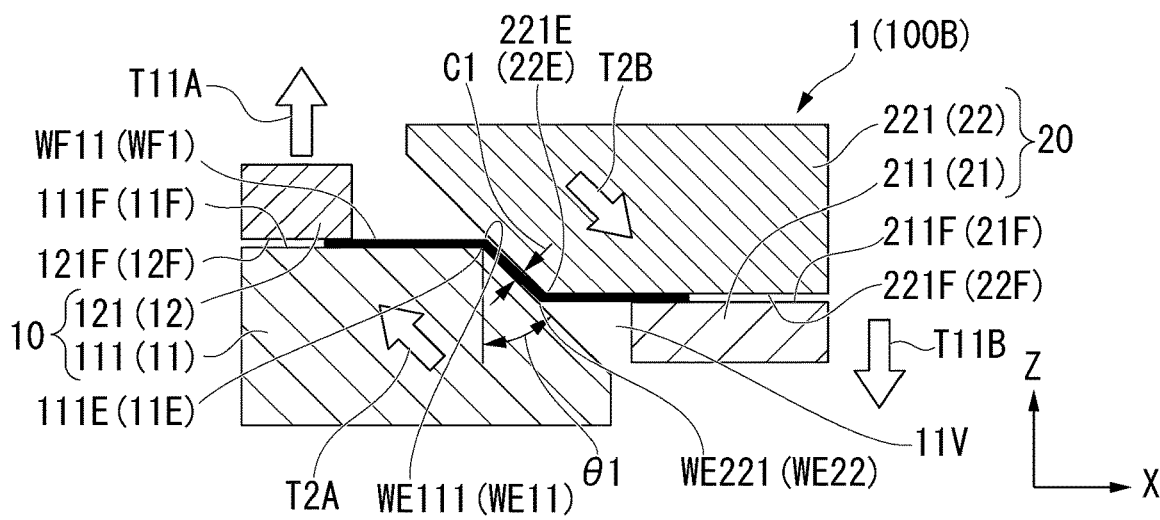
FIG. 19B is a diagram showing the manufacturing process in the cross section shown in FIG. 2A of the structural member according to the third embodiment, and is a vertical sectional view showing a state where the first clamping part and the second clamping part are relatively separated from each other in the up-down direction to form the inclined portion while pulling it.
Figure 19C:
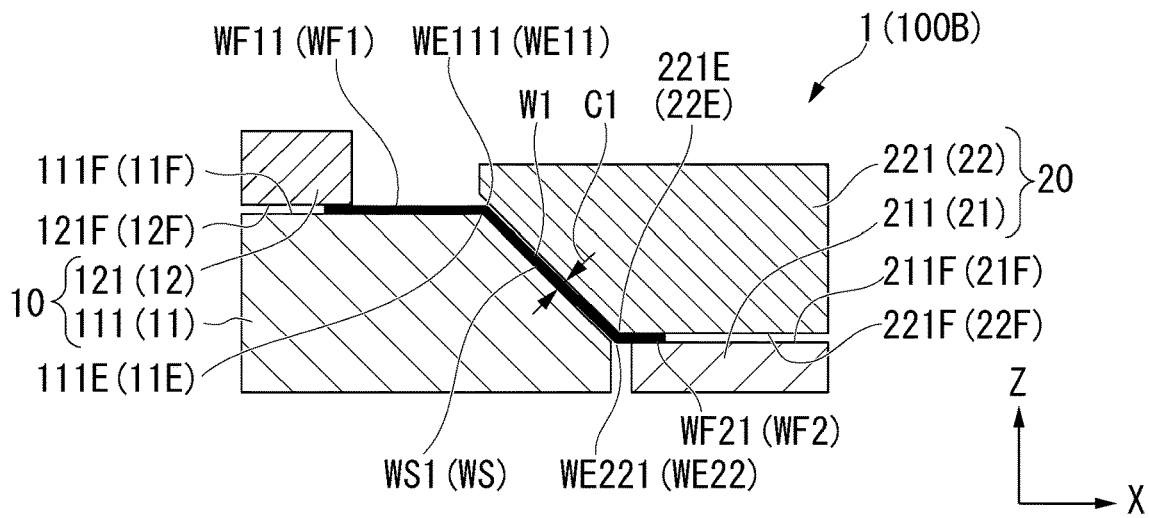
FIG. 19C is a diagram showing the manufacturing process in the cross section shown in FIG. 2A of the structural member according to the third embodiment, and is a vertical sectional view showing a state where the first clamping part and the second clamping part are relatively separated from each other to the forming end position, so that the forming of the structural member is completed.
Figure 20A:
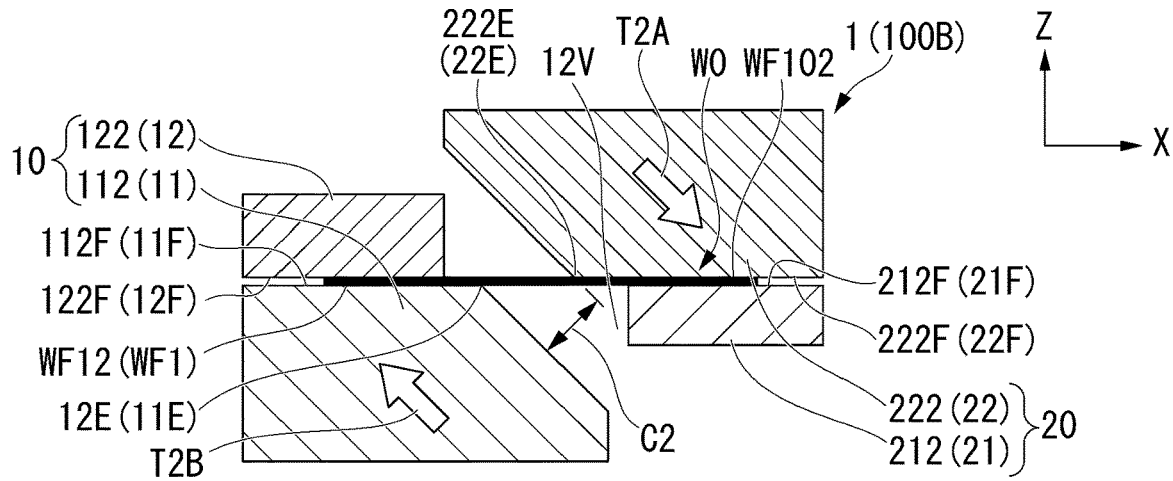
FIG. 20A is a diagram showing the manufacturing process in the longitudinal section shown in FIG. 2B of the structural member according to the third embodiment, and is a vertical sectional view showing a state where the upper die and the lower die come close to each other to clamp the portions corresponding to the first region and the inclined portion.
Figure 20B:
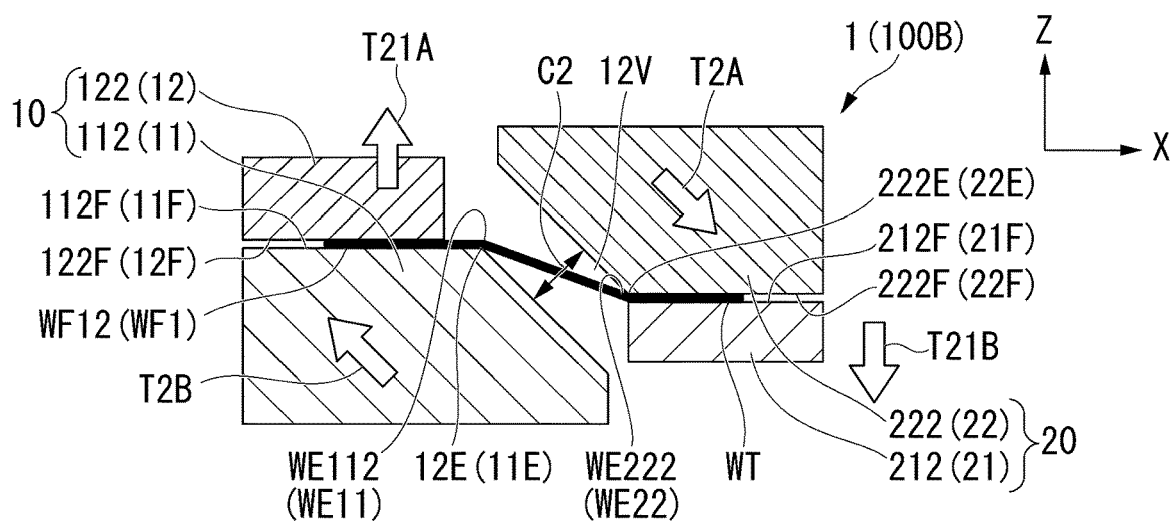
FIG. 20B is a diagram showing the manufacturing process in the cross section shown in FIG. 2B of the structural member according to the third embodiment, and is a vertical sectional view showing a state where the first clamping part and the second clamping part are relatively separated from each other in the up-down direction to form the inclined portion while pulling it.
Figure 20C:
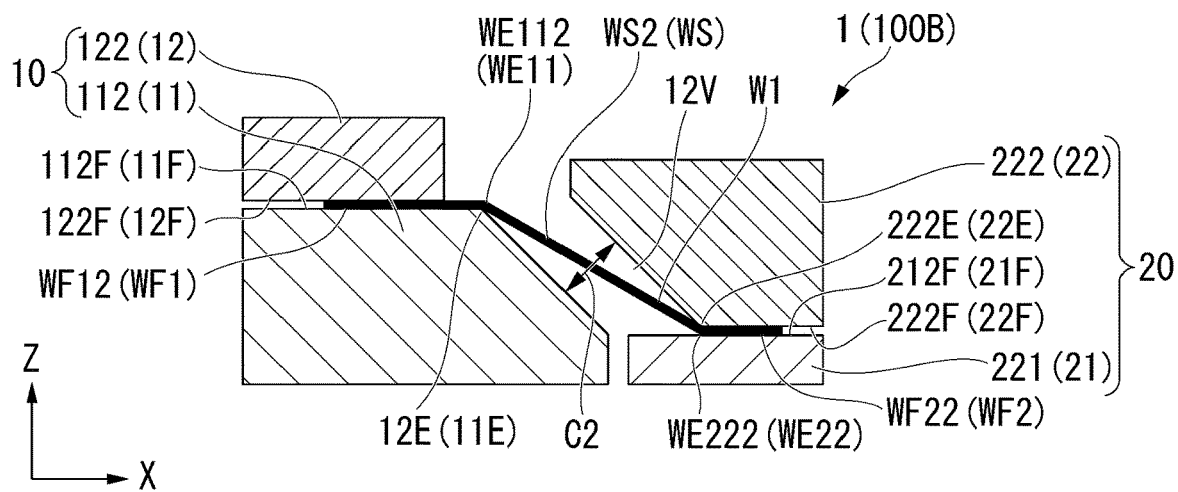
FIG. 20C is a diagram showing the manufacturing process in the cross section shown in FIG. 2B of the structural member according to the first embodiment, and is a vertical sectional view showing a state where the first clamping part and the second clamping part are relatively separated from each other to the forming end position, so that the forming of the structural member is completed.

Next, the forming of the structural member W1 by a structural member manufacturing die 100B according to a third embodiment of the present invention will be described with reference to FIGS. 17 to 20C. FIG. 17 is a vertical sectional view showing the schematic configuration of the structural member manufacturing die 100B according to the third embodiment. FIGS. 18A to 18D are diagrams showing the operation of the structural member manufacturing die 100B in a manufacturing process of the structural member according to the third embodiment. FIGS. 19A to 19C are vertical sectional views showing a manufacturing process in the cross section shown in FIG. 2A of the structural member W1 according to the third embodiment. FIGS. 20A to 20C are vertical sectional views showing a manufacturing process in the cross section shown in FIG. 2B of the structural member W1 according to the third embodiment.

In the structural member manufacturing die 100B that is used in the third embodiment, as shown in FIG. 17, the cam mechanism 20C in the first embodiment is also provided on the first clamping part 10 side. Then, these cam mechanisms 20C operate in synchronization with each other, so that the first clamping part 10 and the second clamping part 20 can be relatively moved along the minimum intersection angle θ1 of the structural member W1.

The first clamping surface 11F, the second clamping surface 12F, the third clamping surface 21F, and the fourth clamping surface 22F are formed smoothly without any irregularity that causes catching when the blank steel sheet W0 is pulled.

In this embodiment, the disposition of the blank steel sheet W0 and the forming operation by the press forming device in the X-axis direction (a tensile direction) with respect to the structural member manufacturing die 100B when starting the forming are different from those in the first embodiment.

The operation of the structural member manufacturing die 100B according to the third embodiment will be described with reference to FIGS. 18A to 18D. For convenience, the blank steel sheet W0, the structural member W1, and the like are not shown in FIGS. 18A to 18D.

(A) Forming Preparation (Original Position)

First, the structural member manufacturing die 100B is mounted to the forming press apparatus (not shown), and the upper die is located at the top dead point. When the upper die is located at the top dead point, as shown in FIG. 18A, the first clamping part 10 and the second clamping part 20 are at the original positions, and the second clamping surface 12F of the second upper clamping member 12 is at the same position as than the fourth clamping surface 22F of the fourth upper clamping member 22.

(B) Upper Die Lowering (Clamping of Portions Corresponding to First Region and Inclined Portion)

Figure 18A:
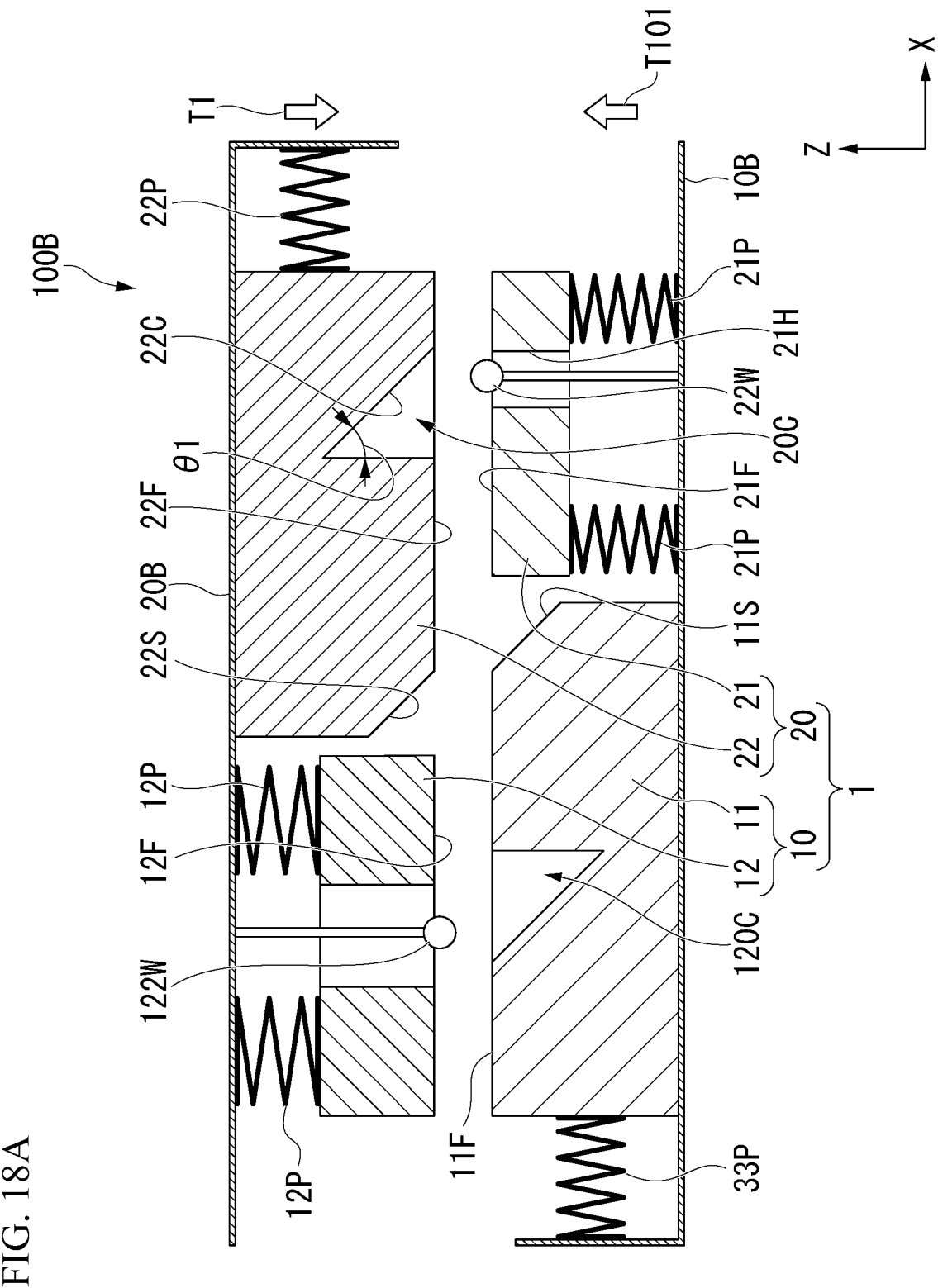
FIG. 18A is a diagram showing the operation of the structural member manufacturing die in a manufacturing process of the structural member according to the third embodiment, and is a vertical sectional view showing a forming preparation state in which the upper die is disposed at the top dead point in the manufacturing process.

Next, as shown in FIG. 18A, the upper die is lowered in the direction of the arrow T1 (to the lower side in the Z-axis direction), and at the same time, the lower die is raised in the direction of an arrow T101 (to the upper side in the Z-axis direction).

Figure 18B:
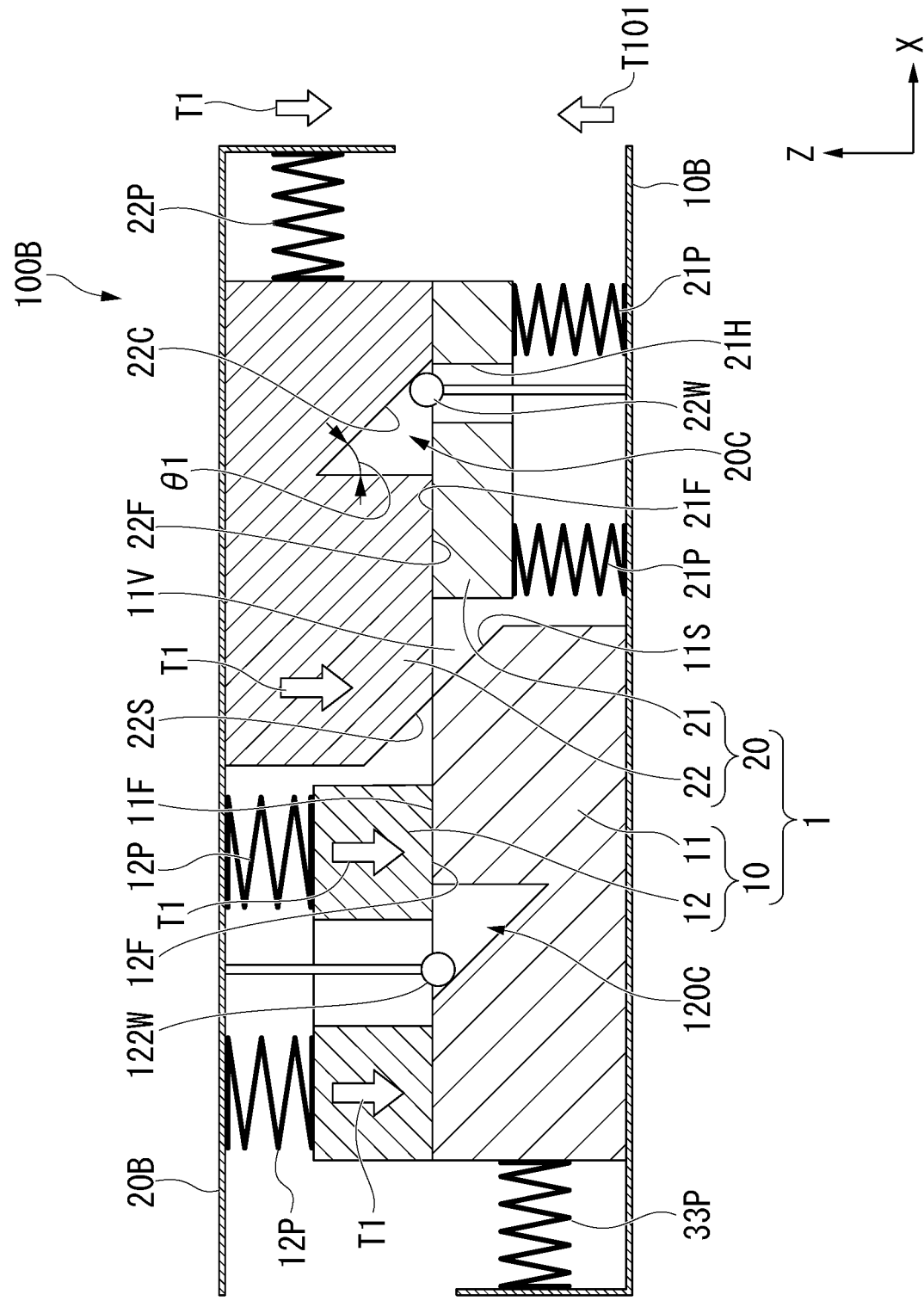
FIG. 18B is a diagram showing the operation of the structural member manufacturing die in the manufacturing process of the structural member according to the third embodiment, and is a vertical sectional view showing a state where the upper die and the lower die come close to each other to clamp the portion corresponding to the first region and the portion corresponding to the inclined portion.

Subsequently, as shown in FIG. 18B, when the upper die is lowered in the direction of the arrow T1 (to the lower side in the Z-axis direction) and the lower die is raised in the direction of an arrow T101 (to the upper side in the Z-axis direction), first, the second clamping surface 12F of the second upper clamping member 12 clamps the portion corresponding to the first region, and at the same time, the third clamping surface 21F of the third lower clamping member 21 clamps the portion corresponding to the second region.

In this manner, after the second upper clamping member 12 and the fourth upper clamping member 22 simultaneously clamp the blank steel sheet W0 (not shown), the lowering of the upper die and the rising of the lower die further proceed, and the coil springs (the clamping member return mechanisms) 12P and 21P are compressed, so that the portion corresponding to the inclined portion of the blank steel sheet W0 is clamped.

Then, the cam follower 22W of the second clamping part 20 comes into contact with the cam-shaped portion 22C at a timing when the third lower clamping member 21 and the fourth upper clamping member 22 come into contact with each other. Further, a cam follower 122W of the first clamping part 10 comes into contact with a cam-shaped portion 120C at a timing when the first lower clamping member 11 and the second upper clamping member 12 come into contact with each other.

In this state, the clamping force of the first region WF1 by the first clamping part 10 (the first clamping surface 11F of the first lower clamping member 11 and the second clamping surface 12F of the second upper clamping member 12) based on the coil spring 12P is set so as to be almost the same as the clamping force of the portion WF0 corresponding to the inclined portion by the second clamping part 20 based on the coil spring 21P. The expression, almost the same, means that the difference between a large value and a small value is within the range of 20% or less of the large value.

Figure 18C:
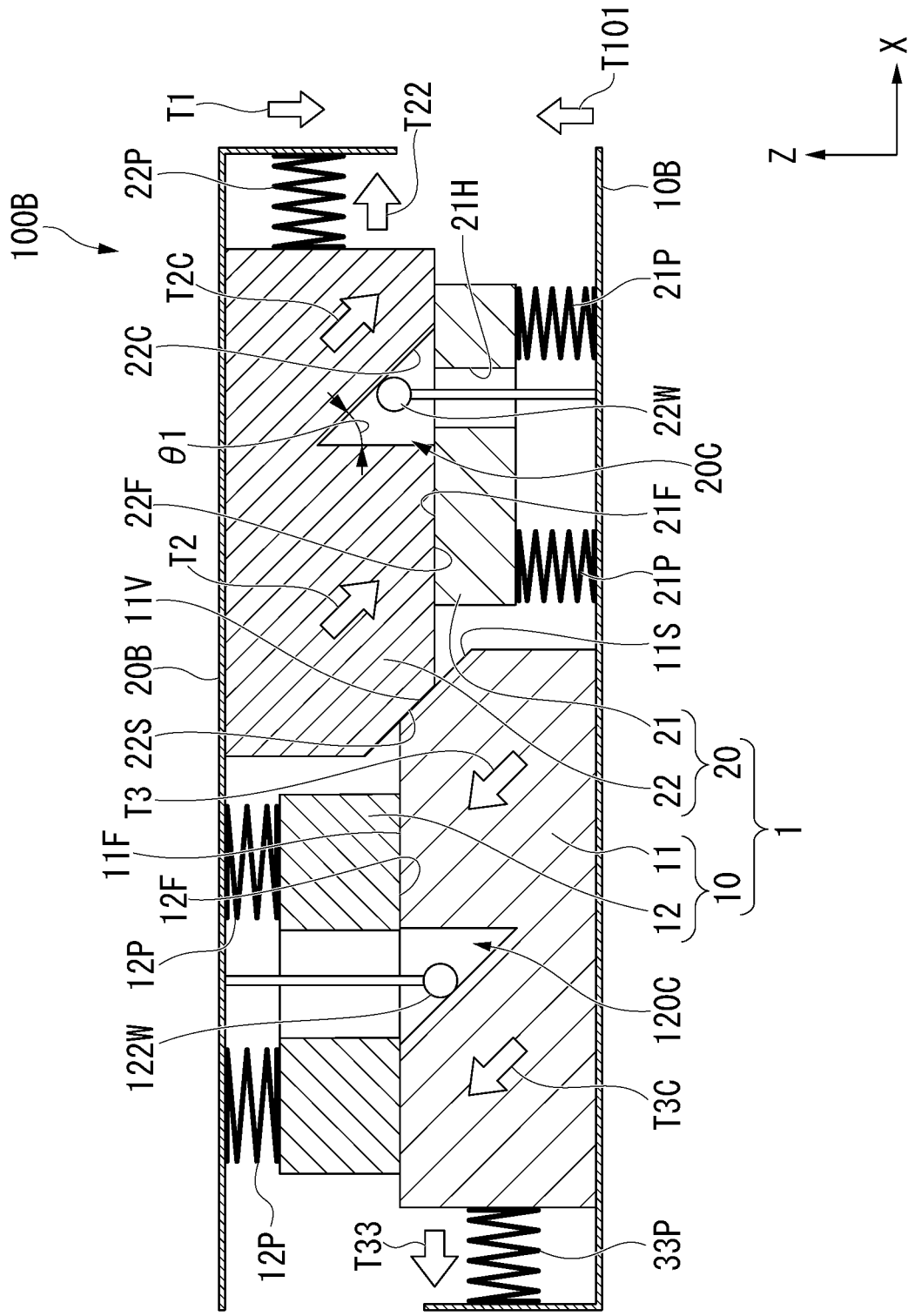
FIG. 18C is a diagram showing the operation of the structural member manufacturing die in the manufacturing process of the structural member according to the third embodiment, and is a vertical sectional view showing a state where the first clamping part and the second clamping part are relatively separated from each other in an up-down direction to form the inclined portion while pulling it.

(C) Second Clamping Part Lowering (Inclined Portion Forming) Subsequently, as shown in FIG. 18C, the second clamping part 20 is further lowered toward the lower side in the Z-axis direction, and at the same time, the first clamping part 10 is raised toward the upper side in the Z-axis direction. At this time, the third lower clamping member 21 is lowered toward the direction of the arrow T1 (the lower side in the Z-axis direction). At the same time, the fourth upper clamping member 22 is moved in the direction of the arrow T2 by the action of the cam mechanism 20C guiding the fourth upper clamping member 22 in the direction of the arrow T2C.

Each of the arrows T2C and T2 is the direction along the inclination angle (θ1) of the first inclined portion WS1 of the structural member W1.

When the third lower clamping member 21 moves in the direction of the arrow T1, the coil spring 21P is compressed to bias the third lower clamping member 21 upward.

Further, the fourth upper clamping member 22 moves in the direction of the arrow T2, so that the coil spring 22P is compressed in the direction of the arrow T22, and the fourth upper clamping member 22 is biased on the side opposite to the moving direction.

Further, the second upper clamping member 12 is raised toward the direction of the arrow T101 (the upper side in the Z-axis direction). At the same time, the first lower clamping member 11 is moved in the direction of an arrow T3 by the action of the cam mechanism 120C guiding the first lower clamping member 11 in the direction of an arrow T3C.

Each of the arrows T3 and T3C is the direction along the inclination angle (θ1) of the first inclined portion WS1 of the structural member W1.

When the second upper clamping member 12 moves in the direction of the arrow T1, the coil spring 12P is compressed to bias the second upper clamping member 12 upward.

Further, the first lower clamping member 11 moves in the direction of the arrow T3, so that a coil spring 33P is compressed in the direction of an arrow T33, and the first lower clamping member 11 is biased on the side opposite to the moving direction.

Then, the blank steel sheet W0 clamped by the second clamping part 20 and the blank steel sheet W0 clamped by the first clamping part 10 are pulled, thereby being formed while being drawn from the second clamping part 20 and the first clamping part 10.

While the second clamping part 20 is lowered and the first clamping part 10 is raised (the inclined portion is formed), the clamping force of the first region WF1 by the first clamping part 10 through the coil spring 12P is set so as to be maintained at a force that is almost the same as the clamping force of the portion WF0 corresponding to the inclined portion by the second clamping part 20 through the coil spring 21P. The expression, almost the same, means that the difference between a large value and a small value is within the range of 20% or less of the large value.

(D) Forming Completion (Bottom Dead Point)

Figure 18D:
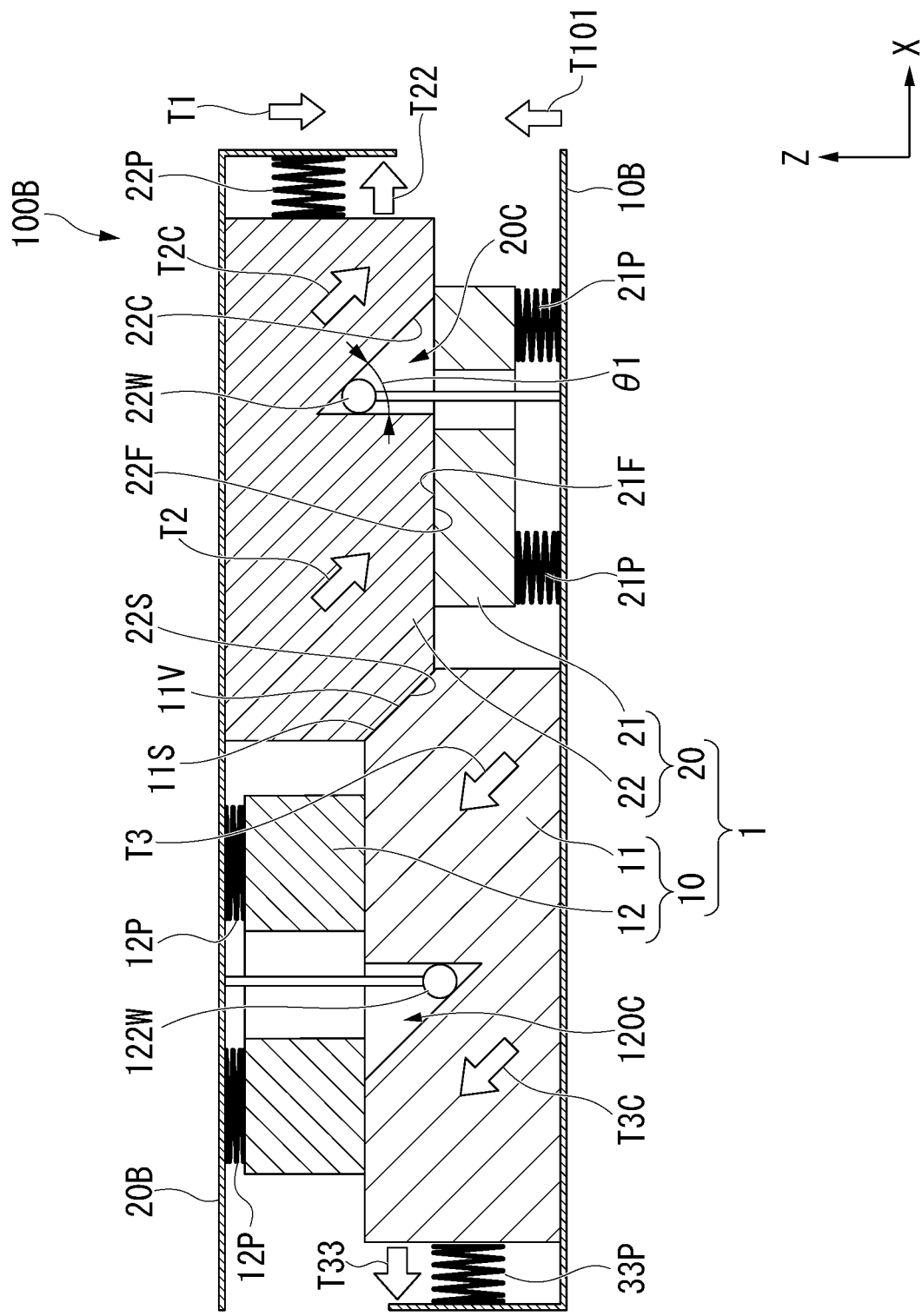
FIG. 18D is a diagram showing the operation of the structural member manufacturing die in the manufacturing process of the structural member according to the third embodiment, and is a vertical sectional view showing a state where the first clamping part and the second clamping part are relatively separated from each other to a forming end position in the manufacturing process, so that the forming of the structural member is completed.

Subsequently, as shown in FIG. 18D, the upper die is further lowered to the lowering end toward the direction of the arrow T1 (the lower side in the Z-axis direction), and at the same time, the lower die is further raised to the rising end toward the direction of the arrow T101 (the upper side in the Z-axis direction), and at the same time, the forming of the structural member W1 is completed.

Then, the upper die is raised by the forming press apparatus to open the structural member manufacturing die 100B, and the structural member W1 (not shown) is taken out.

At this time, the first lower clamping member 11 is returned to the original position by the coil spring 33P, the second upper clamping member 12 is returned to the original position by the coil spring 12P, the third lower clamping member 21 is returned to the original position by the coil spring 21P, and the fourth upper clamping member 22 is returned to the original position by the coil spring 22P.

Next, the forming of the structural member W1 by the structural member manufacturing die 100B according to the third embodiment will be described with reference to FIGS. 19A to 20C.

FIGS. 19A to 19C and 20A to 20C are diagrams showing the outline of the manufacturing process in the cross sections shown in FIGS. 2A and 2B.

First, the outline of the manufacturing process of the structural member W1 in the cross section shown in FIG. 2A will be described with reference to FIGS. 19A to 19C.

(A) Clamping of Blank by First Clamping Part 10 and Second Clamping Part 20

First, as shown in FIG. 19A, the blank steel sheet W0 is disposed in the structural member manufacturing die 100B, and the blank steel sheet W0 is clamped by the first clamping part 10 and the second clamping part 20.

At this time, the first clamping part 10 clamps a portion WF01 corresponding to the first region and the inclined portion of the blank steel sheet W0, and the second clamping part 20 clamps a portion WF02 corresponding to the second region and the inclined portion of the structural member.

Here, the portion WF01 corresponding to the first region and the inclined portion, which is clamped by the first clamping part 10, and the portion WF02 corresponding to the second region and the inclined portion, which is clamped by the second clamping part 20, are different from those in the first embodiment only in the dimension of the inclined portion to be pulled.

(B) Relative Movement of First Clamping Part and Second Clamping Part (Inclined Portion Forming)

Next, as shown in FIG. 19B, in a state where the blank steel sheet W0 is clamped in each of the first clamping part 10 and the second clamping part 20, the first clamping part 10 is raised in the direction of an arrow T11A and the second clamping part 20 is lowered to an arrow T11B.

In this way, the first lower clamping member (the first restraining part) 111 (11) and the fourth upper clamping member (the second restraining part) 221 (22) move relative to each other along the minimum intersection angle θ1. That is, the first lower clamping member 111 (11) moves in the direction of an arrow T2A along the minimum intersection angle θ1, and the fourth upper clamping member 221 (22) moves in the direction of an arrow T2B along the minimum intersection angle θ1.

Then, the portion corresponding to the inclined portion, of the portion WF01 clamped by the first clamping part 10, is drawn toward the second clamping part 20 side while being in contact with the first region-side edge portion (the first clamping edge portion) 111E (11E). At the same time, the portion corresponding to the inclined portion, of the portion WF02 clamped by the second clamping part 20, is drawn toward the first clamping part 10 side while being in contact with the second region-side edge portion (the second clamping edge portion) 221E (22E).

(C) Forming Completion

Subsequently, as shown in FIG. 19C, the first clamping part 10 is raised to the top dead point, and the second clamping part 20 is lowered to the bottom dead point. In this way, the first region WF11 (WF1), the first region-side connection portion WE111 (WE11), the inclined portion WS1 (WS), the second region-side connection portion WE221 (WE22), and the second region WF21 (WF2) of the structural member W1 are formed, and the forming of the structural member W1 is completed.

In the cross section of FIG. 19C, the interval C1 is maintained between the first lower clamping member (the first restraining part) 111 (11) and the fourth upper clamping member (the second restraining part) 221 (22).

Others are the same as those in the first embodiment, but will be described below.

Next, the outline of the manufacturing process of the structural member W1 in the cross section shown in FIG. 2B will be described with reference to FIGS. 20A to 20C.

(A) Clamping of Blank Steel Sheet by First Clamping Part 10 and Second Clamping Part 20

First, as shown in FIG. 20A, the blank steel sheet W0 is disposed in the structural member manufacturing die 100B, and the blank steel sheet W0 is clamped by the first clamping part 10 and the second clamping part 20. At this time, the first clamping part 10 clamps a portion WF12 corresponding to the first region and the inclined portion of the blank steel sheet W0, and the second clamping part 20 clamps a portion WF102 corresponding to the second region and the inclined portion of the structural member.

(B) Relative Movement of First Clamping Part and Second Clamping Part (Inclined Portion Forming)

Next, as shown in FIG. 20B, in a state where the blank steel sheet W0 is clamped in each of the first clamping part 10 and the second clamping part 20, the first clamping part 10 is raised in the direction of an arrow T21A and the second clamping part 20 is lowered to an arrow T21B. In this way, the first lower clamping member (the first restraining part) 112 (11) and the fourth upper clamping member (the second restraining part) 222 (22) move relative to each other along the minimum intersection angle θ1. That is, the first lower clamping member 112 (11) moves in the direction of the arrow T2A along the minimum intersection angle θ1, and the fourth upper clamping member 222 (22) moves in the direction of the arrow T2B along the minimum intersection angle θ1.

Then, the portion corresponding to the inclined portion, of the portion WF12 clamped by the first clamping part 10, is drawn toward the second clamping part 20 side while being in contact with the first region-side edge portion (the first clamping edge portion) 112E (11E). At the same time, the portion corresponding to the inclined portion, of the portion WF102 clamped by the second clamping part 20, is drawn toward the first clamping part 10 side while being in contact with the second region-side edge portion (the second clamping edge portion) 222E (22E).

The portion WT configuring the inclined portion in the structural member W1 is drawn from both the first clamping part 10 and the second clamping part 20.

When the portion WT configuring the inclined portion in the structural member W1 is drawn from the first clamping part 10, it comes into contact with the first region-side edge portion (the first clamping edge portion) 12E (11E) of the first lower clamping member 112 (11) and is formed while being pulled between the first region-side edge portion 12E (11E) and the second region-side edge portion 222E (22E).

When the portion WT configuring the inclined portion in the structural member W1 is drawn from the second clamping part 20, it comes into contact with the second region-side edge portion (the second clamping edge portion) 222E (22E) of the fourth upper clamping member 222 (22) and is formed while being pulled between the first region-side edge portion 12E (11E) and the second region-side edge portion 222E (22E).

(C) Forming Completion

Subsequently, as shown in FIG. 20C, the first clamping part 10 is raised to the bottom dead point, and the second clamping part 20 is lowered to the bottom dead point. In this way, the first region WF12 (WF1), the first region-side connection portion WE112 (WE11), the inclined portion WS2 (WS), the second region-side connection portion WE222 (WE22), and the second region WF22 (WF2) of the structural member W1 are formed, and the forming of the structural member W1 is completed. In the cross section of FIG. 13C, the interval C2 is maintained between the first lower clamping member (the first restraining part) 112 (11) and the fourth upper clamping member (the second restraining part) 222 (22).

The gist of each of the embodiments described above is summarized below.

(1) The structural member (W1) according to an aspect of the present invention is made of a metal material sheet, and includes: a first region (WF1) extending to intersect with a third direction among a first direction (X direction), a second direction (Y direction), and the third direction (Z direction) that are orthogonal to each other; a first ridge (first region-side connection portion WE11) connected to the first region and extending in the second direction; an inclined portion (WS) connected to the first region through the first ridge in the first direction and inclined with respect to the first region; a second ridge (second region-side connection portion WE22) formed at an end portion of the inclined portion on a side opposite to the first region in the first direction and extending along the second direction; and a second region (WF2) connected through the second ridge and extending to intersect with the third direction, in which in the inclined portion, an intersection angle with the third direction in a first plane that is defined by the first direction and the third direction changes according to a position in the second direction, and an intersection angle with the first direction in a second plane that is defined by the first direction and the second direction changes according to a position in the second direction, the inclined portion includes a pair of second inclined portions (WS2), each of which is located on each side of both end portion sides in the second direction, a pair of third inclined portions (WS3), each of which is connected to each of the pair of second inclined portions, and a first inclined portion (WS1) which is connected to both of the pair of third inclined portions, an intersection angle with the third direction of each of the pair of third inclined portions is in a range between an intersection angle with the third direction of the first inclined portion and an intersection angle with the third direction of each of the pair of second inclined portions, the first ridge has a convex shape whose center portion protrudes in a direction of the first region, the second ridge has a convex shape whose center portion protrudes to a side opposite to the second region, and a maximum sheet thickness region portion having a maximum sheet thickness on the first inclined portion side, and a minimum sheet thickness region portion formed on the second inclined portion side with respect to the maximum sheet thickness region portion and having a minimum sheet thickness are formed, and a sheet thickness ratio A of the minimum sheet thickness region portion to the maximum sheet thickness region portion, which is obtained by the following Expression 1, satisfies the following Expression 2.

the sheet thickness ratio $A=$([maximum sheet thickness (mm) of the maximum sheet thickness region portion]−[minimum sheet thickness (mm) of the minimum sheet thickness region portion])/[maximum sheet thickness (mm) in the maximum sheet thickness region portion]      Expression 1

$0.08 \leq A \leq 0.26$      Expression 2

(2) In the structural member according to the above (1), the structural member may be made of a steel sheet having tensile strength of 780 MPa or more.

(3) In the structural member according to the above (1) or (2), a sheet thickness may be 0.8 mm or more and 2.3 mm or less.

(4) In the structural member according to any one of the above (1) to (3), a difference between the intersection angle with the third direction of the first inclined portion and the intersection angle with the third direction of each of the pair of second inclined portions may be 8.0° or more.

(5) A structural member manufacturing method according to another aspect of the present invention is a structural member manufacturing method that is made of metal material sheet, and includes a first region extending to intersect with a third direction among a first direction, a second direction, and the third direction that are orthogonal to each other; a first ridge connected to the first region and extending in the second direction; an inclined portion connected to the first region through the first ridge in the first direction and inclined with respect to the first region; a second ridge formed at an end portion of the inclined portion on a side opposite to the first region in the first direction and extending along the second direction; and a second region connected through the second ridge and extending to intersect with the third direction, in which in the inclined portion, an intersection angle with the third direction in a first plane that is defined by the first direction and the third direction changes according to a position in the second direction, and an intersection angle with the first direction in a second plane that is defined by the first direction and the second direction changes according to a position in the second direction, the inclined portion includes a pair of second inclined portions, each of which is located on each side of both end portion sides in the second direction, a pair of third inclined portions, each of which is connected to each of the pair of second inclined portions, and a first inclined portion which is connected to both of the pair of third inclined portions, an intersection angle with the third direction of each of the pair of third inclined portions is in a range between an intersection angle with the third direction of the first inclined portion and an intersection angle with the third direction of each of the pair of second inclined portions, the first ridge has a convex shape whose center portion protrudes in a direction of the first region, and the second ridge has a convex shape whose center portion protrudes to a side opposite to the second region, the method including: a first process of restraining the first region by a first restraining part (first lower clamping member 11); a second process of restraining the second region by a second restraining part (fourth upper clamping member 22); and a third process of forming the inclined portion by relatively moving the first restraining part and the second restraining part in a direction in which the first restraining part and the second restraining part are separated from each other, along a smaller intersection angle of two intersection angles of an intersection angle with the third direction of the first inclined portion and an intersection angle with the third direction of each of the pair of second inclined portions.

(6) In the structural member manufacturing method according to the above (5), in a state where the metal material sheet is clamped by the first restraining part and the second restraining part, in the inclined portion having a smaller intersection angle with the third direction, of the first inclined portion and the pair of second inclined portions, an interval between the first restraining part and the second restraining part may be 1.03 times or more and 1.07 times or less a sheet thickness of the metal material sheet, and in the inclined portion having a larger intersection angle with the third direction, the first restraining part and the second restraining part may be separated from each other.

(7) In the structural member manufacturing method according to the above (5), the inclined portion may be formed while restraining a surface corresponding to the second region.

(8) In the structural member manufacturing method according to the above (5), the inclined portion may be formed while restraining a surface corresponding to the first region.

(9) In the structural member manufacturing method according to the above (5), the inclined portion may be formed while restraining the pair of second inclined portions.

(10) A structural member manufacturing device according to still another aspect of the present invention is a structural member manufacturing device that is made of metal material sheet, and includes a first region extending to intersect with a third direction among a first direction, a second direction, and the third direction that are orthogonal to each other; a first ridge connected to the first region and extending in the second direction; an inclined portion connected to the first region through the first ridge in the first direction and inclined with respect to the first region; a second ridge formed at an end portion of the inclined portion on a side opposite to the first region in the first direction and extending along the second direction; and a second region connected through the second ridge and extending to intersect with the third direction, in which in the inclined portion, an intersection angle with the third direction in a first plane that is defined by the first direction and the third direction changes according to a position in the second direction, and an intersection angle with the first direction in a second plane that is defined by the first direction and the second direction changes according to a position in the second direction, the inclined portion includes a pair of second inclined portions, each of which is located on each side of both end portion sides in the second direction, a pair of third inclined portions, each of which is connected to each of the pair of second inclined portions, and a first inclined portion which is connected to both of the pair of third inclined portions, an intersection angle with the third direction of each of the pair of third inclined portions is in a range between an intersection angle with the third direction of the first inclined portion and an intersection angle with the third direction of each of the pair of second inclined portions, the first ridge has a convex shape whose center portion protrudes in a direction of the first region, and the second ridge has a convex shape whose center portion protrudes to a side opposite to the second region, the device including: a first clamping part (10) having a first lower clamping member (11) and a second upper clamping member (12) that are disposed to face each other and are opened and closed; a second clamping part (20) having a third lower clamping member (21) and a fourth upper clamping member (22) that are disposed to face each other with respect to the first lower clamping member and the second upper clamping member and are opened and closed; and clamping part driving means for allowing the first clamping part and the second clamping part to relatively move in a direction in which the first clamping part and the second clamping part are separated from each other, along a smaller intersection angle of two intersection angles of an intersection angle with the third direction of the first inclined portion and an intersection angle with the third direction of each of the pair of second inclined portions.

(11) In the structural member manufacturing device according to the above (10), in a state where the metal material sheet is clamped by the first clamping part and the second clamping part, in the inclined portion having a smaller intersection angle with the third direction, of the first inclined portion and the pair of second inclined portions, an interval between the first clamping part and the second clamping part may be 1.03 times or more and 1.07 times or less a sheet thickness of the metal material sheet, and in the inclined portion having a larger intersection angle with the third direction, the first clamping part and the second clamping part may be separated from each other.

(12) In the structural member manufacturing device according to the above (10) or (11), the clamping part driving means may include a cam mechanism that allows the first clamping part and the second clamping part to relatively move in a direction in which the first clamping part and the second clamping part are separated from each other, along a smaller intersection angle of two intersection angles of an intersection angle with the third direction of the first inclined portion and an intersection angle with the third direction of each of the pair of second inclined portions.

(13) In the structural member manufacturing device according to any one of the above (10) to (12), the first clamping part may be configured to clamp the metal material sheet in advance of the second clamping part.

(14) In the structural member manufacturing device according to any one of the above (10) to (13), the structural member manufacturing device may further include a clamping member return mechanism that moves any of the first lower clamping member, the second upper clamping member, the third lower clamping member, and the fourth upper clamping member toward an original position thereof when the first clamping part and the second clamping part move toward original positions.

The present invention is not limited only to the configuration of each of the embodiments described above, and various modifications can be made within a scope which does not depart from the gist of the present invention.

For example, in each of the embodiments described above, the case where the structural member W1 includes the first region WF1 or WF1A, the inclined portion WS or WSA, the second region WF2 or WF2A has been described. On the other hand, when the forming of the structural member W1 is completed, either one of the inclined portions WS and WSA is completely drawn from the first clamping part 10 or the second clamping part 20, and as a result, the structural member W1 may not include either of the first region WF1 or WF1A or the second region WF2 or WF2A.

In each of the embodiments described above, the case where the first region WF1 (WF11, WF12) and the second region WF2 (WF21, WF22) are configured in a planar shape orthogonal to the Z-axis direction and the inclined portions WS1, WS2, and WS3 whose intersection angle θ changes according to a position in the Y-axis direction is formed between the first region WF1 (WF11, WF12) and the second region WF2 (WF21, WF22) has been descried. On the other hand, the configuration of the structural member W1 can be optionally set. For example, an inclined surface that is not orthogonal to the Z-axis direction may be included in the whole or a part of the first region WF1 (WF11, WF12), and irregularities, holes, or the like may be formed in any portion of the first region WF1 (WF11, WF12).

Further, the intersection angle θ of the inclined portion WS may be constant without changing according to a position in the Y-axis direction.

In each of the embodiments described above, the case where the first clamping part 10 and the second clamping part 20 are relatively movable in the Z-axis direction (the third direction) and the first lower clamping member 11 and the second upper clamping member 12, and the third lower clamping member 21 and the fourth upper clamping member 22 are relatively moved in the Z-axis direction to be capable of being opened and closed with respect to one another has been described. On the other hand, a configuration may be made such that the opening and closing between the first lower clamping member 11 and the second upper clamping member 12 and the opening and closing between the third lower clamping member 21 and the fourth upper clamping member 22 are performed by the opening and closing by rotation around a fulcrum. Alternatively, a configuration may be made such that any of the first lower clamping member 11, the second upper clamping member 12, the third lower clamping member 21, and the fourth upper clamping member 22 relatively moves in the direction intersecting with the Z-axis direction to release the clamping.

Further, in each of the embodiments described above, the case where the fourth upper clamping member 22 is configured to be operated by the cam mechanism 20C and the cam mechanism 20C includes the cam-shaped portion 22C and the cam follower 22W has been described. On the other hand, a cam mechanism having a configuration other than the cam-shaped portion 22C and the cam follower 22W may be adopted. Alternatively, instead of the cam mechanism, a configuration may be made to move the position in the X-axis direction of the fourth upper clamping member 22 while causing it to correspond to a position in the Z-axis direction, by using an actuator such as a hydraulic cylinder with a wedge or a position detection function.

Further, in each of the embodiments described above, the case where the intersection angle θ (=minimum intersection angle θ1) of the first inclined portion WS1 is 45° (135° with respect to the X-axis direction) and the intersection angle θ of the second inclined portion WS2 having the maximum intersection angle θ is 60° (150° with respect to the X-axis direction) has been described. However, there is no limitation thereto, and the intersection angles θ of the first inclined portion WS1, the second inclined portion WS2, and the third inclined portion WS3 can be optionally set.

Further, in the first embodiments described above, the case where the structural member manufacturing die 100 includes the coil springs (the clamping member return mechanisms) 12P, 21P, and 22P and the second upper clamping member 12, the third lower clamping member 21, and the fourth upper clamping member 22 can be automatically returned toward the original position of each of the members has been described. On the other hand, instead of the coil springs (the clamping member return mechanisms) 12P, 21P, and 22P, the clamping member return mechanism may be configured by an actuator such as an air cylinder, or the like.

Alternatively, a configuration may be made in which the first lower clamping member 11 moves and returns to the original position together with the second upper clamping member 12, the third lower clamping member 21, and the fourth upper clamping member 22. Alternatively, a configuration may be made in which only some of the first lower clamping member 11, the second upper clamping member 12, the third lower clamping member 21, and the fourth upper clamping member 22 are automatically returned. Alternatively, a configuration may be made in which the first lower clamping member 11 moves and all of the second upper clamping member 12, the third lower clamping member 21, and the fourth upper clamping member 22 are not automatically returned. The configuration of the clamping member return mechanism can be optionally set.

Further, the clamping member return mechanism may be configured by an actuator or other means, instead of the coil spring.

In each of the embodiments described above, the case where the upper die provided with the second upper clamping member 12 and the fourth upper clamping member 22 advances and retreats in the up-down direction (the Z-axis direction) with respect to the lower die provided with the first lower clamping member 11 and the third lower clamping member 21 to perform press forming has been described. On the other hand, the lower die may advance and retreat with respect to the upper die, or both the upper die and the lower die may move relative to each other.

Further, the first lower clamping member 11 and the third lower clamping member 21, and the second upper clamping member 12 and the fourth upper clamping member 22 may relatively move in a direction other than the up-down direction, for example, a lateral direction.

In each of the embodiments described above, the case where the present invention is applied to the blank steel sheet W0 made of a thin sheet made of ultra high strength steel having tensile strength of 980 MPa or more and having a sheet thickness of 1.2 mm, as an object where the effect of the present invention is most exhibited, has been described. On the other hand, the present invention can be applied to a steel sheet having tensile strength of less than 980 MPa or a steel sheet having a sheet thickness other than 1.2 mm. Further, the present invention may be applied to another metal material sheet that can be subjected to deformation processing, instead of the steel sheet.

Further, in the embodiments described above, the case where the second inclined portion and the third inclined portion are formed so as to be symmetrical at the center in the Y-axis direction has been described. On the other hand, the second inclined portion and the third inclined portion may be asymmetric at the center in the Y-axis direction.

EXAMPLE

Hereinafter, the effect of one aspect of the present invention will be further specifically described by an example. However, the conditions in the example are example conditions adopted to confirm the feasibility and effect of the present invention, and the invention is not limited to this example conditions. The present invention may adopt various conditions as long as the object of the present invention is achieved without departing from the gist of the present invention.

Figure 21:
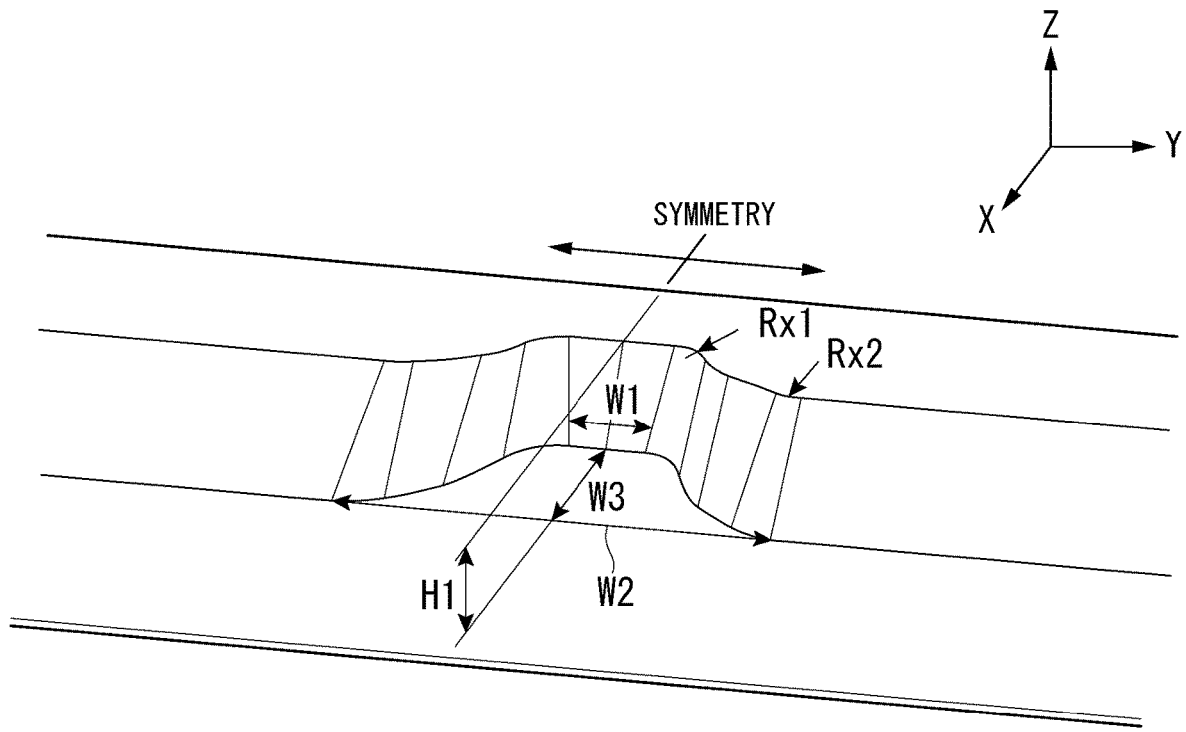
FIG. 21 is a schematic diagram showing the shape of a press-formed article showing an example.

CAE analysis related to forming was performed using steel sheets having strength and sheet thicknesses as shown in Table 1. Forming analysis was performed using commercially available software (LS-DYNA ver971 rev7.1.2, manufactured by ANSYS) for the CAE analysis. FIG. 21 is a schematic diagram of the shape of a press-formed article used in this example. The shape of the press-formed article is described below.

It is symmetrical at the center of the Y-axis direction.
The intersection angle θ of the first inclined portion (WS1) is 45 deg.
The intersection angle θ of the second inclined portion (WS2) is 60 deg.
A Height H1 in the Z-axis direction between the first region (WF1) and the second region is 90 mm.
A minimum length in the Y-axis direction of the first inclined portion is 105 mm at W1.
A minimum length W2 in the Y-axis direction of the second inclined portion is 555 mm.
A minimum distance W3 between the first inclined portion and the second inclined portion in the X-axis direction is 148 mm.
A radius of curvature (bending R) Rx1 of a ridge of the portion where the first inclined portion and the third inclined portion intersect each other is 100 mm inside the bend.
A radius of curvature Rx2 of a ridge of the portion where the second inclined portion and the third inclined portion intersect each other is 200 mm inside the bend.
A radius of curvature Rp of a ridge of the first region-side connection portion (WE11) is 12 mm inside the bend.
A radius of curvature Rd of a ridge of the second region-side connection portion (WE22) is 12 mm inside the bend.

The word "drawing" in the item "construction method" in Table 1 refers to drawing forming, and the forming is performed using a die that includes a drawing die, a drawing punch, and a drawing holder. This is a processing method of obtaining a press-formed article by clamping the first region WF1 and the inclined portion WS by the drawing punch and the drawing die by lowering the drawing die in a state where the second region WF2 is clamped by the drawing holder and the drawing die.

The word "bending" in the item "construction method" in Table 1 refers to bending forming, and this is a processing method of obtaining a press-formed article by clamping the second region WF2 and the inclined portion WS by a bending punch and a bending die by lowering the bending die in a state where the first region WF1 is clamped by a bending pad and the bending punch.

The symbol "—" in the item "sheet thickness ratio A" in Table 1 indicates that the sheet thickness ratio A could not be calculated due to the generation of cracks or wrinkles. Here, the crack was determined to be a crack in a case where a sheet thickness decrease rate exceeded 20% or more during forming, and the wrinkle was determined to be a wrinkle in a case where clear buckling occurred during forming.

The indication "HS" in the item "strength (MPa)" in Table 1 indicates a hot stamp, and a formed article having strength of 1500 MPa class was obtained by pressing a steel sheet heated to an austenite region and applying quenching by cooling the steel sheet with it gripped with a die during processing.

Figure 22:
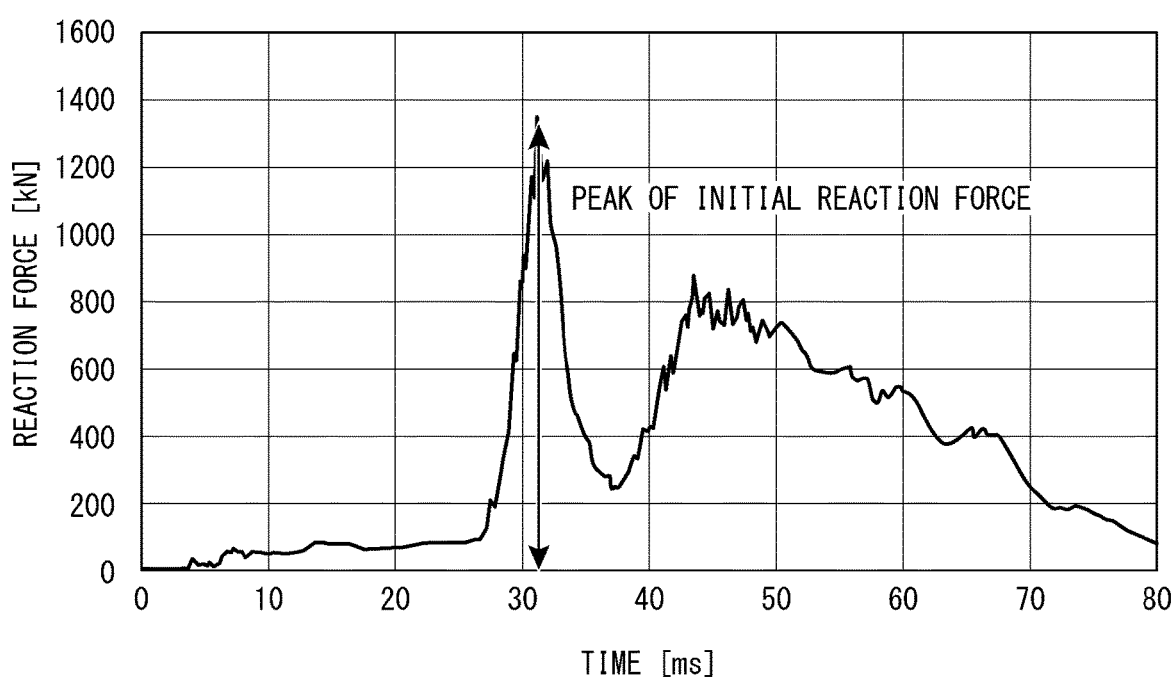
FIG. 22 is a graph showing the relationship between a time and a reaction force when collision CAE is performed.

FIG. 22 is a graph showing the relationship between a time and a reaction force when a collision experiment was performed. The horizontal axis of FIG. 22 represents time [ins], and the vertical axis represents reaction force [kN]. In the collision test, the structural member W1 was mounted to a dash panel portion of an automobile and CAE analysis of collision distortion was performed. A collision was applied to a pole having a diameter of 254 mm from the front at a speed of 64 km/h. Commercially available software (LS-DYNA ver971 rev7.1.2, manufactured by ANSYS) was used for the CAE analysis.

As shown in FIG. 22, reaction force data and time data were obtained, and the maximum value of the reaction force at that time was shown in Table 2. Table 2 shows the results of a panel P1 (the sheet thickness ratio A=0.14) in which the structural member W1 is a 980 MPa material having a sheet thickness of 1.8 mm, and a panel P2 (the sheet thickness ratio A=0.28) in which the structural member W1 is a 440 MPa material having a sheet thickness of 2.6 mm. In Table 2, the reaction force and the reaction force per weight when the panel P1 was set to 1.0 are shown.

TABLE 1

| No | Construction method | Strength (MPa) | Sheet thickness (mm) | Sheet thickness ratio A | Defect |
|---|---|---|---|---|---|
| 1 | Present invention | 780 | 1.4 | 0.13 | No |
| 2 | Present invention | 980 | 0.8 | 0.21 | No |
| 3 | Present invention | 980 | 1.4 | 0.14 | No |
| 4 | Present invention | 980 | 2.3 | 0.15 | No |
| 5 | Present invention | 1180 | 1.4 | 0.13 | No |
| 6 | Present invention | 1470 | 1.4 | 0.13 | No |
| 7 | Comparison 1 Drawing | 440 | 2.6 | 0.28 | No |
| 8 | Comparison 1 Drawing | 440 | 2.0 | — | Cracks, wrinkles |
| 9 | Comparison 1 Drawing | 980 | 1.4 | — | Cracks, wrinkles |
| 10 | Comparison 2 Bending | HS | 1.4 | — | Wrinkles |

TABLE 2

|  | Sheet thickness (mm) | Reaction force (when panel 1 was set to 1.0) | Reaction force per weight (when panel 1 was set to 1.0) |
|---|---|---|---|
| Panel P1 | 1.8 | 1.00 | 1.00 |
| Panel P2 | 2.6 | 0.98 | 0.68 |

As shown in Table 1, a defect did not occur in No. 1 to No. 6 which are the examples of the present invention. In No. 7 to No. 10 which are comparative examples which do not satisfy the conditions of the present invention, a defect as shown in Table 1 occurred. Specifically, in No. 7, a defect did not occur because, although the strength (MPa) of a sheet thickness and the sheet thickness ratio A did not satisfy the conditions of the present invention, cracking was difficult due to low strength and high ductility and wrinkles did not easily occur due to a large sheet thickness. In No. 8, since the strength (MPa) of a sheet thickness did not satisfy the conditions of the present invention, cracks and wrinkles occurred. In No. 9, wrinkles occurred in a material in which the first inclined portion WS1 having a small intersection angle θ was not restrained, and the inflow of a material was hindered by the wrinkles, and cracks occurred around the ridges of WE221 and WE223. In No. 10, wrinkles occurred because forming was not performed in a state where the second region WF2 was pressed.

As shown in Table 2, when the panel P1 is set to 1.0, the reaction force of the panel P2 was almost the same as 0.98. However, the reaction force per weight was 0.68. In this way, the structural member according to the present invention could be made lighter than a member of the related art.

INDUSTRIAL APPLICABILITY

According to the structural member, the structural member manufacturing method, and the structural member manufacturing device according to the present invention, a high tensile strength structural member having an inclined portion can be efficiently manufactured by performing cold deformation processing while suppressing the generation of wrinkles. Therefore, there is great industrial applicability such as application as, for example, an automobile member that protects an occupant in the time of a collision.

BRIEF DESCRIPTION OF THE REFERENCE SYMBOLS

1: forming part
10: first clamping part
11: first lower clamping member
11E, 111E, 112E: first region-side edge portion (first clamping edge portion)
11F, 111F, 112F: first clamping surface
12: second upper clamping member
12F, 121F, 122F: second clamping surface
12P, 21P, 22P: coil spring (clamping member return mechanism)
20: second clamping part
20C: cam mechanism (clamping part driving means)
21: third lower clamping member
21F, 211F, 212F: third clamping surface
22 fourth upper clamping member
22C: cam-shaped portion (cam mechanism, clamping part driving means)
22E, 221E, 222E: second region-side edge portion (second clamping edge portion)
22F, 221F, 222F: fourth clamping surface
22W: cam follower (cam mechanism, clamping part driving means)
100, 100A, 100B: structural member manufacturing die (structural member manufacturing device)
W0: blank steel sheet (metal material sheet)
W1: structural member
WE11, W111, W112, WE11A, W111A, W112A: first region-side connection portion
WE22, W221, W222, WE22A, W221A, W222A: second region-side connection portion
WF0, WF01, WF02: portion corresponding to inclined portion
WF1, WF11, WF12, WF1A, WF11A, WF12A: first region
WF2, WF21, WF22, WF2A, WF21A, WF22A: second region
WS, WS2, WS3, WSA, WS1A, WS3A: inclined portion
WS1, WS2A: specific inclined portion (inclined portion)
θ: intersection angle
θ1: minimum intersection angle

The invention claimed is:

1. A structural member made of a metal material sheet, and comprising:
a first region extending to intersect with a third direction among a first direction, a second direction, and the third direction that are orthogonal to each other;
a first ridge connected to the first region and extending in the second direction;
an inclined portion connected to the first region through the first ridge in the first direction and inclined with respect to the first region;
a second ridge formed at an end portion of the inclined portion on a side opposite to the first region in the first direction and extending along the second direction; and
a second region connected through the second ridge and extending to intersect with the third direction,
wherein in the inclined portion,
an intersection angle with the third direction in a first plane that is defined by the first direction and the third direction changes according to a position in the second direction, and
an intersection angle with the first direction in a second plane that is defined by the first direction and the second direction changes according to a position in the second direction,
the inclined portion includes
a pair of second inclined portions, each of which is located on each side of both end portion sides in the second direction,
a pair of third inclined portions, each of which is connected to each of the pair of second inclined portions, and
a first inclined portion which is connected to both of the pair of third inclined portions,
an intersection angle with the third direction of each of the pair of third inclined portions is in a range between an intersection angle with the third direction of the first inclined portion and an intersection angle with the third direction of each of the pair of second inclined portions,
the first ridge has a convex shape whose center portion protrudes in a direction of the first region,
the second ridge has a convex shape whose center portion protrudes to a side opposite to the second region, and
a maximum sheet thickness region portion having a maximum sheet thickness on the first inclined portion side, and a minimum sheet thickness region portion formed on the second inclined portion side with respect to the maximum sheet thickness region portion and having a minimum sheet thickness are formed, and a sheet thickness ratio A of the minimum sheet thickness region portion to the maximum sheet thickness region portion, which is obtained by the following Expression 1, satisfies the following Expression 2, the sheet thickness ratio $A$=([maximum sheet thickness (mm) of the maximum sheet thickness region portion]−[minimum sheet thickness (mm) of the minimum sheet thickness region portion])/[maximum sheet thickness (mm) in the maximum sheet thickness region portion]   Expression 1

$0.08 \leq A \leq 0.26$   Expression 2.

2. The structural member according to claim 1, wherein the structural member is made of a steel sheet having tensile strength of 780 MPa or more.

3. The structural member according to claim 2, wherein a sheet thickness is 0.8 mm or more and 2.3 mm or less.

4. The structural member according to claim 1, wherein a sheet thickness is 0.8 mm or more and 2.3 mm or less.

5. The structural member according to claim 1, wherein a difference between the intersection angle with the third direction of the first inclined portion and the intersection angle with the third direction of each of the pair of second inclined portions is 8.0° or more.

6. A structural member manufacturing method that is made of a metal material sheet, and includes
a first region extending to intersect with a third direction among a first direction, a second direction, and the third direction that are orthogonal to each other;
a first ridge connected to the first region and extending in the second direction;
an inclined portion connected to the first region through the first ridge in the first direction and inclined with respect to the first region;
a second ridge formed at an end portion of the inclined portion on a side opposite to the first region in the first direction and extending along the second direction; and
a second region connected through the second ridge and extending to intersect with the third direction,
in which in the inclined portion,
an intersection angle with the third direction in a first plane that is defined by the first direction and the third direction changes according to a position in the second direction, and
an intersection angle with the first direction in a second plane that is defined by the first direction and the second direction changes according to a position in the second direction,
the inclined portion includes
a pair of second inclined portions, each of which is located on each side of both end portion sides in the second direction,
a pair of third inclined portions, each of which is connected to each of the pair of second inclined portions, and
a first inclined portion which is connected to both of the pair of third inclined portions,
an intersection angle with the third direction of each of the pair of third inclined portions is in a range between an intersection angle with the third direction of the first inclined portion and an intersection angle with the third direction of each of the pair of second inclined portions, the first ridge has a convex shape whose center portion protrudes in a direction of the first region, and
the second ridge has a convex shape whose center portion protrudes to a side opposite to the second region,
the method comprising:
a first process of restraining the first region by a first restraining part;
a second process of restraining the second region by a second restraining part; and
a third process of forming the inclined portion by relatively moving the first restraining part and the second restraining part in a direction in which the first restraining part and the second restraining part are separated from each other, along a smaller intersection angle of two intersection angles of an intersection angle with the third direction of the first inclined portion and an intersection angle with the third direction of each of the pair of second inclined portions.

7. The structural member manufacturing method according to claim 6, wherein in a state where the metal material sheet is clamped by the first restraining part and the second restraining part,
in the inclined portion having a smaller intersection angle with the third direction, of the first inclined portion and the pair of second inclined portions, an interval between the first restraining part and the second restraining part is 1.03 times or more and 1.07 times or less a sheet thickness of the metal material sheet, and
in the inclined portion having a larger intersection angle with the third direction, the first restraining part and the second restraining part are separated from each other.

8. The structural member manufacturing method according to claim 6, wherein the inclined portion is formed while restraining a surface corresponding to the second region.

9. The structural member manufacturing method according to claim 6, wherein the inclined portion is formed while restraining a surface corresponding to the first region.

10. The structural member manufacturing method according to claim 6, wherein the inclined portion is formed while restraining the pair of second inclined portions.

11. A structural member manufacturing device that is made of a metal material sheet, and includes
a first region extending to intersect with a third direction among a first direction, a second direction, and the third direction that are orthogonal to each other;
a first ridge connected to the first region and extending in the second direction;
an inclined portion connected to the first region through the first ridge in the first direction and inclined with respect to the first region;
a second ridge formed at an end portion of the inclined portion on a side opposite to the first region in the first direction and extending along the second direction; and
a second region connected through the second ridge and extending to intersect with the third direction,
in which in the inclined portion,
an intersection angle with the third direction in a first plane that is defined by the first direction and the third direction changes according to a position in the second direction, and
an intersection angle with the first direction in a second plane that is defined by the first direction and the second direction changes according to a position in the second direction,
the inclined portion includes a pair of second inclined portions, each of which is located on each side of both end portion sides in the second direction, a pair of third inclined portions, each of which is connected to each of the pair of second inclined portions, and a first inclined portion which is connected to both of the pair of third inclined portions, an intersection angle with the third direction of each of the pair of third inclined portions is in a range between an intersection angle with the third direction of the first inclined portion and an intersection angle with the third direction of each of the pair of second inclined portions, the first ridge has a convex shape whose center portion protrudes in a direction of the first region, and the second ridge has a convex shape whose center portion protrudes to a side opposite to the second region, the device comprising:

a first clamping part having a first lower clamping member and a second upper clamping member that are disposed to face each other and are opened and closed;

a second clamping part having a third lower clamping member and a fourth upper clamping member that are disposed to face each other with respect to the first lower clamping member and the second upper clamping member and are opened and closed; and clamping part driver for allowing the first clamping part and the second clamping part to relatively move in a direction in which the first clamping part and the second clamping part are separated from each other, along a smaller intersection angle of two intersection angles of an intersection angle with the third direction of the first inclined portion and an intersection angle with the third direction of each of the pair of second inclined portions.

12. The structural member manufacturing device according to claim 11, wherein in a state where the metal material sheet is clamped by the first clamping part and the second clamping part, in the inclined portion having a smaller intersection angle with the third direction, of the first inclined portion and the pair of second inclined portions, an interval between the first clamping part and the second clamping part is 1.03 times or more and 1.07 times or less a sheet thickness of the metal material sheet, and in the inclined portion having a larger intersection angle with the third direction, the first clamping part and the second clamping part are separated from each other.

13. The structural member manufacturing device according to claim 12, wherein the clamping part driver includes a cam mechanism that allows the first clamping part and the second clamping part to relatively move in a direction in which the first clamping part and the second clamping part are separated from each other, along a smaller intersection angle of two intersection angles of an intersection angle with the third direction of the first inclined portion and an intersection angle with the third direction of each of the pair of second inclined portions.

14. The structural member manufacturing device according to claim 11, wherein the clamping part driver includes a cam mechanism that allows the first clamping part and the second clamping part to relatively move in a direction in which the first clamping part and the second clamping part are separated from each other, along a smaller intersection angle of two intersection angles of an intersection angle with the third direction of the first inclined portion and an intersection angle with the third direction of each of the pair of second inclined portions.

15. The structural member manufacturing device according to claim 11, wherein the first clamping part is configured to clamp the metal material sheet in advance of the second clamping part.

16. The structural member manufacturing device according to claim 11, further comprising:

a clamping member return mechanism that moves any of the first lower clamping member, the second upper clamping member, the third lower clamping member, and the fourth upper clamping member toward an original position thereof when the first clamping part and the second clamping part move toward original positions.

\* \* \* \* \*